US009405989B2

(12) United States Patent
Ogawa

(10) Patent No.: US 9,405,989 B2
(45) Date of Patent: Aug. 2, 2016

(54) IMAGE PROCESSING APPARATUS AND METHOD

(71) Applicant: Sony Corporation, Tokyo (JP)

(72) Inventor: Kazuya Ogawa, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/471,487

(22) Filed: Aug. 28, 2014

(65) Prior Publication Data

US 2014/0369411 A1 Dec. 18, 2014

Related U.S. Application Data

(63) Continuation of application No. 13/639,030, filed as application No. PCT/JP2011/058277 on Mar. 31, 2011, now Pat. No. 9,008,449.

(30) Foreign Application Priority Data

Apr. 9, 2010 (JP) .................................. 2010-090958

(51) Int. Cl.
*G06K 9/20* (2006.01)
*G06K 9/36* (2006.01)
*H04N 19/593* (2014.01)
*H04N 19/426* (2014.01)
*H04N 19/59* (2014.01)
*H04N 19/44* (2014.01)

(52) U.S. Cl.
CPC ................ *G06K 9/36* (2013.01); *H04N 19/426* (2014.11); *H04N 19/44* (2014.11); *H04N 19/59* (2014.11); *H04N 19/593* (2014.11)

(58) Field of Classification Search
None
See application file for complete search history.

(56) References Cited

U.S. PATENT DOCUMENTS

| 5,089,889 | A | 2/1992 | Sugiyama |
| 5,708,729 | A | 1/1998 | Adams et al. |
| 6,795,581 | B1 | 9/2004 | Nomura |
| 7,385,650 | B2 | 6/2008 | Kondo et al. |
| 7,747,097 | B2 | 6/2010 | van Baarsen et al. |
| 7,936,820 | B2 * | 5/2011 | Watanabe et al. ........ 375/240.16 |

(Continued)

FOREIGN PATENT DOCUMENTS

| CN | 101032174 A | 9/2007 |
| JP | 09-247673 | 9/1997 |

(Continued)

OTHER PUBLICATIONS

Sungmin Kim; Takgi Lee; Kidong Chung, "An Efficient and Fast Block Size Decision Exploiting Boundary Information on Inner Block for H.264/AVC Intra Prediction", IEEE Southwest Symposium on Image Analysis and Interpretation, 2008.*

(Continued)

*Primary Examiner* — Andrae S Allison
(74) *Attorney, Agent, or Firm* — Chip Law Group

(57) ABSTRACT

An image processing apparatus capable of reducing the amount of memory required for intra-frame prediction is provided. The apparatus includes a processing unit that performs sampling on pixels adjacent to a current block for intra-frame prediction according to a block size of the current block. The processing unit further performs interpolation by using the pixels being sampled to reconstruct the adjacent pixels. The processing unit further performs the intra-frame prediction by using the adjacent pixels being reconstructed to generate a predicted image.

14 Claims, 27 Drawing Sheets

(56) References Cited

U.S. PATENT DOCUMENTS

| | | | |
|---|---|---|---|
| 8,055,069 B2 | 11/2011 | Chiang et al. | |
| 8,305,496 B2 | 11/2012 | Wanaka | |
| 8,655,065 B2 | 2/2014 | Sumi et al. | |
| 8,723,891 B2 | 5/2014 | Chowdhry et al. | |
| 9,008,175 B2* | 4/2015 | Van Der Auwera et al. | 375/240.12 |
| 2006/0120450 A1* | 6/2006 | Han et al. | 375/240.03 |
| 2006/0133489 A1* | 6/2006 | Watanabe et al. | 375/240.12 |
| 2006/0222066 A1* | 10/2006 | Yoo et al. | 375/240.03 |
| 2006/0227868 A1* | 10/2006 | Chen et al. | 375/240.03 |
| 2007/0160153 A1* | 7/2007 | Sullivan | 375/240.29 |
| 2011/0176607 A1* | 7/2011 | Kim et al. | 375/240.08 |
| 2012/0082224 A1* | 4/2012 | Van Der Auwera et al. | 375/240.12 |
| 2012/0213279 A1* | 8/2012 | Lu et al. | 375/240.12 |

FOREIGN PATENT DOCUMENTS

| | | |
|---|---|---|
| JP | 11-146399 | 5/1999 |
| JP | 2003-289544 | 10/2003 |
| JP | 2007-214641 | 8/2007 |
| WO | WO 2006/039382 A2 | 4/2006 |

OTHER PUBLICATIONS

Huang et al, Fast Decision of Block Size, Prediction Mode, and Intra Block for H.264 Intra Prediction, IEEE Transactions on Circuits and Systems for Video Technology, vol. 20, No. 8, Aug. 2010.*

Sairam, Y.N.; Nan Ma; Sinha, N., "A Novel Partial Prediction Algorithm for Fast 4x4 Intra Prediction Mode Decision in H.264/AVC," Data Compression Conference, 2008. DCC 2008 , vol., No., pp. 232,241, Mar. 25-27, 2008.*

Jafari et al, Fast Intra- and Inter-Prediction Mode Decision in H.264 Advanced Video Coding, IJCSNS International Journal of Computer Science and Network 130 Security, vol. 8 No. 5, May 2008.*

M.L., Comer, "Reduced Resolution Update Video Coding With Interblock Filtering of Prediction Error Residuals," IEEE International Conference on Image Processing, vol. 3, 4 pages (2005).

H. Cheng et al., "Reduced Resolution Residual Coding for H.264-based Compression System", IEEE International Symposium on Circuits and Systems, pp. 3486-3489 (2006).

T. Weigand et al., "Overview of the H.264/AVC Video Coding Standard", IEEE Transactions on Circuits and Systems for Video Technology, vol. 13, No. 7, pp. 560-576 (2003).

J. Sievers et al., "Reduced Resolution Update for Computational Efficiency", International Telecommunication Union, vo. 8/16, pp. 1-4 (2004).

A. Tourapis et al., "New Results on Reduced Resolution Update Mode", ITU-T Video Coding Experts Group (ITU-T SG16 Q.6), pp. 1-15 (2004).

Extended European search report from the European Patent Office in corresponding EP 11 76 6768 from Munich, mailed Mar. 17, 2014.

"Video Coding Using Extending Block Sizes", Telecommunication Standardization Sector, COM 16—C 123—E, pp. 4, (2009).

International Search Report from the European Patent Office for International Application No. PCT/JP2011/058277, mailing date May 31, 2011.

Notification of the First Office Action for Chinese Application No. 201180017576.3 dated Dec. 1, 2014.

Hui Cheng et al., "Reduced Resolution Residual Coding for H.264-based Compression System", ISCAS 2006 pp. 3486-3489.

Office Action received for Chinese patent application No. 201180017576.3, mailed on May 23, 2016, 13 pages of office action including 8 pages of English translation.

* cited by examiner

FIG. 10

IMAGE PROCESSING APPARATUS AND METHOD

CROSS-REFERENCE TO RELATED APPLICATIONS

This is a continuation of application Ser. No. 13/639,030, filed Dec. 6, 2012, which is a national phase application of International Application No. PCT/JP2011/058277, filed on Mar. 31, 2011, which claims the benefit of Japanese Patent Application No. 2010-090958 filed Apr. 9, 2010, the content of all of which are incorporated herein by reference.

TECHNICAL FIELD

The present disclosure relates to an image processing apparatus and a method therefor, and more particularly to an image processing apparatus and a method therefor capable of reducing the amount of memory necessary for intra-frame prediction.

BACKGROUND ART

In standard image coding systems such as ITU-T (International Telecommunication Union Telecommunication Standardization Sector) H.264 and MPEG4 (Moving Picture Experts Group 4)-AVC (Advanced Video Coding), intra-frame prediction (intra prediction) coding has been conventionally employed as Intra-picture prediction coding.

In the intra prediction in ITU-T H.264 and MPEG4-AVC, pixel values of adjacent pixels adjacent to a block to be processed among reconstructed pixel values that are pixel data of blocks adjacent to the block to be processed before a deblocking filter is applied.

Accordingly, predicted pixel values and residual components in each intra prediction mode are added, and one pixel column at the right end and one pixel row at the bottom end of a decoded block are saved as reconstructed pixel values for intra prediction of a next block.

These reconstructed pixel values are saved in an area different from that for decoded pixel values after the deblocking filter is applied thereto, which are pixel data on which decoding is completed.

In the meantime, extension of the numbers of pixels in the horizontal and vertical directions of a macroblock is proposed as an elemental technology for the next-generation image coding standards (see, for example, Non-patent document 1). According to this proposal, it is also proposed that macroblocks of 32×32 pixels and 64×64 pixels, for example, be used in addition to the macroblock size of 16×16 pixels specified in MPEG1, MPEG2, ITU-T H.264 or MPEG4-AVC, for example. In addition, the size of images to be coded and decoded has been recently increasing year after year.

CITATION LIST

Non-Patent Document

Non-patent document 1: Peisong Chenn, Yan Ye, Marta Karczewicz, "Video Coding Using Extended Block Sizes," COM16-C123-E, Qualcomm Inc

SUMMARY OF THE INVENTION

Problems to be Solved by the Invention

With the conventional method, however, since the number of adjacent reconstructed pixels to be saved for processing a macroblock increases with the size of pixels in the vertical direction of macroblocks, the capacity required for saving the adjacent reconstructed pixel values may disadvantageously increase.

Moreover, since the bottom pixel row corresponding to one line of a macroblock that is one macroblock above a macroblock to be processed needs to be held as adjacent pixel values, the increase in the horizontal size of images may disadvantageously increase the capacity required for saving the adjacent reconstructed pixel values.

For example, a memory area or a line buffer of 6 kilobytes for a progressive image with a color standard of 4:2:0, 8 bits and a size of 4096 pixels in the horizontal direction and 12 kilobytes for an interlaced image considering macroblock adaptive frame/field decoding will be required. When the number of pixels in the horizontal direction is 7680, 11.5 kilobytes and 23 kilobytes, respectively, will be required.

The present disclosure has been achieved in view of such circumstances, and an object thereof is to realize intra-frame prediction with a smaller amount of memory.

Solutions to Problems

An aspect of the present disclosure is an image processing apparatus including: a sampling unit that performs sampling to thin out pixel values to be used as adjacent pixels in intra-frame prediction according to a size in an horizontal direction of an image to be coded or a size in a vertical direction of regions obtained by dividing the image; a reconstruction unit that performs interpolation by using the pixel values sampled by the sampling unit to reconstruct the adjacent pixels; a predicted image generation unit that performs the intra-frame prediction by using the adjacent pixels reconstructed by the reconstruction unit to generate a predicted image; and a coding unit that codes the image by using the predicted image generated by the predicted image generation unit.

The image processing apparatus further includes: a determination unit that determines whether to perform the sampling to thin out the pixel values to be used as the adjacent pixels in the intra-frame prediction, wherein the sampling unit may perform the sampling when the determination unit determines to perform the sampling.

The determination unit may determine whether to perform the sampling according to a content of the image or a picture type in coding of the image.

The image processing apparatus further includes: a sampling method determination unit that determines a method of the sampling according to the size in the horizontal direction of the image or the size in the vertical direction of the regions when the determining unit determines to perform the sampling, wherein the sampling unit may perform the sampling by the method determined by the sampling method determination unit.

The sampling method determination unit may determine the method of the sampling according to a content of the image.

The sampling method determination unit may determine the method of the sampling according to a picture type in coding of the image.

The sampling method determination unit may determine a method of the interpolation, and the reconstruction unit may perform the interpolation by the method of the interpolation determined by the sampling method determination unit to reconstruct the adjacent pixels.

The sampling unit may sample part of a lowermost pixel row and part of a rightmost pixel column in each of the regions into which the image is divided.

The sampling unit may sample part of a lowermost pixel row in each of the regions into which the image is divided.

The image processing apparatus further includes: a feature quantity extraction unit that extracts a feature quantity of the image, wherein the determination unit may determine whether to perform the sampling according to the size in the horizontal direction of the image or the size in the vertical direction of the regions extracted as the feature quantity of the image by the feature quantity extraction unit.

The coding unit may transmit the predicted image generated by the predicted image generation unit, coded data obtained by coding difference information from each of the regions of the image, and information indicating whether the sampling is performed by the sampling unit.

The coding unit may transmit the coded data obtained by coding the difference information and information indicating a method of the sampling performed by the sampling unit.

An aspect of the present disclosure is an image processing method for an image processing apparatus, including: performing sampling by a sampling unit to thin out pixel values used as adjacent pixels in intra-frame prediction according a size in a horizontal direction of an image to be coded or a size in a vertical direction of regions in a matrix into which the image is divided; performing interpolation by using the sampled pixel values by a reconstruction unit to reconstruct the adjacent pixels; performing the intra-frame prediction by using the reconstructed adjacent pixels by a predicted image generation unit to generate a predicted image; and coding the image by using the generated predicted image by a coding unit.

Another aspect of the present disclosure is an image processing apparatus including: a decoding unit that decodes coded data obtained by coding an image; a sampling unit that performs sampling to thin out pixel values to be used as adjacent pixels in intra-frame prediction according to a size in a horizontal direction of the image obtained by decoding the coded data by the decoding unit or a size in a vertical direction of regions into which the image is divided; a reconstruction unit that performs interpolation by using the pixel values sampled by the sampling unit to reconstruct the adjacent pixels; and a predicted image generation unit that performs the intra-frame prediction by using the adjacent pixels reconstructed by the reconstruction unit to generate a predicted image.

The image processing apparatus further includes: a determination unit that determines whether to perform the sampling to thin out the pixel values to be used as the adjacent pixels in the intra-frame prediction; and a sampling method determination unit that determines a method of the sampling according to the size in the horizontal direction of the image or the size in the vertical direction of the regions when the determination unit determines to perform the sampling, wherein the sampling unit may perform the sampling by the method determined by the sampling method determination unit when the determination unit determines to perform the sampling.

The sampling unit may sample part of a lowermost pixel row and part of a rightmost pixel column in each of the regions into which the image is divided.

The sampling unit may sample part of a lowermost pixel row in each of the regions into which the image is divided.

The decoding unit may acquire coded data obtained by coding difference information between the predicted image and each of the regions of the image and information indicating whether the sampling is performed by the sampling unit that are transmitted.

The decoding unit may acquire the coded data obtained by coding the difference information and information indicating a method of the sampling performed by the sampling unit that are transmitted.

An aspect of the present disclosure is an image processing method for an image processing apparatus, including: decoding coded data obtained by coding an image by a decoding unit; performing sampling by a sampling unit to thin out pixel values used as adjacent pixels in intra-frame prediction according a size in a horizontal direction of the image obtained by decoding the coded data by the decoding unit or a size in a vertical direction of regions into which the image is divided; performing interpolation by using the sampled pixel values by a reconstruction unit to reconstruct the adjacent pixels; and performing the intra-frame prediction by using the reconstructed adjacent pixels by a predicted image generation unit to generate a predicted image.

According to an aspect of the present disclosure, it is determined whether to perform sampling to thin out pixel values to be used as adjacent pixels in intra-frame prediction according to the size in the horizontal direction of an image to be coded or the size in the vertical direction of regions in a matrix into which the image is divided, the pixel values are sampled when it is determined to perform sampling, the sampled pixel values are read out from a storage unit that stores sampled pixel values, interpolation is performed to reconstruct adjacent pixels, and intra-frame prediction is performed using the reconstructed adjacent pixels to generate a predicted image.

According to another aspect the present disclosure, coded data obtained by coding an image are decoded, sampling to thin out pixel values to be used as adjacent pixels in intra-frame prediction according to the size in the horizontal direction of the image obtained by decoding the coded data or the size in the vertical direction of regions into which the image is divided, and interpolation is performed using the sampled pixel values to generate a predicted image.

Effects of the Invention

According to the present disclosure, coding of image data or decoding of coded image data can be performed. In particular, the amount of memory required for intra-frame prediction can be reduced.

BRIEF DESCRIPTION OF DRAWINGS

FIG. 10 is a diagram explaining another example of the sampling method.

MODE FOR CARRYING OUT THE INVENTION

Modes (hereinafter referred to as embodiments) for carrying out the present technologies will be described below. The description will be made in the following order:
1. First embodiment (image coding apparatus);
2. Second embodiment (image decoding apparatus);
3. Third embodiment (personal computer);
4. Fourth embodiment (television receiver);
5. Fifth embodiment (mobile phone);
6. Sixth embodiment (hard disk recorder); and
7. Seventh embodiment (camera)

1. First Embodiment

[Image Coding Apparatus]

Figure 1:
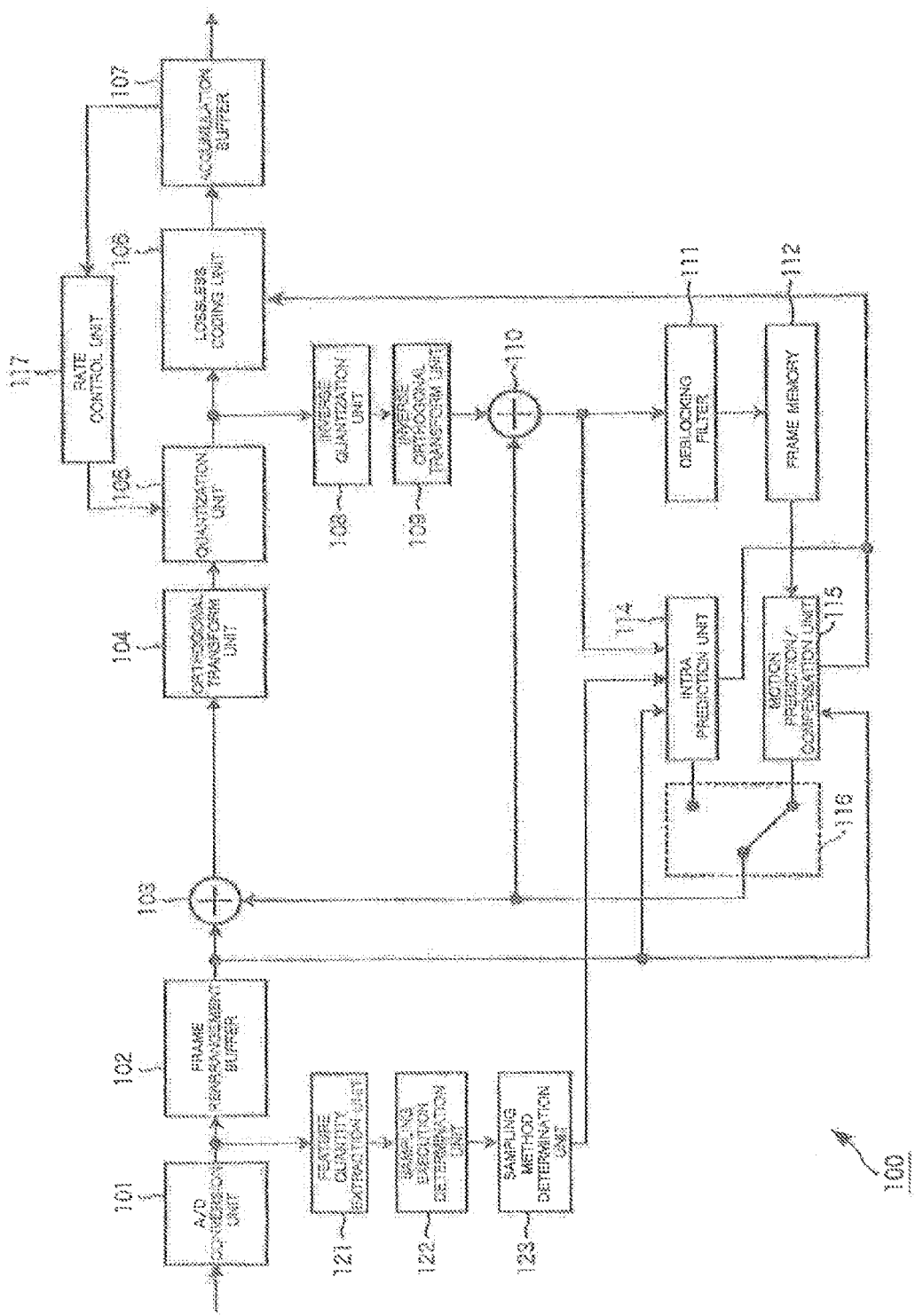
FIG. 1 is a block diagram illustrating an example of a main configuration of an image coding apparatus.

FIG. 1 shows a configuration according to an embodiment of an image coding apparatus as an image processing apparatus.

The image coding apparatus 100 illustrated in FIG. 1 is a coding apparatus that codes an image in a H.264 and MPEG (Moving Picture Experts Group) 4 Part 10 (AVC (Advanced Video Coding)) (hereinafter referred to as H.264/AVC) format, for example. Note that the image coding apparatus 100 samples (thins out) adjacent pixels to be used in intra prediction (intra-frame prediction) by a predetermined method and stores the sampled adjacent pixels. Then, the image coding apparatus 100 interpolates the sampled adjacent pixels according to a predetermined method and then uses the interpolated adjacent pixels for intra prediction.

In the example of FIG. 1, the image coding apparatus 100 includes an A/D (analog-to-digital) conversion unit 101, a frame rearrangement buffer 102, a computing unit 103, an orthogonal transform unit 104, a quantization unit 105, a lossless coding unit 106 and an accumulation buffer 107. The image coding apparatus 100 also includes an inverse quantization unit 108, an inverse orthogonal transform unit 109 and a computing unit 110. The image coding apparatus 100 further includes a deblocking filter 111 and a frame memory 112. In addition, the image coding apparatus 100 includes an intra prediction unit 114, a motion prediction/compensation unit 115 and a selection unit 116. Furthermore, the image coding apparatus 100 includes a rate control unit 117.

Still further, the image coding apparatus 100 includes a feature quantity extraction unit 121, a sampling execution determination unit 122 and a sampling method determination unit 123.

The A/D conversion unit 101 A/D converts input image data, outputs and stores the converted image data to/in the frame rearrangement buffer 102. The frame rearrangement buffer 102 rearranges the stored image with frames in an order for display into frames in an order for coding according to a GOP (Group of Picture) structure. The frame rearrangement buffer 102 supplies the image with the rearranged frames to the computing unit 103, the intra prediction unit 114 and the motion prediction/compensation unit 115.

The computing unit 103 subtracts a predicted image supplied from the selection unit 116 from the image read out from the frame rearrangement buffer 102 and outputs resulting difference information to the orthogonal transform unit 104. In a case of an image to be subjected to intra coding, for example, the computing unit 103 adds a predicted image supplied from the intra prediction image 114 to the image read out from the frame rearrangement buffer 102. Furthermore, in a case of an image to be subjected to inter coding, for example, the computing unit 103 adds a predicted image supplied from the motion prediction/compensation unit 115 to the image read out from the frame rearrangement buffer 102.

The orthogonal transform unit 104 performs orthogonal transform such as discrete cosine trans form and Karhunen-Loeve transform on the difference information from the computing unit 103 and supplies a transform coefficient thereof to the quantization unit 105. The quantization unit 105 quantizes the transform coefficient output by the orthogonal transform unit 104. The quantization unit 105 supplies the quantized transform coefficient to the lossless coding unit 106.

The lossless coding unit 106 performs lossless coding such as variable length coding and arithmetic coding on the quantized transform coefficient.

The lossless coding unit 106 acquires information indicating intra prediction, etc., from the intra prediction unit 114 and information indicating inter prediction, etc., from the motion prediction/compensation unit 115. Note that the information indicating intra prediction mode will also be hereinafter referred to as intra prediction mode information. Furthermore, the information indicating inter prediction mode will also be hereinafter referred to inter prediction mode information.

The lossless coding unit 106 codes the quantized transform coefficient and makes (multiplexes) a filter coefficient, intra prediction mode information, inter prediction mode, a quantization parameter and the like a part of header information of the coded data. The lossless coding unit 106 supplies and stores the coded data obtained by the coding to and in the accumulation buffer 107.

For example, in the lossless coding unit 106, lossless coding such as variable length coding or arithmetic coding is performed. Examples of the variable length coding includes CAVLC (Context-Adaptive Variable Length Coding) defined in the H.264/AVC format. Examples of the arithmetic coding include CABAC (Context-Adaptive Binary Arithmetic Coding).

The accumulation buffer 107 temporarily holds the coded data supplied from the lossless coding unit 106 and outputs the coded data as a coded image coded in the H.264/AVC format to a downstream storage device or a downstream transmission channel that is not illustrated, for example, at a predetermined timing.

In addition, the quantized transform coefficient is also supplied to the inverse quantization unit 108 by the quantization unit 105. The inverse quantization unit 108 inversely quantizes the quantized transform coefficient by a method corresponding to the quantization by the quantization unit 105 and supplies the resulting transform coefficient to the inverse orthogonal transform unit 109.

The inverse orthogonal transform unit 109 performs inverse orthogonal transform on the supplied transform coefficient by a method corresponding to the orthogonal transform by the orthogonal transform unit 104. The output resulting from the inverse orthogonal transform is supplied to the computing unit 110.

The computing unit 110 adds a predicted image supplied from the selection unit 116 to the inverse orthogonal transform result, that is, restored difference information supplied from the inverse orthogonal transform unit 109 to obtain a locally decoded image (decoded image). When the difference information corresponds to an image to be subjected to intra coding, for example, the computing unit 110 adds a predicted image supplied from the intra prediction unit 114 to the difference information. Alternatively, when the difference information corresponds to an image to be subjected to inter coding, for example, the computing unit 110 adds a predicted image supplied from the motion prediction/compensation unit 115 to the difference information.

The addition result is supplied to the deblocking filter 111 or the intra prediction unit 114.

The deblocking filter 111 removes block distortion of the decoded image by performing deblocking filtering as necessary and improves the image quality by performing loop filtering using a Wiener filter, for example, as necessary. The deblocking filter 111 classifies pixels into classes and performs appropriate filtering on each class. The deblocking filter 111 supplies the filtering result to the frame memory 112.

The frame memory 112 outputs a reference image stored therein to the motion prediction/compensation unit 115 at a predetermined timing.

The intra prediction unit 114 performs intra prediction (intra-frame prediction) to generate a predicted image by using pixel values in a frame. The intra prediction unit 114 performs intra prediction in a plurality of modes (intra prediction modes). The intra prediction modes include a mode in which a predicted image is generated on the basis of a local decoded image supplied from the computing unit 110.

Note that the local decoded image is an image that is not subjected to deblocking filtering. In the following description, pixel values of the local decoded image before the deblocking filtering will be referred to as reconstructed pixel values so as to be distinguished from the pixel values subjected to the deblocking filtering by the deblocking filter 111 and stored in the frame memory 112. That is, the reconstructed pixel values are stored in the intra prediction unit 114.

The reconstructed pixel values are partly used as adjacent pixel values for a prediction process for another macroblock in the intra prediction unit 114. More specifically, pixel values on a lowermost pixel row and on a rightmost pixel column among the reconstructed pixel values in units of a macroblock supplied to the intra prediction unit 114 are used as adjacent pixel values.

The intra prediction unit 114 thus holds pixel values on a lowermost pixel row and on a rightmost pixel column among the reconstructed pixel values in units of a macroblock supplied from the computing unit 110. The intra prediction unit 114 stores some of the reconstructed pixel values in this manner for a macroblock having one or more lines (one or more macroblock lines).

The intra prediction unit 114 performs intra prediction on a subsequent macroblock using the stored reconstructed pixel values as adjacent pixel values.

Note that the pixel values of the local decoded image that are subjected to deblocking filtering by the deblocking filter 111 and stored in the frame memory 112 are referred to as decoded pixel values as contrasted with the reconstructed pixel values. The decoded pixel values are supplied as a reference image to the motion prediction/compensation unit 115.

The intra prediction unit 114 generates predicted images in all intra prediction modes, evaluates the predicted images, and selects an optimum mode. After selecting an optimum intra prediction mode, the intra prediction unit 114 supplies the predicted image generated in the optimum mode to the computing unit 103 and the computing unit 110 via the selection unit 116.

Furthermore, as described above, the intra prediction unit 114 supplies intra prediction mode information indicating the employed intra prediction mode, etc., to the lossless coding unit 106 as necessary.

The motion prediction/compensation unit 115 calculates a motion vector for an image to be subjected to inter coding by using an input image supplied from the frame rearrangement buffer 102 and a reference image (decoded pixel values) supplied from the frame memory 112. The motion prediction/compensation unit 115 performs motion compensation according to the calculated motion vector to generate a predicted image (inter predicted image information).

The motion prediction/compensation unit 115 performs inter prediction in all candidate inter prediction modes to generate predicted images. The motion prediction/compensation unit 115 supplies the generated predicted images to the computing unit 103 and the computing unit 110 via the selection unit 116.

The motion prediction/compensation unit 115 supplies inter prediction mode information indicating the employed inter prediction mode and motion vector information indicating the calculated motion vector to the lossless coding unit 106.

The selection unit 116 supplies the output of the intra prediction unit 114 to the computing unit 103 for an image to be subjected to intra coding and supplies the output of the motion prediction/compensation unit 115 to the computing unit 103 for an image to be subjected to inter coding.

The rate control unit 117 controls the rate of quantization operation of the quantization unit 105 on the basis of compressed images accumulated in the accumulation buffer 107 so as not to cause overflow or underflow.

The feature quantity extraction unit 121 extracts a feature quantity of image data output from the A/D conversion unit 101. For example, the feature quantity extraction unit 121 refers to header information of the image data and analyzes real data to determine at least one of the horizontal size of the image or the vertical sized of a macroblock.

The content of a feature of an image extracted by the feature quantity extraction unit 121 may be any content. For example, the feature quantity extraction unit 121 may analyze the content (such as a texture pattern or the complexity) of the image and generate information indicating the content. Alternatively, for example, the feature quantity extraction unit 121 may determine a picture type (I-picture, P-picture or B-picture) or a scanning method of the image.

Needless to say, the feature quantity extraction unit 121 may extract a parameter other than the above as a feature quantity and may extract a plurality of types of feature quantities.

The feature quantity extraction unit 121 supplies the extracted feature quantity (information indicating a feature of the image) to the sampling execution determination unit 122.

The sampling execution determination unit 122 whether or not to sample (thin out) reconstructed pixel values to be used as adjacent pixel values by the intra prediction unit 114 before storage thereof according to the feature of the supplied image, and generates control information controlling whether or not to sample the reconstructed pixel values. The sampling execution determination unit 122 supplies the generated control information together with the feature quantity of the image (information indicating the feature of the image) to the sampling method determination unit 123.

The sampling method determination unit 123 determines whether or not to perform sampling on the basis of the control information, determines a method for the sampling (sampling method) when the sampling is to be performed, and generates control information specifying the sampling method. The sampling method determination unit 123 supplies the generated various control information, etc., together with the feature quantity of the image (information indicating the feature of the image) to the intra prediction unit 114.

The intra prediction unit 114 performs sampling of the reconstructed pixel values according to the control information supplied from the sampling method determination method 123.

[Macroblock]

Figure 2:
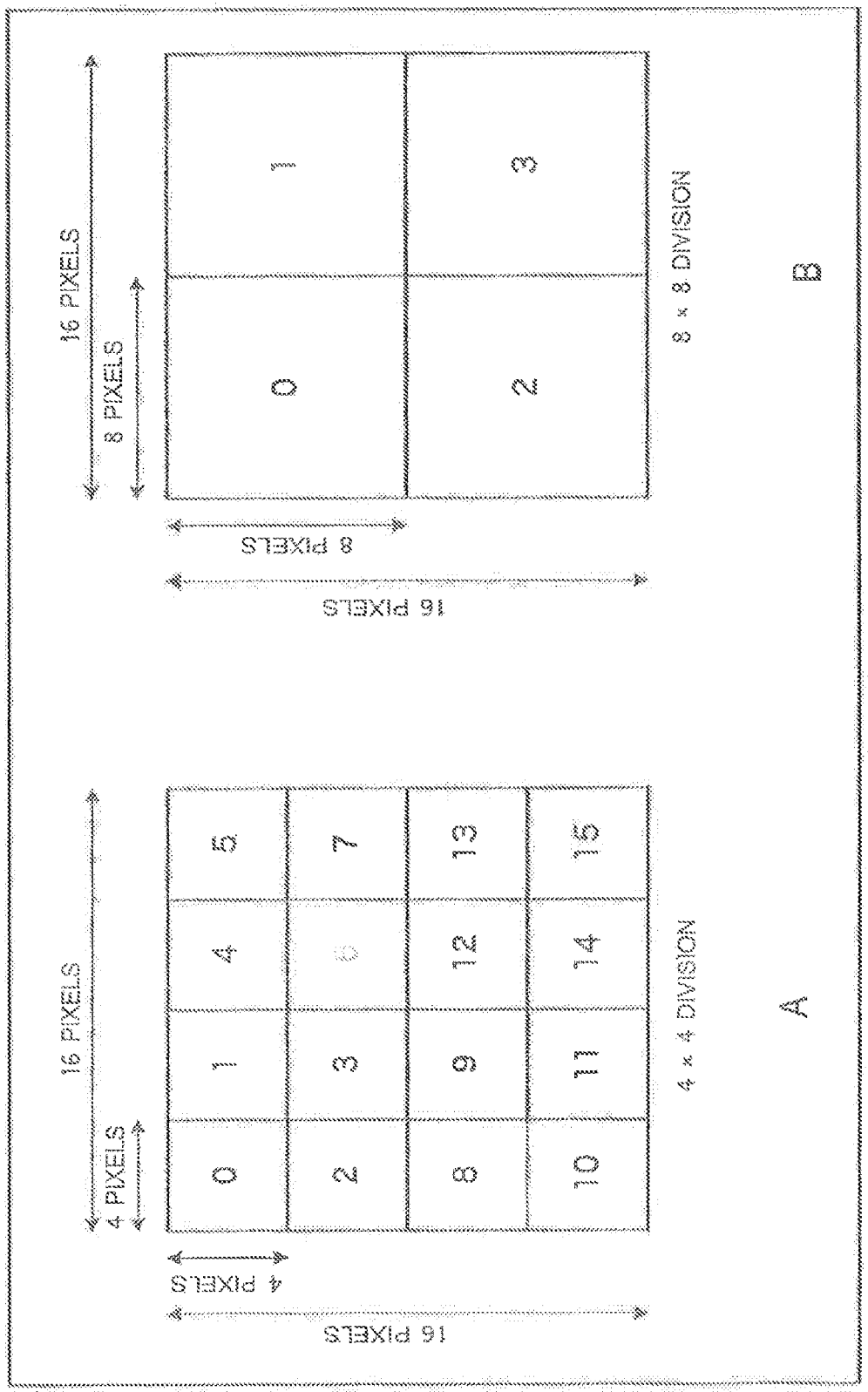
FIG. 2 is a diagram illustrating examples of division of a macroblock.

Two types of block division of coefficient data in a macroblock in H.264/AVC which are block division in units of 4×4 pixels (4×4 blocks) as illustrated in A of FIG. 2 and block division in units of 8×8 pixels (8×8 blocks) as illustrated in B of FIG. 2 are defined for luminance components. Squares illustrated in FIG. 2 represent blocks (4×4 blocks or 8×8 blocks), and numerals in the blocks represent the order of block scanning in the macroblock. Note that only block division in units of 4×4 pixels is defined for chrominance components.

[Intra Prediction Mode]

In intra prediction in H.264/AVC, intra prediction methods in units of 4×4 blocks, 8×8 blocks and macroblocks are defined.

Figure 3:
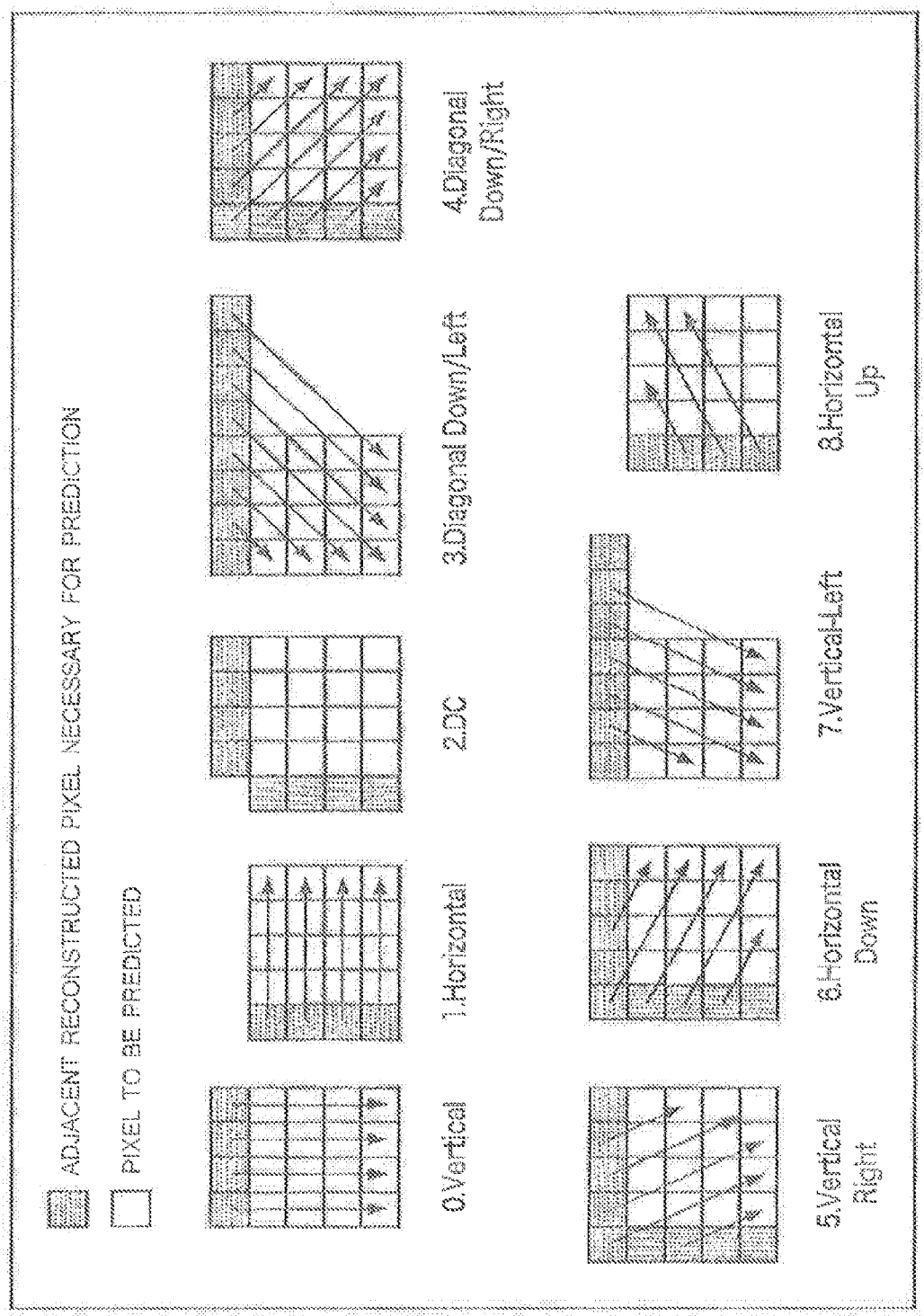
FIG. 3 is a diagram explaining an intra 4×4 prediction mode.

FIG. 3 is a diagram explaining a prediction mode of intra 4×4 prediction that is intra prediction in units of 4×4 blocks, in this case, adjacent reconstructed pixel values of 13 pixels, which are left, upper-left, upper and upper-right pixels, may be used for intra prediction for 4×4 blocks to be processed.

Figure 4:
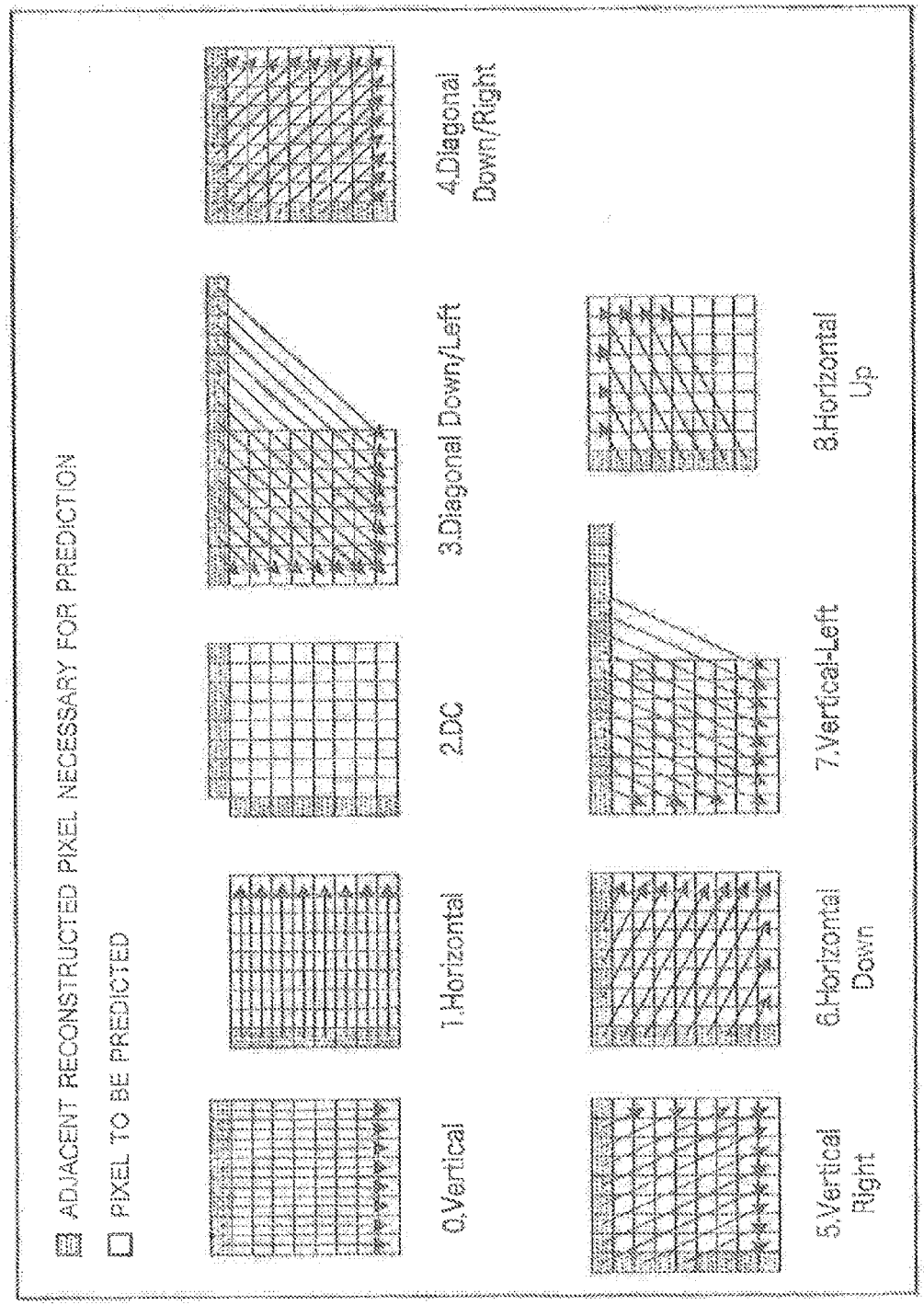
FIG. 4 is a diagram explaining an intra 8×8 prediction mode.

FIG. 4 is a diagram explaining a prediction mode of intra 8×8 prediction that is intra prediction in units of 8×8 blocks. In this case, adjacent reconstructed pixel values of 25 pixels, which are left, upper-left, upper and upper right pixels, may be used for intra prediction for 8×8 blocks to be processed.

Note that in intra 8×8 prediction, smoothing filtering is performed on each pixel as a process before generating a predicted image from adjacent reconstructed pixels. Generation of a predicted image is calculated from the adjacent reconstructed pixels after the filtering.

Figure 5:
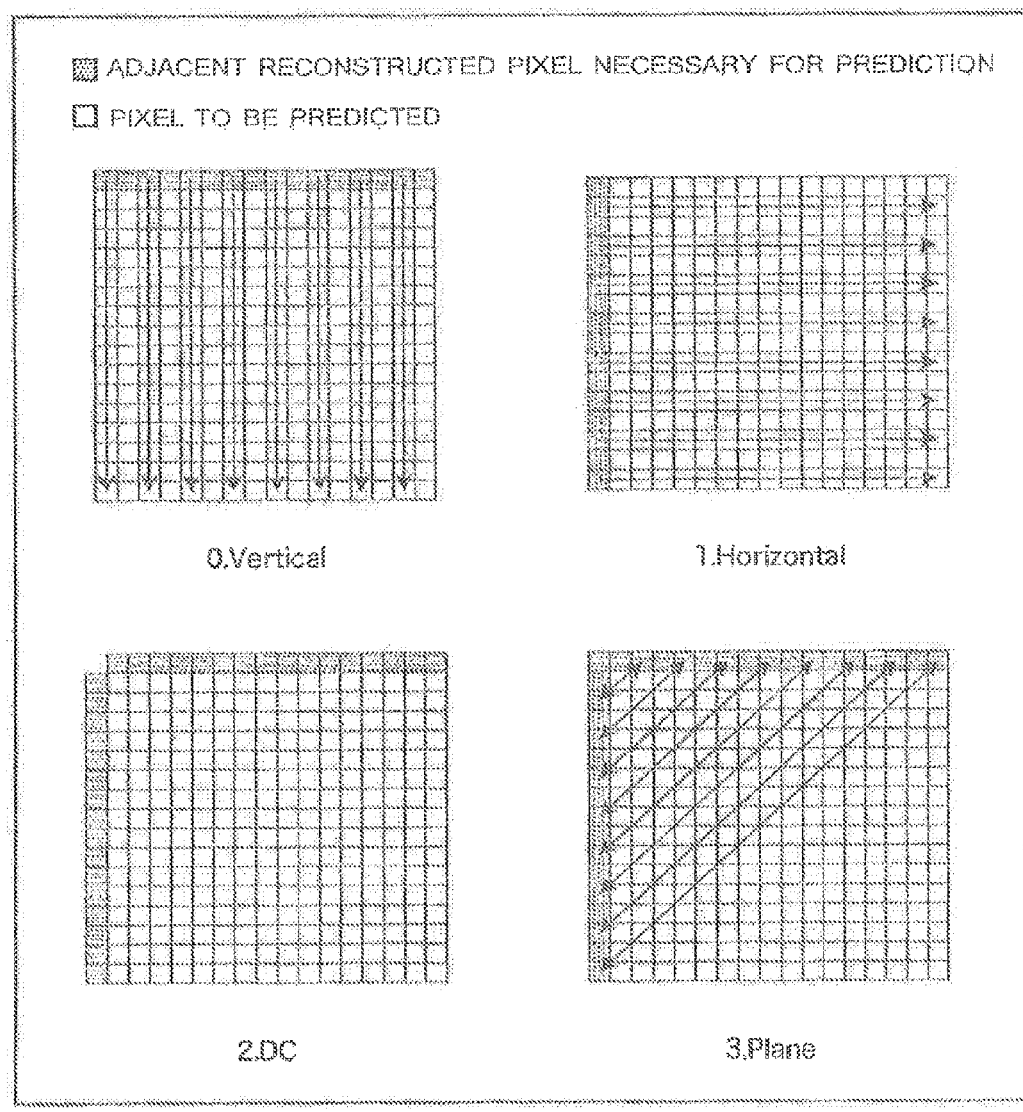
FIG. 5 is a diagram explaining an intra 16×16 prediction mode.

FIG. 5 illustrates a prediction mode of intra 16×16 prediction that is intra prediction in units of macroblocks and adjacent reconstructed pixels used for the prediction. In this case, adjacent reconstructed pixel values of 33 pixels, which are left, upper-left, upper and upper right pixels, may be used for intra prediction for 16×16 blocks.

Figure 6:
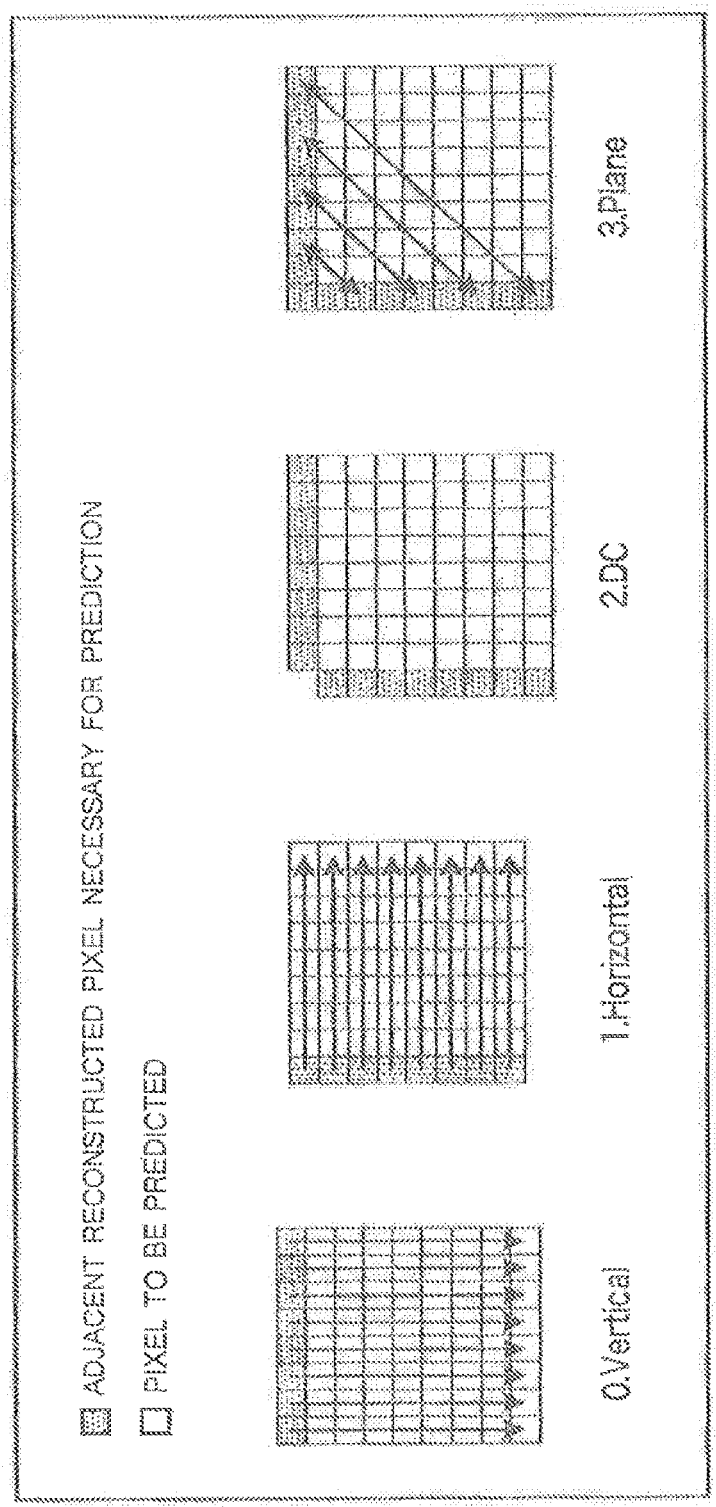
FIG. 6 is a diagram explaining an intra prediction mode for chrominance components.

For chrominance components, a prediction mode is provided in units of macroblocks independently of luminance components. FIG. 6 illustrates adjacent reconstructed pixels used for intra prediction of chrominance components when a chrominance format is 4:2:0.

In each of FIGS. 4 to 6, pixels represented by white squares are pixels to be predicted in macroblocks to be processed. In contrast, pixels represented by gray squares are adjacent pixels (reconstructed pixels) necessary for performing intra prediction thereof. That is, the intra prediction unit 114 needs to store the pixel values presented in gray in FIGS. 4 to 6.

Accordingly, as the horizontal size of an image or the macroblock size increases, the data amount of reconstructed pixel values that have to be stored by the intra prediction unit 114 may be disadvantageously increased.

[Macroblock Coding Order]

When macroblock adaptive frame/field coding is performed in coding of an interlaced image in H.264/AVC, the order in which macroblocks are decoded changes, which increases the number of pixels necessary for saving.

Figure 7:
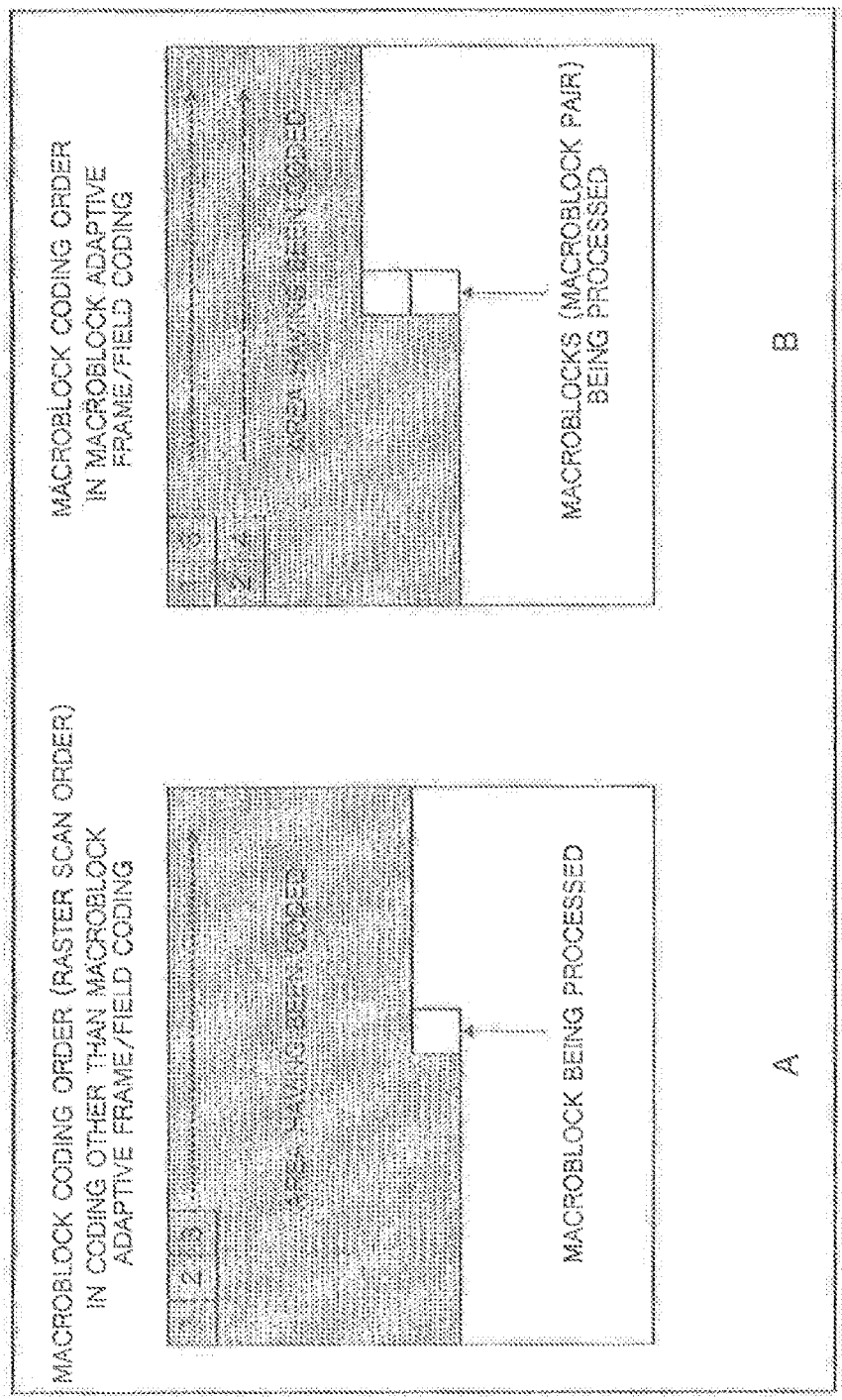
FIG. 7 is a diagram explaining an order in which macroblocks are processed.

For example, the order in which macroblocks are processed in coding other than macroblock adaptive frame/field coding is a raster scan order as illustrated in A of FIG. 7. In contrast, the order in which macro macroblocks are processed in macroblock adaptive frame/field coding is an order as illustrated in B of FIG. 7.

Thus, in this case, pixel values of two lines need to be saved as macroblock pairs in a memory area or a line buffer for intra prediction of a macroblock pair just below. Similarly, 32, which is twice the number, pixel values need to be saved for a pixel value of one right end pixel since the coding is in macroblock pairs.

As described above, the data amount of reconstructed pixel values that have to be processed by the intra prediction unit 114 may also be disadvantageously increased depending on the scanning method (macroblock processing order), for example.

Moreover, the amount of influence of sampling on a decoded image may vary depending on the content of the image (such as presence or absence of edges and texture complexity) and the picture type, for example.

The sampling execution determination unit 122 therefore determines whether or not to make the intra prediction unit 114 perform sampling of reconstructed pixel values to be stored according to the feature of the image.

For example, when the size in the horizontal direction (horizontal size) of an image to be coded is larger than a predetermined threshold, the sampling execution determination unit 122 determines to perform sampling of reconstructed pixel values so as to suppress the increase in the amount of data to be stored by the intra prediction unit 114, and generates control information indicating the determination result. When the horizontal size of an image is equal to or smaller than the predetermined threshold, on the other hand, the sampling execution determination unit 122 determines not to perform sampling of reconstructed pixel values so as to suppress unnecessary image quality degradation, and generates control information indicating the determination result.

Furthermore, for example, when the size in the vertical direction of a macroblock (macroblock size in the vertical direction) is larger than a predetermined threshold (in a case of an extended macroblock, for example), the sampling execution determination unit 122 determines to perform sampling of reconstructed pixel values so as to suppress the increase in the amount of data to be stored by the intra prediction unit 114, and generates control information indicating the determination result. When the macroblock size in the vertical direction is equal to or smaller than the predetermined threshold, (in a case of a macroblock of 16×16 pixels or smaller), on the other hand, the sampling execution determination unit 122 determines not to perform sampling of reconstructed pixel values so as to suppress unnecessary image quality degradation, and generates control information indicating the determination result.

Still further, when the processing order of macroblocks is not the raster scan order, for example, the sampling execution determination unit 122 determines to perform sampling of reconstructed pixel values so as to suppress the increase in the amount of data to be stored by the intra prediction unit 114, and generates control information indicating the determination result. When the processing order of macroblocks is the raster scan order, on the other hand, the sampling execution determination unit 122 determines not to perform sampling of reconstructed pixel values so as to suppress unnecessary image quality degradation, and generates control information indicating the determination result.

Still further, when edge components included in an image, the texture complexity, the frequency of a change in the texture or the like is equal to or beyond a predetermined level, for example, the sampling execution determination unit 122 determines to perform sampling of reconstructed pixel values so as to suppress the increase in the amount of data to be stored by the intra prediction unit 114, and generates control information indicating the determination result. When more edge components are included in an image, the texture is more complex, or the frequency of a change in the texture is higher that the predetermined level, on the other hand, the sampling execution determination unit 122 determines not to perform sampling of reconstructed pixel values so as to suppress unnecessary image quality degradation, and generates control information indicating the determination result.

Still further, when the picture type is P-picture or B-picture, for example, the visual influence of the sampling on a decoded image is relatively small and the sampling execution determination unit 122 therefore determines to perform sampling of reconstructed pixel values so as to suppress the increase in the amount of data to be stored by the intra prediction unit 114, and generates control information indicating the determination result. When the picture type is I-picture, on the other hand, the visual influence of the sampling on a decoded is relatively large and the sampling execution determination unit 122 therefore determines not to perform sampling of reconstructed pixel values, and generates control information indicating the determination result.

Needless to say, the sampling execution determination unit 122 may determine whether or not to perform sampling according to criteria other than the above.

Similarly, the sampling method determination unit 123 determines at what rate the intra prediction unit 114 samples the reconstructed pixel values to be stored according to the feature of an image.

For example, as the size in the horizontal direction (horizontal size) of an image to be coded is larger, the sampling method determination unit 123 determines to reduce the number of pixels to be sampled (increase the number of pixels to be thinned out) so as to more greatly suppress the increase in the amount of data to be stored by the intra prediction unit 114 and generates control information indicating the determination result.

Furthermore, for example, as the size in the vertical direction of a macroblock (macroblock size in the vertical direction) is larger, the sampling method determination unit 123 determines to reduce the number of pixels to be sampled (increase the number of pixels to be thinned out) so as to more greatly suppress the increase in the amount of data to be stored by the intra prediction unit 114 and generates control information indicating the determination result.

Still further, when the processing order of macroblocks is not the raster scan order, for example, the sampling method determination unit 123 determines to reduce the number of pixels to be sampled (increase the number of pixels to be thinned out) so as to more greatly suppress the increase in the amount of data to be stored by the intra prediction unit 114 and generates control information indicating the determination result. When the processing order of macroblocks is the raster scan order, on the other hand, the sampling method determination unit 123 determines to increase the number of pixels to be sampled (reduce the number of pixels to be thinned out) so as to suppress unnecessary image quality degradation as much as possible, and generates control information indicating the determination result.

Still further, as the number of edge components included in an image is larger, as the texture is more complex, or the frequency of a change in the texture is higher, for example, the sampling method determination unit 123 determines to reduce the number of pixels to be sampled (increase the number of pixels to be thinned out) so as to more greatly suppress the increase in the amount of data to be stored by the intra prediction unit 114 and generates control information indicating the determination result.

Still further, when the picture type is P-picture or B-picture, for example, the visual influence of the sampling on a decoded image is relatively small and the sampling method determination unit 123 therefore determines to reduce the number of pixels to be sampled (increase the number of pixels to be thinned out) and generates control information indicating the determination result. When the picture type is I-picture, on the other hand, the visual influence of the sampling on a decoded is relatively large and the sampling method determination unit 123 determines to increase the number of pixels to be sampled (reduce the number of pixels to be thinned out) so as to suppress unnecessary image quality degradation as much as possible, and generates control information indicating the determination result.

Needless to say, the sampling method determination unit 123 may determine the rate of sampling according to criteria other than the above.

Note that the sampling method determination unit 123 also determines the method (manner) of interpolation of sampled reconstructed pixel values (adjacent pixel values) in addition to the sampling method (degree of thinning), generates control information indicating the interpolation, method, and supplies the control information to the intra prediction unit 114.

The intra prediction unit 114 uses the sampled reconstructed pixel values after interpolating the thinned-out pixel values. Any method may be used as the interpolation method. The sampling method determination unit 123 determines the interpolation method according to the content of an image or the throughput of the apparatus, for example.

[Configuration of Intra Prediction Unit]

Figure 8:
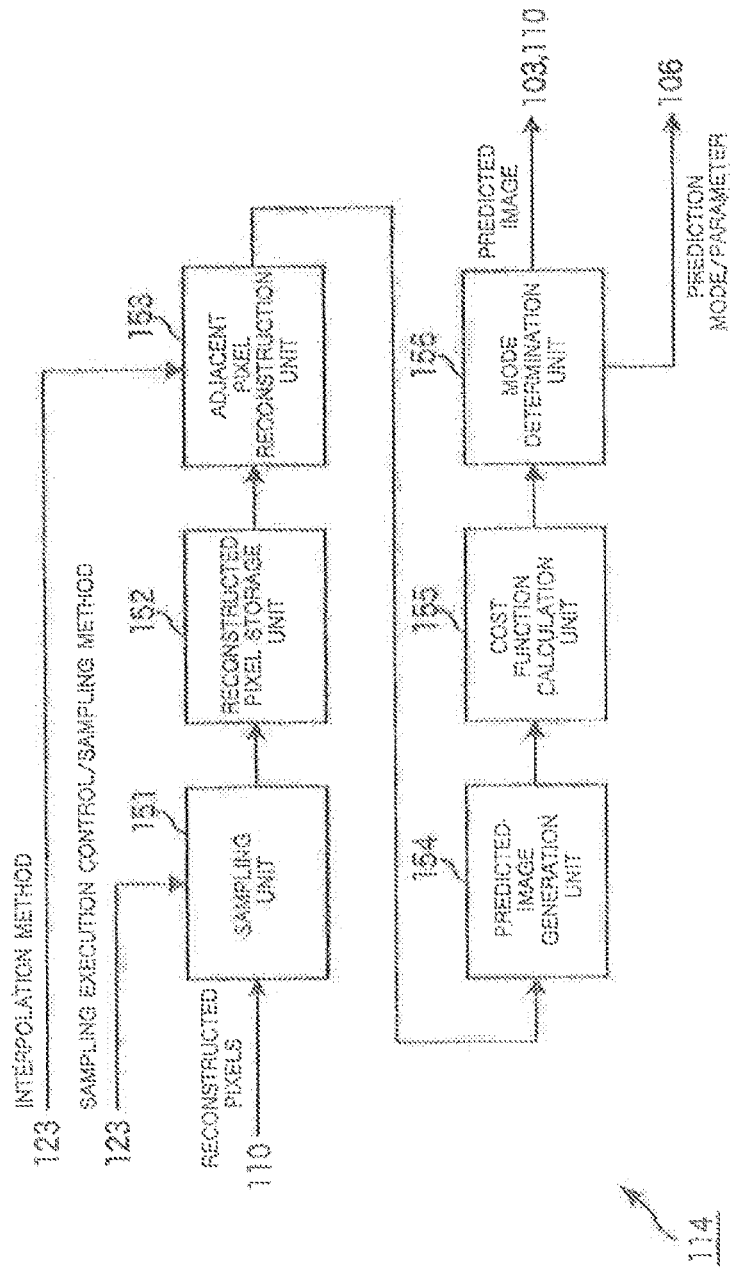
FIG. 8 is a block diagram illustrating an example of a configuration of an intra prediction unit in FIG. 1.

FIG. 8 is a block diagram illustrating an example of a main configuration of the intra prediction unit 114 in FIG. 1. As illustrated in FIG. 8, the intra prediction unit 114 includes a sampling unit 151, a reconstructed pixel storage unit 152, an adjacent pixel reconstruction unit 153, and a predicted image generation unit 154. The intra prediction unit 114 further includes a cost function calculation unit 155 and a mode determination unit 156.

The sampling unit 151 acquires control information indicating whether or not to perform sampling and control information indicating the sampling method supplied from the sampling method determination unit 123, and performs sampling (thinning out) on pixel values to be used for processing of a subsequent macroblock as adjacent pixels among the reconstructed pixel values supplied from supplied from the computing unit 110 according to the pieces of control information. The sampling unit 151 supplies reconstructed pixel values sampled on the basis of the control information (reconstructed pixel values remaining after thinning out by the sampling unit 151) or reconstructed pixel values that are not sampled on the basis of the control information to the reconstructed pixel storage unit 152.

The reconstructed pixel storage unit 152 stores the reconstructed pixel values supplied from the sampling unit 151. The adjacent pixel reconstruction unit 153 reads out pixel values of adjacent pixels of a macroblock to be processed from the reconstructed pixel storage unit 152. When the read pixel values are those sampled by the sampling unit 151, the adjacent pixel reconstruction unit 153 performs interpolation on the read pixel values by an interpolation method specified by the control information supplied from the sampling method determination unit 123 to restore the thinned-out pixel values. The adjacent pixel reconstruction unit 153 supplies adjacent pixel values thus interpolated as necessary to the predicted image generation unit 154.

The predicted image generation unit 154 generates a predicted image of the macroblock to be process by using the supplied adjacent pixel values, and supplies the predicted image to the cost function calculation unit 155. The predicted image generation unit 154 generates predicted images in all intra prediction modes. The adjacent pixel reconstruction unit 153 reads out reconstructed pixels from the reconstructed pixel storage unit 152 as necessary, and supplies the reconstructed pixels as adjacent pixel values to the predicted image generation unit 154.

The cost function calculation unit 155 calculates cost function values for the predicted images generated by the predicted image generation unit 154 for the respective prediction modes of 4×4 pixels, 8×8 pixels and 16×16 pixels.

Note that the cost function values are based on a technique of either a high complexity mode or a low complexity mode. These modes are defined in JM (Joint Model) that is reference software in the H.264/AVC format.

The cost function calculation unit 155 supplies the cost function values calculated as described above to the mode determination unit 156. The mode determination unit 156 selects an optimum intra prediction mode on the basis of the supplied cost function values. Specifically, a mode in which the cost function value is the smallest is selected as the optimum intra prediction mode among the intra prediction modes.

The mode determination unit 156 supplies the predicted image in the prediction mode selected as the optimum intra prediction mode, as necessary, to the computing unit 103 and the computing unit 110 via the selection unit 116. In addition, the mode determination unit 156 supplies information of the prediction mode, as necessary, to the lossless coding unit 106.

[Example of Sampling and Example of Interpolation]

Next, examples of the sampling method and the interpolation method will be described.

Pixels used as adjacent pixels for generation of a predicted image for a subsequent macroblock among reconstructed pixels of each macroblock supplied to the intra prediction unit 114 are the lowermost pixel row and the rightmost pixel column of the macroblock.

A first example of the sampling method is a method of thinning out the lowermost pixel row and the rightmost pixel column of the macroblock at a rate of 1 pixel per two pixels (sampling every other pixel).

Figure 9:
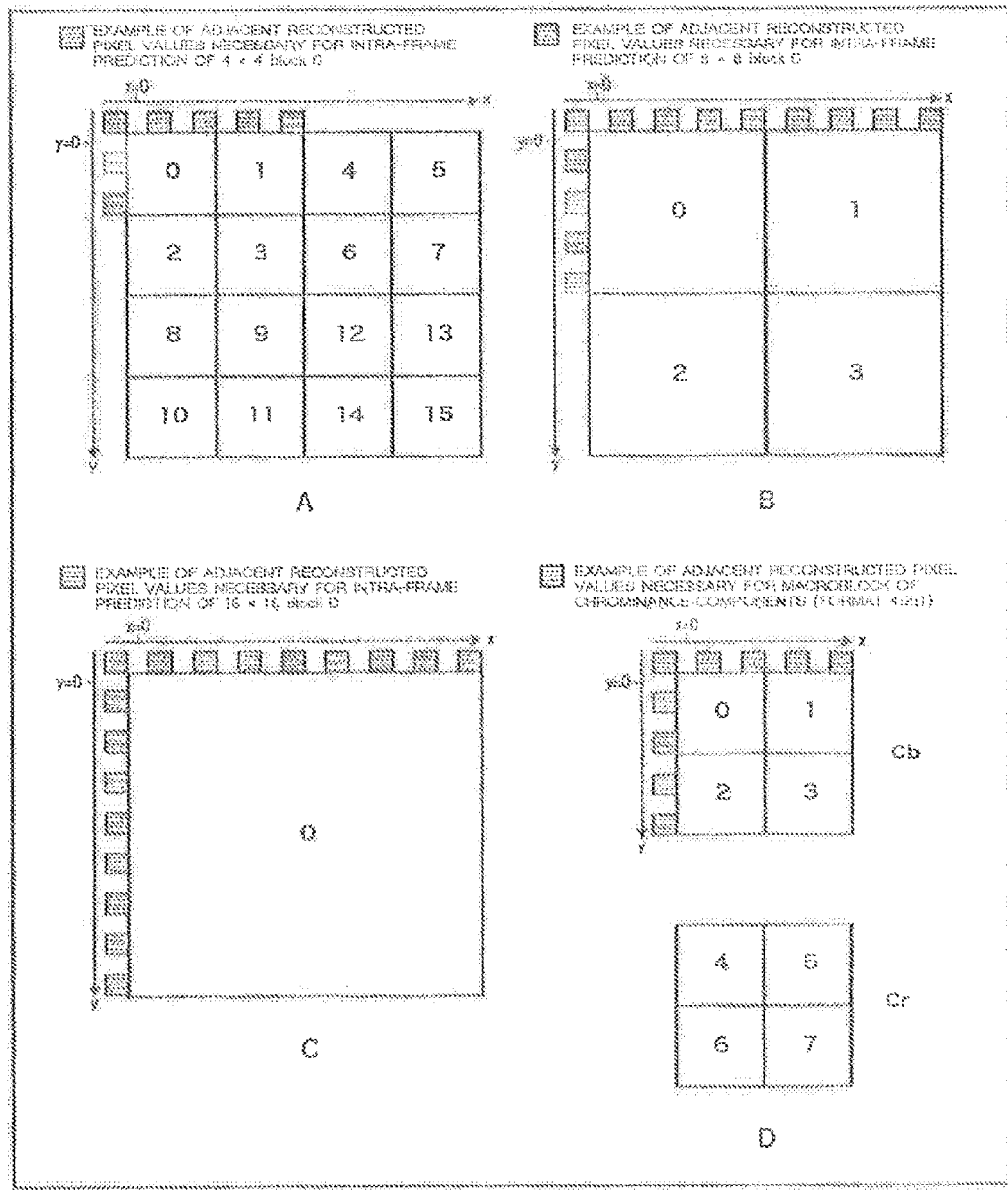
FIG. 9 is a diagram explaining an example of a sampling method.

Examples in which reconstructed pixels sampled by the method of the first example are used as adjacent pixels are illustrated in FIG. 9. White squares illustrated in FIG. 9 represent blocks into which macroblocks are divided. In other words, each square represents a block and an outer frame of a square group represents a macroblock to be processed. Numerals in the squares represent the processing order (block number) within the macroblock. Gray squares represent examples of adjacent pixels to be used for prediction of a block with a block number 0 to be processed first. The adjacent pixels are sampled according to the method of the first example described above.

A of FIG. 9 illustrates an example in which a macroblock (luminance components) to be processed is intra-predicted in the intra 4×4 prediction mode. B of FIG. 9 illustrates an example in which a macroblock (luminance components) to be processed is intra-predicted in the intra 8×8 prediction mode. C of FIG. 9 illustrates an example in which a macroblock (luminance components) to be processed is intra-predicted in the intra 16×16 prediction mode. D of FIG. 9 illustrates an example in which a macroblock (Cb of chrominance components) to be processed is intra-predicted.

As illustrated in FIG. 9, the horizontal direction of the macroblock to be intra-predicted is represented as an x-axis, the vertical direction thereof is represented as a y-axis, and an upper-left end point of the macroblock is represented as a point of origin. The positions p(x, y) of reconstructed pixels to be used as adjacent pixels in intra prediction of a first block that are saved without being thinned out can be expressed as in the following equations (1) to (4). Note that the equation (1) corresponds to A of FIG. 9, the equation (2) corresponds to B of FIG. 9, the equation (3) corresponds to C of FIG. 9, and the equation (4) corresponds to D of FIG. 9.

$$p(2n-1,-1) n=0 \ldots 4, p(-1,2m-1) m=0 \ldots 2 \qquad (1)$$

$$p(2n-1,-1) n=0 \ldots 8, p(-1,2m-1) m=0 \ldots 4 \qquad (2)$$

$$p(2n-1,-1) n=0 \ldots 8, p(-1,2m-1) m=0 \ldots 2 \qquad (3)$$

$$p(2n-1,-1) n=0 \ldots 4, p(-1,2m-1) m=0 \ldots 4 \qquad (4)$$

Specifically, in intra prediction of the first block, the adjacent pixel reconstruction unit 153 reads out reconstructed pixels at positions expressed by one of the equations (1) to (4) described above according to the intra prediction mode as adjacent pixels from the reconstructed pixel storage unit 152.

The adjacent pixel reconstruction unit 153 performs interpolation on the read adjacent pixels by a method as expressed by the following equations (5) to (8), for example.

For x=2n, n=0, 1, 2 . . .

$$p'(x,-1)=\{p(x-1,-1)+p(x+1,-1)\}/2 \quad (5)$$

otherwise, $$p'(x,-1)=p(x,-1) \quad (6)$$

for y=2n, n=0, 1, 2 . . .

$$p'(-1,y)=\{p(-1,y-1)+p(-1,y+1)\}/2 \quad (7)$$

otherwise, $$p'(-1,y)=p(-1,y) \quad (8)$$

Note that a method as expressed by the following equations (9) to (12) can also be considered as another example of the interpolation method. With such a method, the computation amount is reduced and the interpolation processing load is reduced.

For x=2n, n=0, 1, 2 . . .

$$p'(x,-1)=p(x-1,-1) \quad (9)$$

otherwise, $$p'(x,-1)=p(x,-1) \quad (10)$$

for y=2n, n=0, 1, 2 . . .

$$p'(-1,y)=p(-1,y-1) \quad (11)$$

otherwise, $$p'(-1,y)=p(-1,y) \quad (12)$$

Needless to say, an interpolation other than the above may be used as long as the method is determined by the sampling method determination unit 123.

Note that, within a macroblock, the lowermost pixel row and the rightmost pixel column among the intra prediction result of each block are used as adjacent pixels for prediction of a subsequent block. For example, the lowermost pixel row among the prediction result of a block with a block number 0 is used as adjacent pixels in intra prediction of a block with a block number 2. Furthermore, the rightmost pixel column among the prediction result of the block with the block number 0 is used as adjacent pixels in intra prediction of a block with a block number 1, for example.

Since the amount of these pixel values is small and the time for which these pixel values are held is short (only during processing of the macroblock), however, the sampling unit 151 does not sample (thin out) these pixels.

A second example of the sampling method is a method of thinning out only the lowermost pixel row of the macroblock at a rate of 1 pixel per two pixels (sampling every other pixel).

Figure 10:
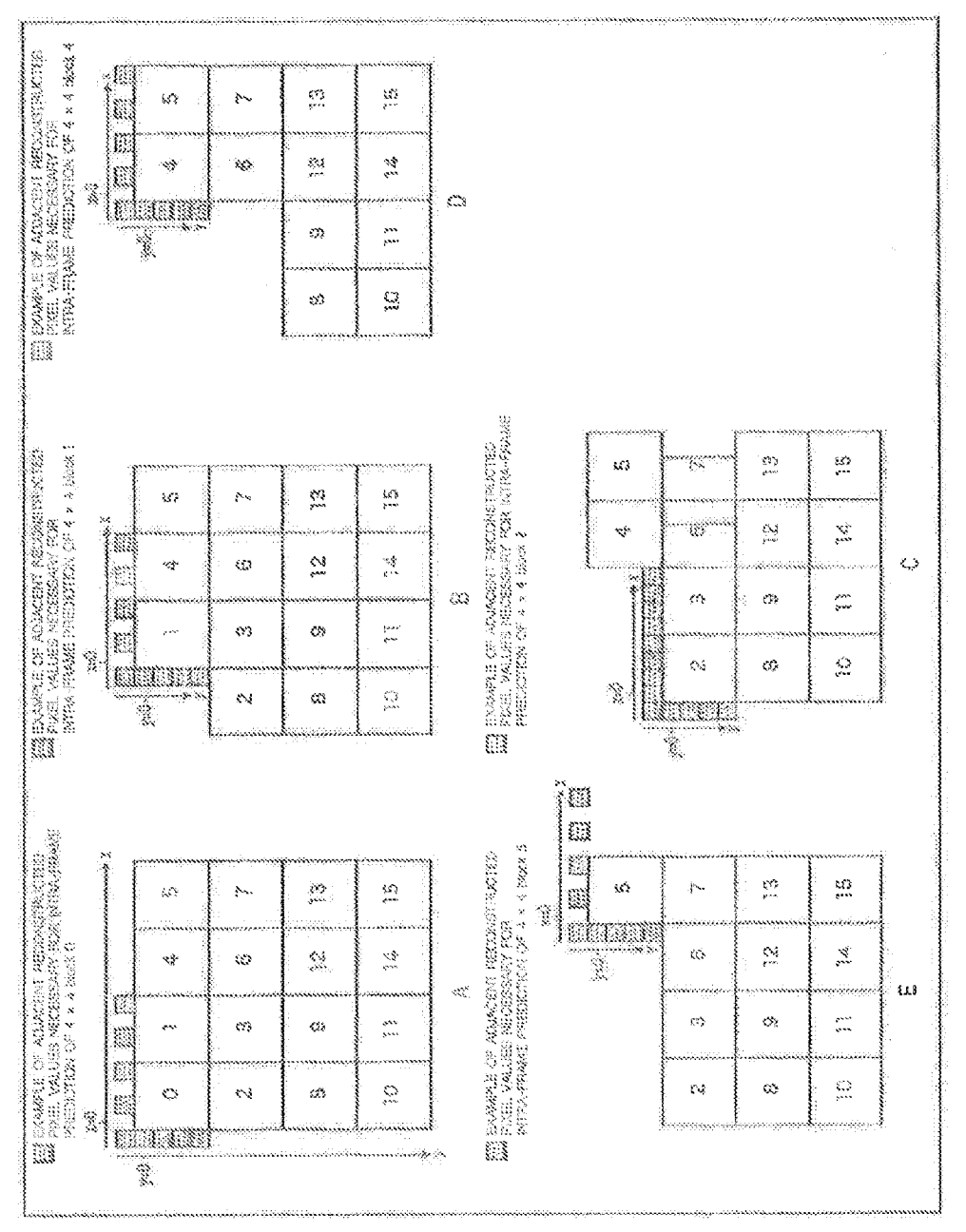

Examples in which reconstructed pixels sampled by the method of the second example are used as adjacent pixels and a macroblock (luminance components) to be processed is intra-predicted in the intra 4×4 prediction mode are illustrated in FIG. 10.

In this case, the positions p(x, y) of reconstructed pixels to be used as adjacent pixels in intra prediction of a first block that are saved without being thinned out can be expressed as in the following equation (13).

$$p(2n-1,-1)n=0\ldots 4, p(-1,m-1)m=0\ldots 4 \quad (13)$$

In intra prediction of a block with a block number 0, adjacent pixels at positions as illustrated in A of FIG. 10 are used. In this case, as illustrated in A of FIG. 10, adjacent pixels arranged in the vertical direction that are adjacent to the left of the block to be processed (block with the block number 0) are reconstructed pixels for the adjacent macroblock, which are thinned out in the examples of FIG. 9 but not thinned out in this example. Therefore, the adjacent pixel reconstruction unit 153 only needs to interpolate upper adjacent pixels.

After prediction of the block with the block number 0 is terminated, intra prediction of a block number 1 is performed next as illustrated in B of FIG. 10.

In intra prediction of the block with the block number 1, adjacent pixels at positions as illustrated in B of FIG. 10 as used. As illustrated in B of FIG. 10, the prediction result of the block with the block number 0 is not thinned out. Therefore, the adjacent pixel reconstruction unit 153 only needs to interpolate upper adjacent pixels.

After prediction of the block with the block number 1 is terminated, intra prediction of a block number 2 is performed next as illustrated in C of FIG. 10.

In intra prediction of the block with the block number 2, adjacent pixels at positions as illustrated in C of FIG. 10 are used. Specifically, since the lowermost row of the prediction result of the block with the block number 0 and the lowermost pixel row of the prediction result of the block with the block number 1 are used as adjacent pixels, these adjacent pixels are not thinned out. In addition, similarly to the case in A of FIG. 10, adjacent pixels arranged in the vertical direction that are adjacent to the left of the block to be processed (block with the block number 2) are not thinned out. Therefore, the adjacent pixel reconstruction unit 153 does not perform interpolation of adjacent pixels.

D in FIG. 10 and E in FIG. 10 illustrate a case of intra prediction of a block number 4 and a case of intra prediction of a block number 5, respectively. In these cases, since the positions of adjacent pixels as the same as those in the cases of A in FIG. 10 and B in FIG. 10, the adjacent pixel reconstruction unit 153 only needs to interpolate upper adjacent pixels.

Figure 11:
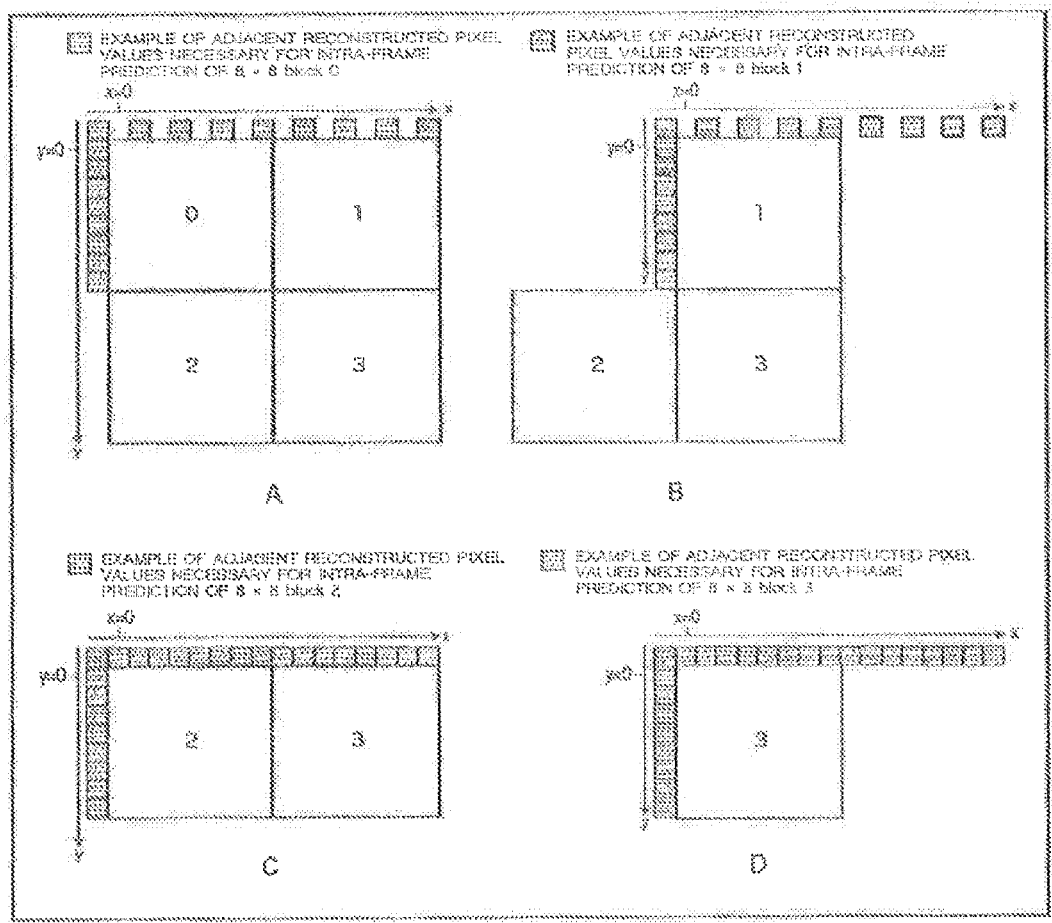
FIG. 11 is a diagram explaining still another example of the sampling method.

FIG. 11 is a diagram illustrating a case of intra prediction in the intra 8×8 prediction mode.

After prediction of a block with a block number 0 is performed as illustrated in A of FIG. 11, prediction of a block with a block number 1 is performed as illustrated in B of FIG. 11, prediction of a block with a block number 2 is then performed as illustrated in C of FIG. 11, and finally, prediction of a block with a block number 3 is performed as illustrated in FIG. 11.

In this case, as illustrated in A of FIG. 11 and B of FIG. 11, the adjacent pixel reconstruction unit 153 interpolates only upper adjacent pixels in prediction of the block number 0 and the block number 1. In contrast, as illustrated in C of FIG. 11 and D of FIG. 11, the adjacent pixel reconstruction unit 153 does not perform interpolation of adjacent pixels in prediction of the block number 2 and the block number 3.

With this method, the image coding apparatus 100 can reduce the capacity of the memory area or the line buffer to save one lowermost line of a macroblock and also suppress degradation in image quality by saving the same number of adjacent reconstructed pixels as conventional methods for the other pixels.

A third example of the sampling method is a method of thinning out only a lowermost pixel row of a macroblock at a rate of three pixels per four pixels (sampling every fourth pixel).

Figure 12:
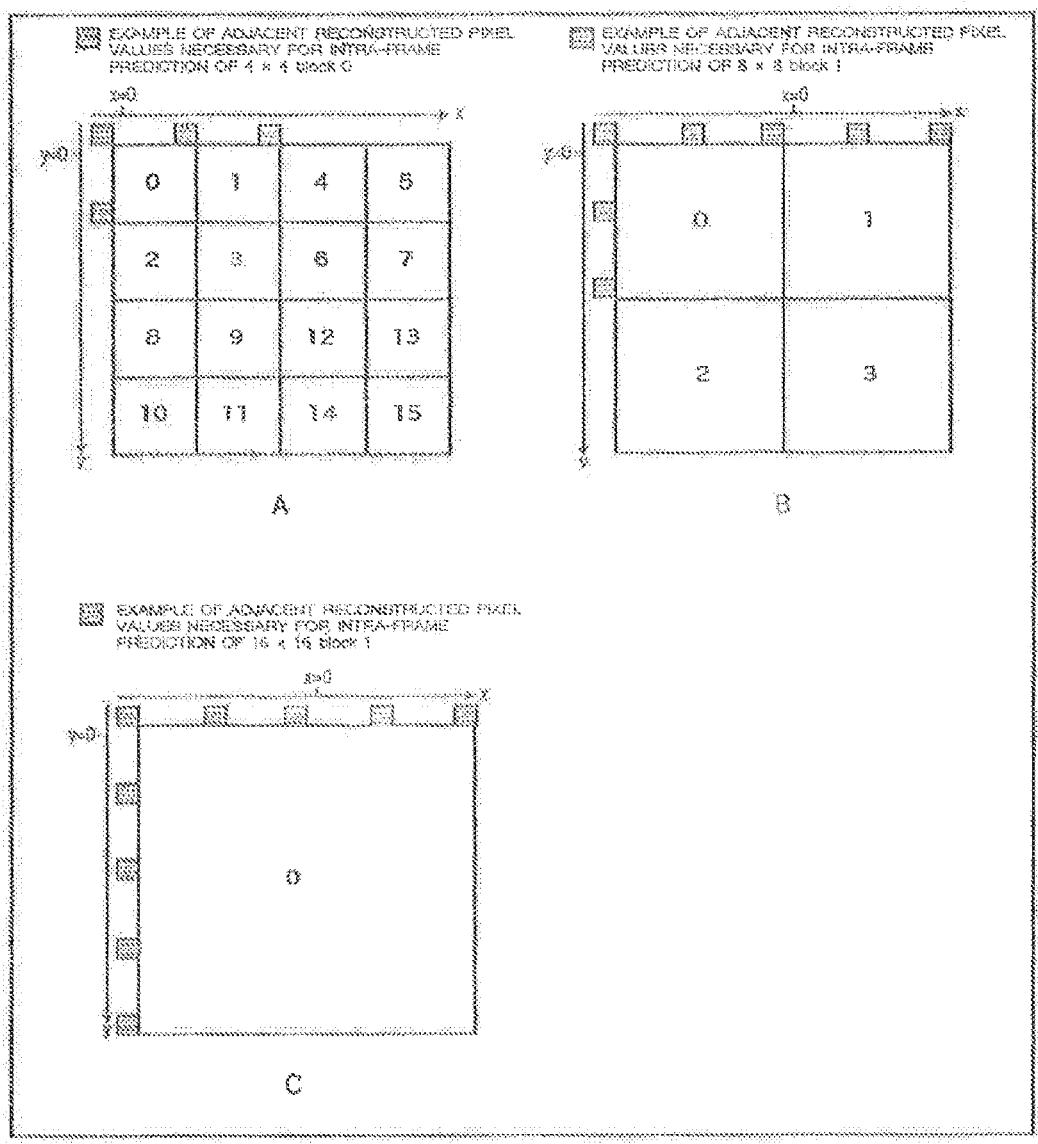
FIG. 12 is a diagram explaining still another example of the sampling method.

Examples in which reconstructed pixels sampled by the method of the third example are used are illustrated in FIG. 12.

A of FIG. 12 illustrates an example in which a macroblock (luminance components) to be processed is intra-predicted in the intra 4×4 prediction mode. B of FIG. 12 illustrates an example in which a macroblock (luminance components) to be processed is intra-predicted in the intra 8×8 prediction mode. C of FIG. 12 illustrates an example in which a macroblock (luminance components) to be processed is intra-predicted in the intra 16×16 prediction mode.

As illustrated in FIG. 12, the positions p(x, y) of reconstructed pixels to be used as adjacent pixels in intra prediction of a first block that are saved without being thinned out can be expressed as in the following equations (14) to (17). Note that the equation (14) corresponds to A of FIG. 12, the equation (15) corresponds to B of FIG. 12, and the equation (16) corresponds to C of FIG. 12.

$$p(4n-1,-1) n=0 \ldots 2, p(-1,4m-1) m=0,1 \quad (14)$$

$$p(4n-1,-1) n=0 \ldots 4, p(-1,4m-1) m=0 \ldots 2 \quad (15)$$

$$p(4n-1,-1) n=0 \ldots 4, p(-1,4m-1) m=0 \ldots 4 \quad (16)$$

$$p(4n-1,-1) n=0 \ldots 2, p(-1,4m-1) m=0 \ldots 2 \quad (17)$$

In this case, the adjacent pixel reconstruction unit 153 interpolates thinned-out adjacent pixels as expressed by the following equations (18) to (25), for example.
For x=4n, n=0, 1, 2 ..., $$p'(x,-1)=(p(x-1,-1)\times 3 + p(x+3,-1))/4 \quad (18)$$

for x=4n+1, n=0, 1, 2 ..., $$p'(x,-1)=(p(x-2,-1)+p(x+2,-1))/2 \quad (19)$$

for x=4n+2, n=0, 1, 2 ..., $$p'(x,-1)=(p(x-3,-1)+p(x+1,-1)\times 3)/2 \quad (20)$$

otherwise, $$p'(x,-1)=p(x,-1) \quad (21)$$

for y=4n, n=0, 1, 2 ..., $$p'(-1,y)=\{p(-1,y-1)\times 3 + p(-1,y+3)\}/4 \quad (22)$$

for y=4n+1, n=0, 1, 2 ..., $$p'(-1,y)=\{p(-1,y-2)+p(-1,y+2)\}/2 \quad (23)$$

for y=4n+2, n=0, 1, 2 ..., $$p'(-1,y)=\{p(-1,y-3)+p(-1,y+1)\times 3\}/4 \quad (24)$$

otherwise, $$p'(-1,y)=p(-1,y) \quad (25)$$

According to this method, the coding efficiency may be lowered as compared to the aforementioned method since the amount of thinned-out pixels is large but the capacity of the memory area or the line buffer required for saving adjacent pixels can be greatly reduced.

As described above, the adjacent pixel reconstruction unit 153 interpolates adjacent pixels by an appropriate method only when reconstructed pixels stored in the reconstructed pixel storage unit 152 are thinned out. Accordingly, the predicted image generation unit 154 can appropriately generate a predicted image whatever method is used to sample reconstructed pixels.

[Coding Process]

Next, flows of processes performed by the image coding apparatus 100 as described above will be described. First, an example of a flow of a coding process will be described with reference to a flowchart of FIG. 13.

In step S101, the A/D conversion unit 101 A/D converts an input image. In step S102, the feature quantity extraction unit 121 extracts a feature quantity of the A/D converted image. In step S103, the sampling execution unit 122 determines whether or not to perform sampling of reconstructed pixel values on the basis of at least one of the horizontal size of the image and the macroblock size in the vertical direction extracted as the feature quantity of the image.

In step S104, if it is determined in step S103 to perform sampling, the sampling method determination unit 123 determines a sampling method therefor on the basis of at least one of the horizontal size of the image and the image and the macroblock size in the vertical direction extracted as the feature quantity of the image.

In step S105, the frame rearrangement buffer 102 stores the image supplied from the A/D conversion unit 101 and rearranges the pictures from the displaying order to the coding order.

In step S106, each of the intra prediction unit 114 and the motion prediction/compensation unit 115 performs prediction of the image. Specifically, in step S106, the intra prediction unit 114 performs an intra prediction process in an intra prediction mode. The motion prediction/compensation unit 115 performs a motion prediction/compensation process in an inter prediction mode.

In step S107, the selection unit 116 determines an optimum prediction mode on the basis of cost function values output from the intra prediction unit 114 and the motion prediction/compensation unit 115. Specifically, the selection unit 116 selects either one of the predicted image generated by the intra prediction unit 114 and the predicted image generated by the motion prediction/compensation unit 115.

Then, the selection information of the predicted image is supplied to the intra prediction unit 114 or the motion prediction/compensation unit 115. When the predicted image in the optimum intra prediction mode is selected, the intra prediction unit 114 supplies information indicating the optimum intra prediction mode (namely, intra prediction mode information) to the lossless coding unit 106.

Note that when sampling of reconstructed pixels is to be performed in the intra prediction, the intra prediction unit 114 supplies information containing notification that sampling is to be performed and specification of the sampling method and the interpolation method to the lossless coding unit 106.

When the predicted image in the optimum inter prediction mode is selected, the motion prediction/compensation unit 115 outputs information indicating the optimum inter prediction mode and information according to the optimum inter prediction mode, as necessary, to the lossless coding unit 106. Examples of the information according to the optimum inter prediction mode includes motion vector information, flag information and reference frame information.

In step S108, the computing unit 103 computes the difference between the image obtained by rearrangement in step S105 and the predicted image obtained by the prediction process in step S106. The predicted image is supplied to the computing unit 103 from the motion prediction/compensation unit 115 when inter prediction is performed or from the intra prediction unit 114 when intra prediction is performed via the selection unit 116 in either case.

The amount of data for the difference data is reduced as compared to that for the original image data. The amount of data can therefore be compressed as compared to a case where the image is coded without any change.

In step S109, the orthogonal transform unit 104 performs orthogonal transform on the difference information supplied from the computing unit 103. Specifically, orthogonal transform such as discrete cosine transform or Karhunen-Loeve transform is performed and a transform coefficient is output. In step S110, the quantization unit 105 quantizes the transform coefficient.

In step S111, the lossless coding unit 106 codes the quantized transform coefficient output from the quantization unit 105. Specifically, lossless coding such as variable length coding or arithmetic coding is performed on the difference image (second difference image in the case of inter).

Note that the lossless coding unit 106 codes the information relating to the prediction mode of the predicted image selected in the process of step S104 and adds the coded information to header information of coded data obtained by coding the difference image.

In other words, the lossless coding unit 106 also codes the intra prediction mode information supplied from the intra prediction unit 114 or the information according to the optimum inter prediction mode supplied from the motion prediction/compensation unit 115 and adds the coded information to the header information. In addition, when notification that sampling is to be performed, specification of the sampling method and the interpolation method and the like are supplied from the intra prediction unit 114, the lossless coding unit 106 also adds such information to the header information or the like of the coded data.

In step S112, the accumulation buffer 107 accumulates the coded data output from the lossless coding unit 106. The coded data accumulated in the accumulation buffer 107 are read out as appropriate and transmitted to the decoding side via a transmission channel.

In step S113, the rate control unit 117 controls the quantization rate of the quantization unit 105 on the basis of the compressed images accumulated in the accumulation buffer 107 so as not to cause overflow or underflow.

In addition, the difference information quantized in the process of step S110 is locally decoded as follows. Specifically, in step S114, the inverse quantization unit 108 inversely quantizes the transform coefficient quantized by the quantization unit 105 with a characteristic corresponding to that of the quantization unit 105. In step S115, the inverse orthogonal transform unit 109 performs inverse orthogonal transform on the transform coefficient that is inversely quantized by the inverse quantization unit 108 with a characteristic corresponding to that of the orthogonal transform unit 104.

In step S116, the computing unit 110 adds the predicted image input via the selection unit 116 to the locally decoded difference information to generate reconstructed pixels that are a locally decoded image (image corresponding to the input to the computing unit 103).

In step S117, the intra prediction unit 114 stores the reconstructed pixels generated in step S116.

In step S118, the deblocking filter 111 filters the image output from the computing unit 110. As a result, block distortion is removed. In step S119, the frame memory 112 stores the filtered image.

[Prediction Process]

Figure 13:
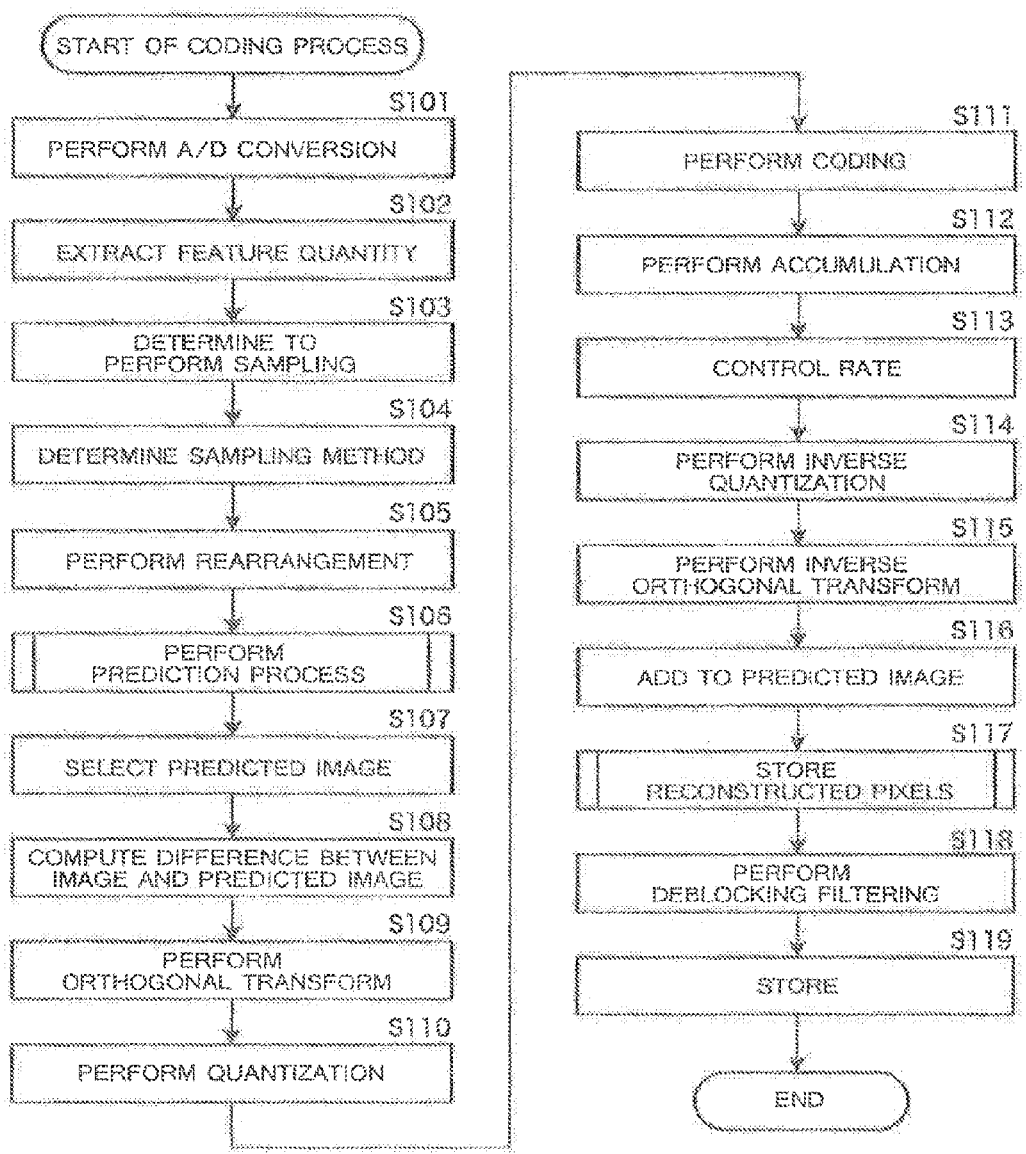
FIG. 13 is a flowchart explaining an example of a flow of a coding process.

Next, an example of a flow of the prediction process performed in step S106 in FIG. 13 will be described with reference to a flowchart of FIG. 14.

In step S131, the intra prediction unit 114 intra-predicts pixels of a block to be processed in all candidate intra prediction modes.

When the image to be processed supplied from the frame rearrangement buffer 102 is an image to be inter processed, an image to be referred to is read out from the frame memory 112 and supplied to the motion prediction/compensation unit 115. In step S132, the motion prediction/compensation unit 115 performs an inter motion prediction process on the basis of these images. Specifically, the motion prediction/compensation unit 115 refers to the image supplied from the frame memory 112 and performs the motion prediction process in all the candidate inter prediction modes.

In step S133, the motion prediction/compensation unit 115 determines a prediction mode providing the smallest cost function value among cost function values for the inter prediction modes calculated in step S132 as the optimum inter prediction mode. Then, the motion prediction/compensation unit 115 supplies the difference between the image to be inter processed and the second difference information generated in the optimum inter prediction mode and the cost function value of the optimum inter prediction mode to the selection unit 116.

[Intra Prediction Process]

Figure 14:
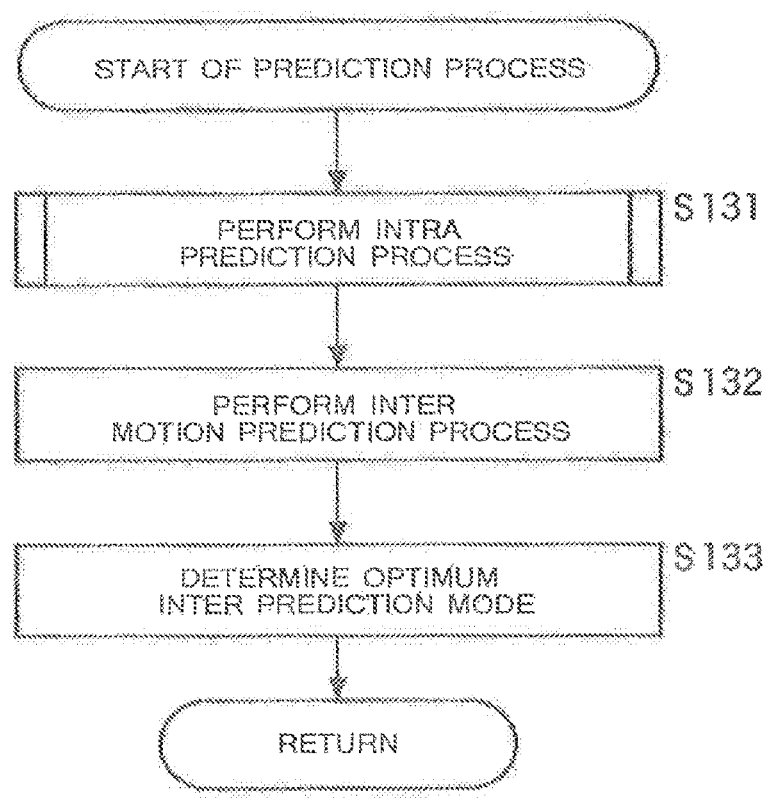
FIG. 14 is a flowchart explaining an example of a flow of a prediction process.
Figure 15:
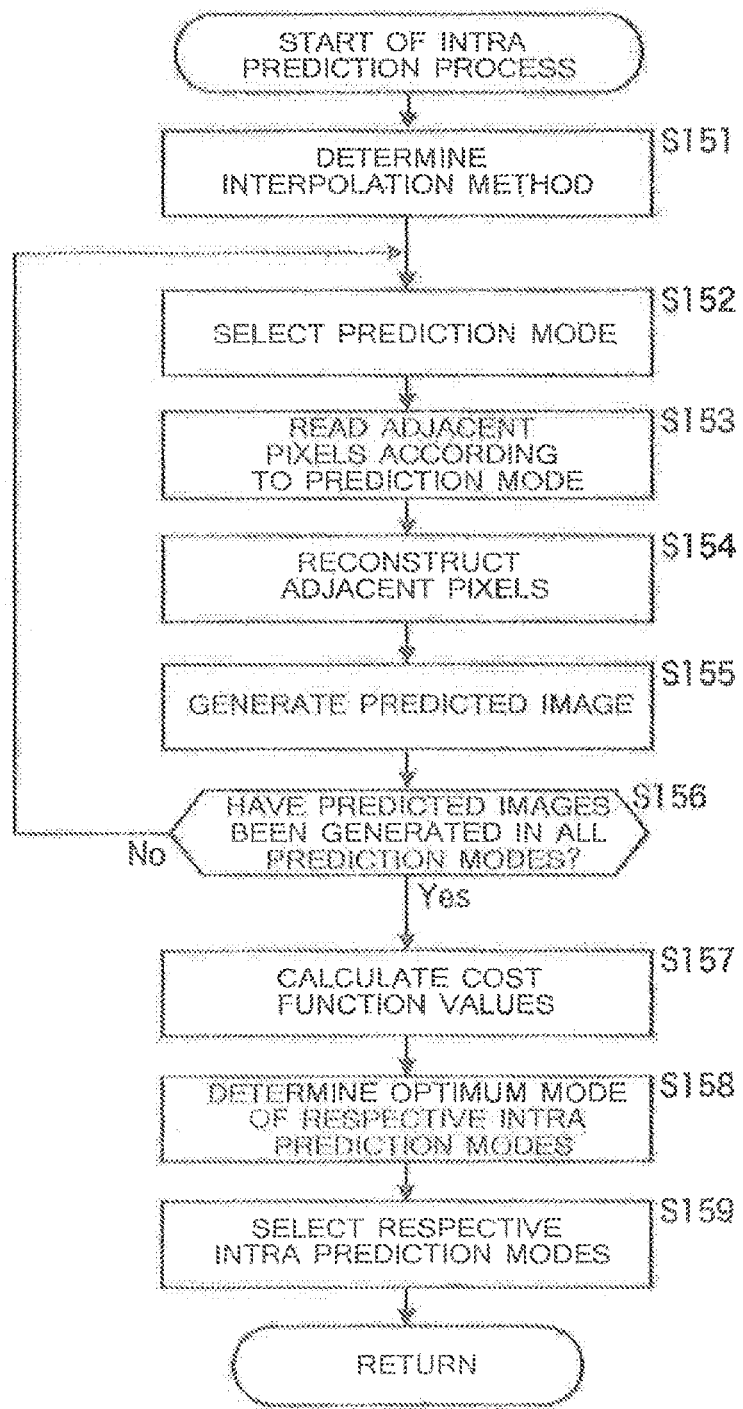
FIG. 15 is a flowchart explaining an example of a flow of an intra prediction process.

FIG. 15 is a flowchart explaining an example of a flow of the intra prediction process performed in step S131 in FIG. 14.

When the intra prediction process is started, the adjacent pixel reconstruction unit 153 determines the interpolation method according to specification by the sampling method determination unit 123 in step S151. In step S152, the predicted image generation unit 154 selects a prediction mode to be performed from unprocessed prediction modes. In step S153, the adjacent pixel reconstruction unit 153 reads out adjacent pixels from the reconstructed pixel storage unit 152 according to the prediction mode selected in step S152.

In step S154, the adjacent pixel reconstruction unit 153 performs an interpolation process on the read adjacent pixels as necessary to reconstruct adjacent pixels to be used for prediction. In step S155, the predicted image generation unit 154 generates a predicted image by using the adjacent pixels reconstructed in step S154.

In step S156, the predicted image generation unit 154 determines whether or not predicted images are generated in all the prediction modes, and if it is determined that a prediction mode in which a prediction image is not generated is present, the process returns to step S152 and subsequent processing is repeated.

In other words, as a result of repeating the processing from step S152 to step S156, the predicted image generation unit 154 generates predicted images in all the prediction modes. If it is determined in step S156 that predicted images in all the predicted modes are generated, the predicted image generation unit 154 proceeds the process to step S157.

In step S157, the cost function calculation unit 155 calculates cost function values for the respective prediction modes.

In step S158, the mode determination unit 156 determines an optimum mode of the respective intra prediction modes on the basis of the cost function values of the respective modes calculated in the process of step S157.

In step S159, the mode determination unit 156 selects an optimum intra prediction mode on the basis of the cost function values of the respective modes calculated in the process of step S157.

The mode determination unit 156 supplies the predicted image generated in the mode selected as the optimum intra prediction mode to the computing unit 103 and the computing unit 110. The mode determination unit 156 also supplies information indicating the selected prediction mode, notification that sampling is to be performed, specification of the sampling method and the interpolation method and the like to the lossless coding unit 106.

After the process in step S159 is terminated, the intra prediction unit 114 returns the process to FIG. 14 and performs processing in step S132 and subsequent steps.

[Reconstructed Pixel Storage Process]

Next, an example of a flow of the reconstructed pixel storage process performed in step S117 in FIG. 13 will be described with reference to a flowchart of FIG. 16.

When the reconstructed pixel storage process is started, the sampling unit 151 determines in step S171 whether or not to perform sampling on the reconstructed pixels to be stored in the reconstructed pixel storage unit 152 on the basis of the notification supplied from the sampling method determination unit 123. If it is determined to perform sampling, the sampling unit 151 proceeds the process to step S172.

In step S172, the sampling unit 151 determines the sampling method for the reconstructed pixels on the basis of the notification supplied from the sampling method determination unit 123. In step S173, the sampling unit 151 samples pixels at the right end and the bottom of each supplied macroblock among the reconstructed pixels of the macroblock.

In step S174, the reconstructed pixel storage unit 152 stores the reconstructed pixels sampled in step S173 (remaining reconstructed pixel after thinning out). After the processing in step S174 is terminated, the intra prediction unit 114 terminates the reconstructed pixel storage process, returns the process to step S117 in FIG. 13 and proceeds the process to step S118.

Figure 16:
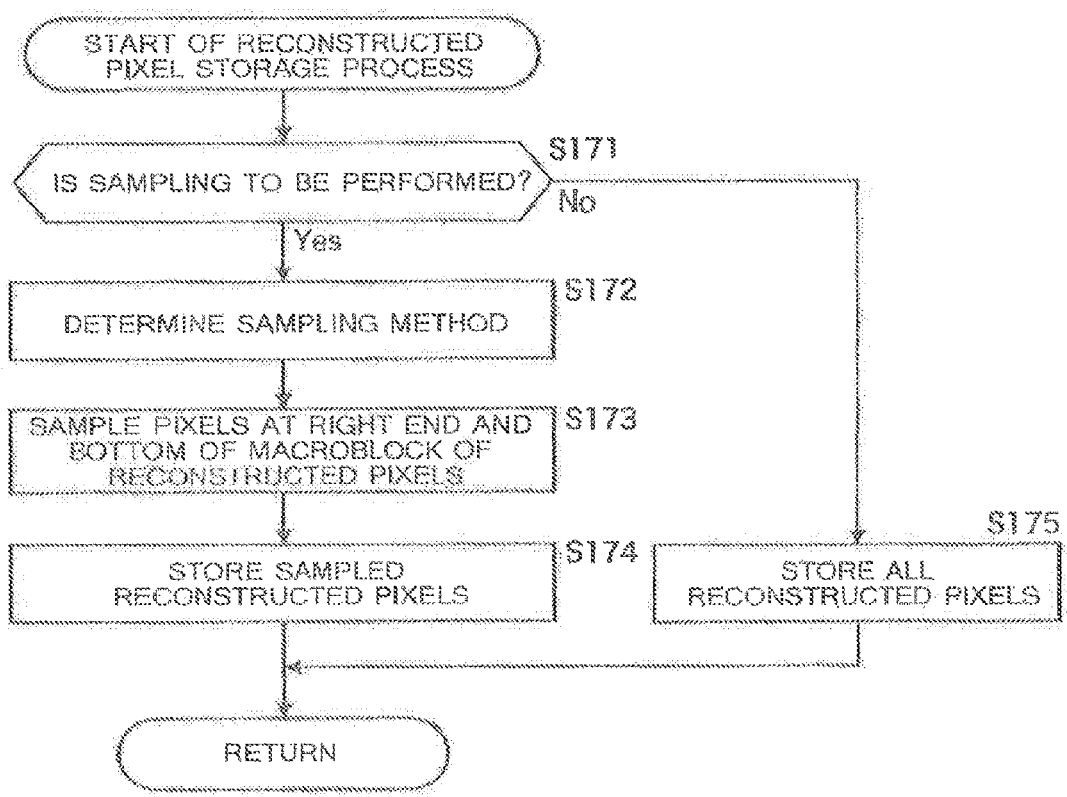
FIG. 16 is a flowchart explaining an example of a flow of a reconstructed pixel storage process.

If it is determined in step S171 in FIG. 16 not to perform sampling, the sampling unit 151 proceeds the process to step S175. In step S175, the reconstructed pixel storage unit 152 stores all the pixels at the right end and the bottom of each supplied macroblock among the reconstructed pixels of the macroblock. After the processing in step S175 is terminated, the intra prediction unit 114 terminates the reconstructed pixel storage process, returns the process to step S117 in FIG. 13 and proceeds the process to step S118.

As described above, the image coding apparatus 100 can realized intra-frame prediction with a smaller amount of memory by sampling reconstructed pixels to be used for the intra prediction. As a result, the image coding apparatus 100 can realize a smaller size of the apparatus and a reduction in the cost and power consumption.

Note that the sizes of the blocks described above are exemplary only and the sizes may be other than those described above. Moreover, although the notification that sampling is to be performed, specification of the sampling method and the interpolation method and the like are described above as being multiplexed into the header information of the coded data as a method for transmitting such information, the information may be stored anywhere. For example, the information may be stored in a parameter set such as SEI (Supplemental Enhancement Information) (a header of a sequence or a picture, for example). Alternatively, the information may be transmitted from the image coding apparatus to the image decoding apparatus separately from the coded data (as a separate file).

Note that control on whether or not to perform sampling and control on the method thereof and the like may be performed in arbitrary processing units. For example, the control may be performed in units of pictures or in units of sequences. Needless to say, the control may be performed in processing units other than these units.

2. Second Embodiment

[Image Decoding Apparatus]

Coded data coded by the image coding apparatus 100 described in the first embodiment are transmitted to an image decoding apparatus associated with the image coding apparatus 100 via a predetermined transmission channel and decoded.

Figure 17:
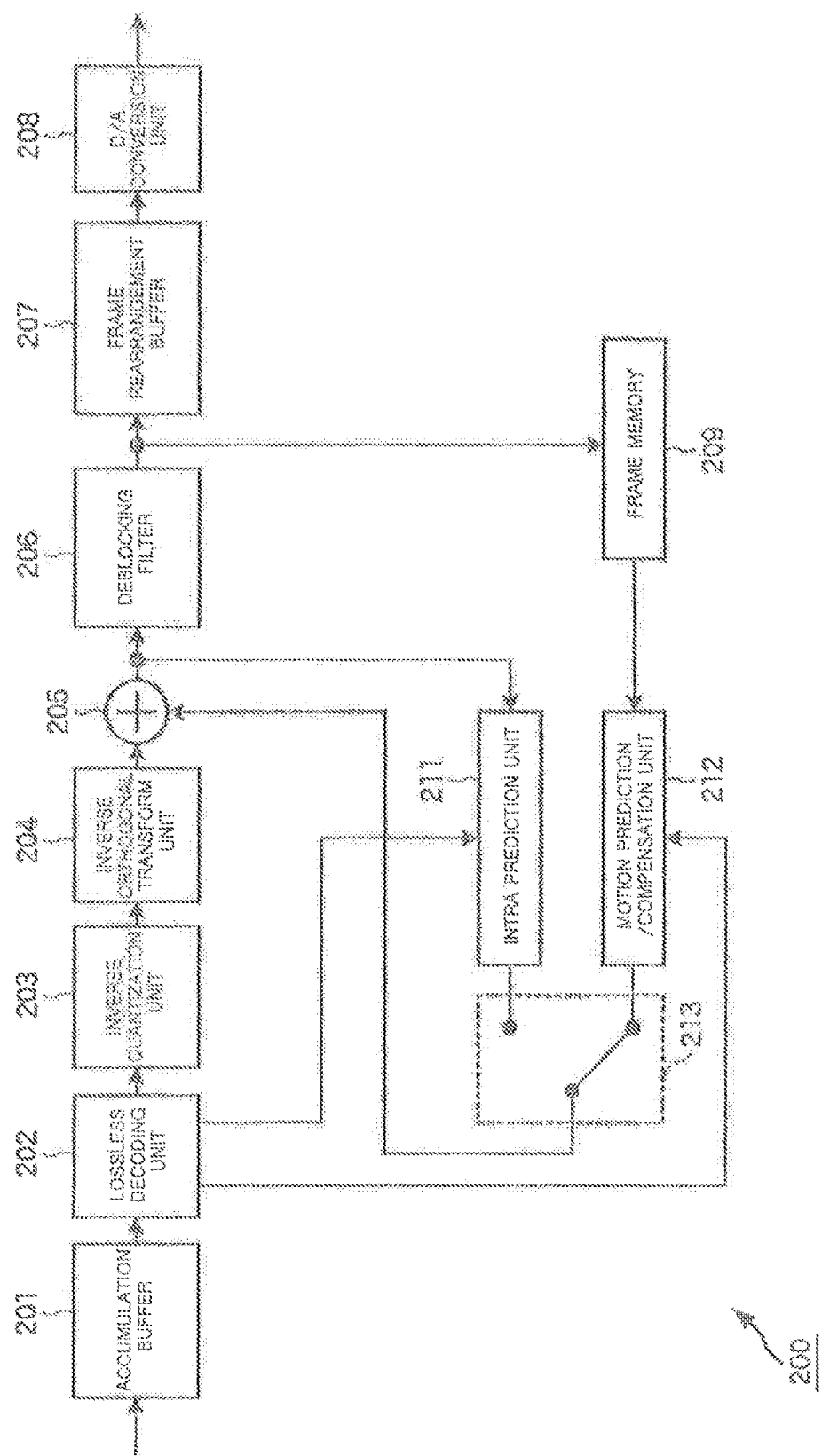
FIG. 17 is a block diagram illustrating an example of a main configuration of an image decoding apparatus.

The image decoding apparatus will be described below. FIG. 17 is a block diagram illustrating an example of a main configuration of the image decoding apparatus.

As illustrated in FIG. 17, the image decoding apparatus 200 includes an accumulation buffer 201, a lossless decoding unit 202, an inverse quantization unit 203, an inverse orthogonal transform unit 204, a computing unit 205, a deblocking filter 206, a frame rearrangement buffer 207 and a D/A conversion unit 208. In addition, the image decoding apparatus 200 further includes a frame memory 209, an intra prediction unit 211, a motion prediction/compensation unit 212 and a selection unit 213.

The accumulation buffer 201 accumulates coded data being transmitted. The coded data are data coded by the image coding apparatus 100. The lossless decoding unit 202 decodes the coded data read out from the accumulation buffer 201 at a predetermined timing in a method corresponding to the coding method of the lossless coding unit 106 in FIG. 1.

The inverse quantization unit 203 inversely quantizes coefficient data obtained by decoding by the lossless decoding unit 202 in a method corresponding to the quantization method of the quantization unit 105 in FIG. 1. The inverse quantization unit 203 supplies the inversely quantized coefficient data to the inverse orthogonal transform unit 204. The inverse orthogonal transform unit 204 performs inverse orthogonal transform on the coefficient data in a method corresponding to the orthogonal transform method of the orthogonal transform unit 104 in FIG. 1 to obtain decoded residual data corresponding to the residual data before performing the orthogonal transform in the image coding apparatus 100.

The decoded residual data obtained by performing the inverse orthogonal transform are supplied to the computing unit 205. In addition, a predicted image is also supplied to the computing unit 205 from the intra prediction unit 211 or the motion prediction/compensation unit 212 via the selection unit 213.

The computing unit 205 adds the decoded residual data and the predicted image to obtain decoded image data corresponding to the image data before the predicted image is subtracted by the computing unit 103 of the image coding apparatus 100. The computing unit 205 supplies the decoded image data to the intra prediction unit 211 and the deblocking filter 206.

The deblocking filter 206 removes block distortion of the decoded image and then supplies and accumulates the decoded image to/in the frame memory 209 and also supplies the decoded image to the frame rearrangement buffer 207.

The frame rearrangement buffer 207 performs rearrangement of the image. Specifically, the frames rearranged in the coding order by the frame rearrangement buffer 102 in FIG. 1 are rearranged in the original displaying order. The D/A conversion unit 208 D/A converts the image supplied from the frame rearrangement buffer 207, outputs the converted image to a display that is not illustrated, and displays the image thereon.

The information indicating the intra prediction mode, the notification that sampling is to be performed, the specification of the sampling method and the interpolation method and the like obtained by decoding the header information are supplied as appropriate to the intra prediction unit 211 from the lossless decoding unit 202. The intra prediction unit 211 performs interpolation of adjacent pixels as necessary generates a predicted image and supplies the generated predicted image to the selection unit 213 on the basis of such information.

The motion prediction/compensation unit 212 obtains information (prediction mode information, motion vector information, reference frame information) obtained by decoding the header information from the lossless decoding unit 202. When the information indicating the inter prediction mode is supplied, the motion prediction/compensation unit 212 obtains a reference image from the frame memory 209, on the basis of the inter motion vector information from the lossless decoding unit 202, generates a predicted image by using the reference image and the motion vector information and supplies the generated predicted image to the selection unit 213.

The selection unit 213 selects the predicted image generated by the motion prediction/compensation unit 212 or the intra prediction unit 211 and supplies the selected predicted image to the computing unit 205.

[Intra Prediction Unit]

Figure 18:
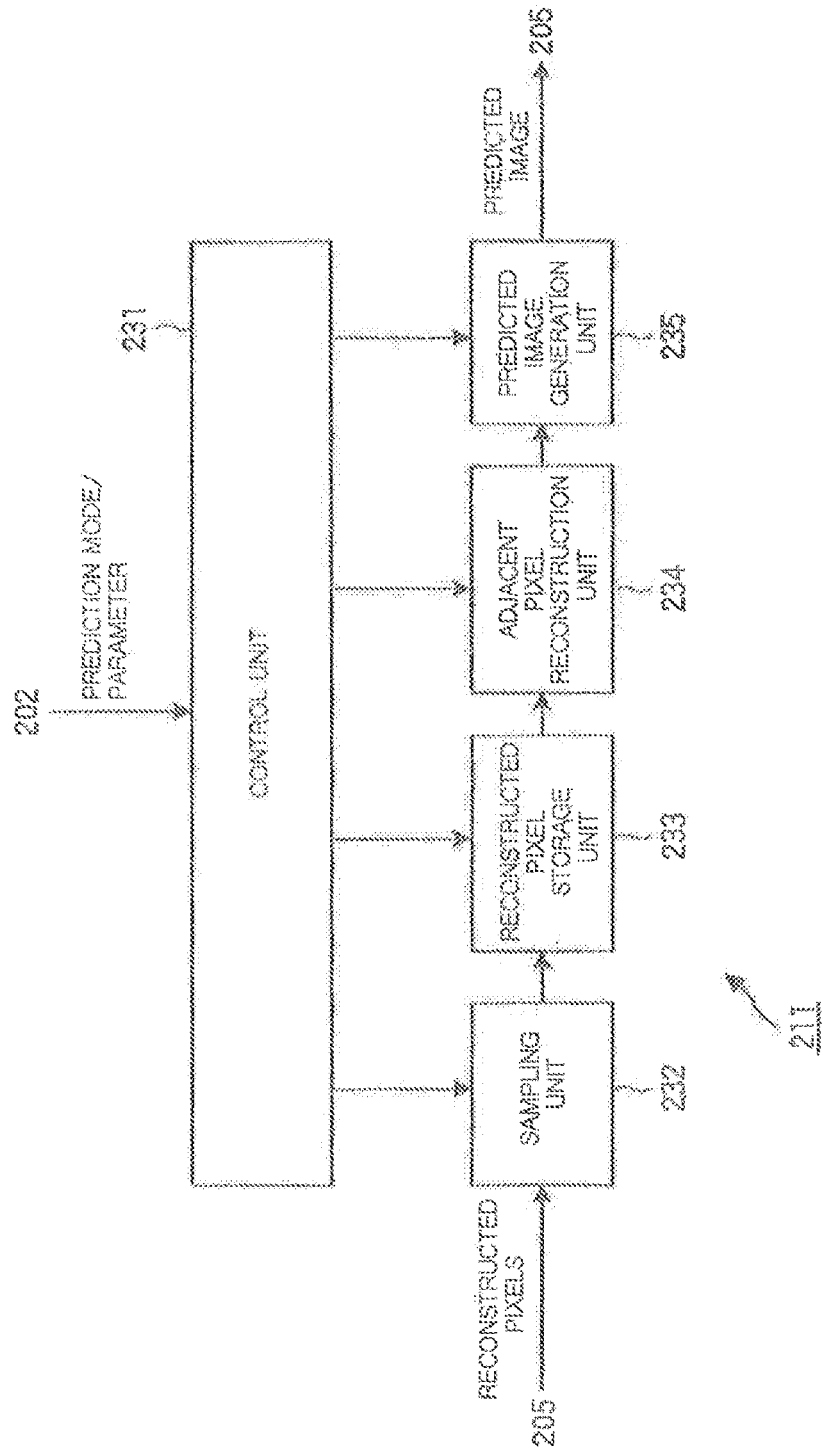
FIG. 18 is a block diagram illustrating an example of a main configuration of an intra prediction unit in FIG. 17.

FIG. 18 is a block diagram illustrating an example of a main configuration of the intra prediction unit 211 in FIG. 17.

As illustrated in FIG. 18, the intra prediction unit 211 includes a control unit 231, a sampling unit 232, a reconstructed pixel storage unit 233, an adjacent pixel reconstruction unit 234, and a predicted image generation unit 235.

The control unit 231 controls the respective units from the sampling unit 232 to the predicted image generation unit 235 on the basis of the prediction mode, the notification that sampling is to be performed, the specification of the sampling method and the interpolation method and the like supplied from the lossless decoding unit 202, and performs sampling and interpolation of reconstructed pixels similarly to the case of the intra prediction unit 114 of the image coding apparatus 100.

The sampling unit 232 has basically the same configuration and performs basically the same processes as the sampling unit 151. In other words, the sampling unit 232 performs sampling as necessary on the reconstructed pixels supplied from the computing unit 205 and supplies the sampled reconstructed pixel values (reconstructed pixel values remaining after thinning out by the sampling unit 232) or the reconstructed pixel values that are not sampled on the basis of control information to the reconstructed pixel storage unit 233 according to the control by the control unit 231.

The reconstructed pixel storage unit 233 has basically the same configuration and performs basically the same processes as the reconstructed pixel storage unit 152. In other words, the reconstructed pixel storage unit 233 is controlled by the control unit 231 and stores reconstructed pixel values supplied from the sampling unit 232.

The adjacent pixel reconstruction unit 234 has basically the same configuration and performs basically the same processes as the adjacent pixel reconstruction unit 153. In other words, the adjacent pixel reconstruction unit 234 is controlled by the control unit 231 and reads out pixel values of adjacent pixels of a macroblock to be processed from the reconstructed pixel storage unit 233. When the read pixel values are those sampled by the sampling unit 232, the adjacent pixel reconstruction unit 234 performs interpolation on the read pixel value in an interpolation method specified by control information supplied via the control unit 231 to restore thinned out pixel values. The adjacent pixel reconstruction unit 234 supplies the adjacent pixel values thus interpolated as necessary to the predicted image generation unit 235.

The predicted image generation unit 235 has basically the same configuration and performs basically the same processes as the predicted image generation unit 154. In other words, the predicted image generation unit 235 is controlled by the control unit 231, generates a predicted image of the macroblock to be processed by using the adjacent pixel values supplied from the adjacent pixel reconstruction unit 234, and supplies the predicted image to the computing unit 205. The predicted image generation unit 235 generates predicted images in all the intra prediction modes in this manner. The adjacent pixel reconstruction unit 234 reads out reconstructed pixels as necessary from the reconstructed pixel storage unit 233, and supplies the read reconstructed pixels as adjacent pixel values to the predicted image generation unit 235.

Thus, intra prediction similar to that performed by the intra prediction unit 114 of the image coding apparatus 100 is also performed by the intra prediction unit 211 of the image decoding apparatus 200, and the intra prediction unit 211 performs sampling (thinning out) as necessary on reconstructed pixels to be used as adjacent pixels in the intra prediction similarly to the case of the intra prediction unit 114.

In this process, the intra prediction unit 211 of the image decoding apparatus 200 performs sampling and interpolation similar to those performed in the image coding apparatus 100 on the basis of the information such as the notification that sampling is to be performed and the specification of the sampling method and the interpolation method provided from the image coding apparatus 100. As a result, the image decoding apparatus 200 can reduce the amount of memory required for intra-frame prediction.

[Decoding Process]

Next, flows of the processes performed by the image decoding apparatus 200 as described above will be described. First, an example of a flow of the decoding process will be described with reference to a flowchart of FIG. 19.

When the decoding process is started, the accumulation buffer 201 accumulates coded data being transmitted in step S201. In step S202, the lossless decoding unit 202 decodes the coded data supplied from the accumulation buffer 201. Specifically, I-pictures, P-pictures and B-pictures coded by the lossless coding unit 106 in FIG. 1 are decoded.

In this process, the motion vector information, the reference frame information, the prediction mode information (intra prediction mode or inter prediction mode), the flag information, the notification that sampling is to be performed, the specification of the sampling method and the interpolation method and the like are also decoded.

Specifically, when the prediction mode information is intra prediction mode information, the prediction mode information is supplied to the intra prediction unit 211. When the prediction mode information is inter prediction mode information, the motion vector information associated with the prediction mode information is supplied to the motion prediction/compensation unit 212.

In addition, the information such as the notification that sampling is to be performed and the specification of the sampling method and the interpolation method is supplied to the intra prediction unit 211.

In step S203, the inverse quantization unit 203 inversely quantizes the transform coefficient decoded by the lossless decoding unit 202 with a characteristic corresponding to that of the quantization unit 105 in FIG. 1. In step S204, the inverse orthogonal transform unit 204 performs inverse orthogonal transform on the transform coefficient that is inversely quantized by the inverse quantization unit 203 with a characteristic corresponding to that of the orthogonal transform unit 104 in FIG. 1. As a result, difference information corresponding to the input to the orthogonal transform unit 104 (output of the computing unit 103) in FIG. 1 is decoded.

In step S205, the intra prediction unit 211 or the motion prediction/compensation unit 212 each performs prediction of the image according to the prediction mode information supplied from the lossless decoding unit 202.

Specifically, when the intra prediction mode information is supplied from the lossless decoding unit 202, the intra prediction unit 211 performs an intra prediction process in the intra prediction mode. In addition, when the notification that sampling is to be performed, the specification of the sampling method and the interpolation method and the like are also supplied from the lossless decoding unit 202, the intra prediction unit 211 performs the intra prediction process by using the information (intra-frame prediction including sampling, interpolation and the like of reconstructed pixels).

When the inter prediction mode information is supplied from the lossless decoding unit 202, the motion prediction/compensation unit 212 performs a motion prediction process in the inter prediction mode.

In step S206, the selection unit 213 selects a predicted image. Specifically, the predicted image generated by the intra prediction unit 211 or the predicted image generated by the motion prediction/compensation unit 212 is supplied to the selection unit 213. The selection unit 213 selects either one of the predicted images. The selected predicted image is supplied to the computing unit 205.

In step S207, the computing unit 205 adds the predicted image selected in the process of step S206 to the difference information obtained in the process of step S204. As a result, the original image data are restored.

In step S208, the deblocking filter 206 filters the decoded image data supplied from the computing unit 205. As a result, block distortion is removed.

In step S209, the frame memory 209 stores the filtered decoded image data.

In step S210, the frame rearrangement buffer 207 rearranges frames of the decoded image data, Specifically, the frames of the decoded image data are rearranged from the order for coding in which the frames were rearranged by the frame rearrangement buffer 102 (FIG. 1) of the image coding apparatus 100 into the original order for display.

In step S211, the D/A conversion unit 208 D/A converts the decoded image data with the frames rearranged by the frame rearrangement buffer 207. The decoded image data are output to a display that is not illustrated and the image thereof is displayed.

[Prediction Process]

Next, an example of a flow of the prediction process performed in step S205 in FIG. 19 will be described with reference to a flowchart of FIG. 20.

When the prediction process is started, the lossless decoding unit 202 determines whether or not the image is intra-coded on the basis of the intra prediction mode information. If it is determined that the image is intra-coded, the lossless decoding unit 202 supplies the intra prediction mode information to the intra prediction unit 211, and proceeds the process to step S232. Note that when the notification that sampling is to be performed, the specification of the sampling method and the interpolation method and the like are present, the lossless decoding unit 202 also supplies such information to the intra prediction unit 211.

In step S232, the intra prediction unit 211 performs the intra prediction process. When the intra prediction process is terminated, the image decoding apparatus 200 returns the process to step S205 in FIG. 19 and performs processing in step S206 and subsequent steps.

If it is determined in step S231 that the image is inter-coded, on the other hand, the lossless decoding unit 202 supplies the inter prediction mode information to the motion prediction/compensation unit 212, and proceeds the process to step S233.

In step S233, the motion prediction/compensation unit 212 performs the inter motion prediction/compensation process. When the inter motion prediction/compensation process is terminated, the image decoding apparatus 200 returns the process to step S205 in FIG. 19 and performs processing in step S206 and subsequent steps.

[Intra Prediction Process]

Next, an example of a flow of the intra prediction process performed in step S232 in FIG. 20 will be described with reference to a flowchart of FIG. 21.

When the intra prediction process is started, the adjacent pixel reconstruction unit 234 determines the interpolation method according to the control by the control unit 231. In step S252, the predicted image generation unit 235 determines the prediction mode according to the control by the control unit 231. In step S253, the adjacent pixel reconstruction unit 234 reads out adjacent pixels according to the prediction mode determined in step S252.

In step S254, the adjacent pixel reconstruction unit 234 reconstructs the adjacent pixels according to the interpolation method determined in step 2251. In step S255, the predicted image generation unit 235 generates a predicted image by using the reconstructed adjacent pixels.

Figure 20:
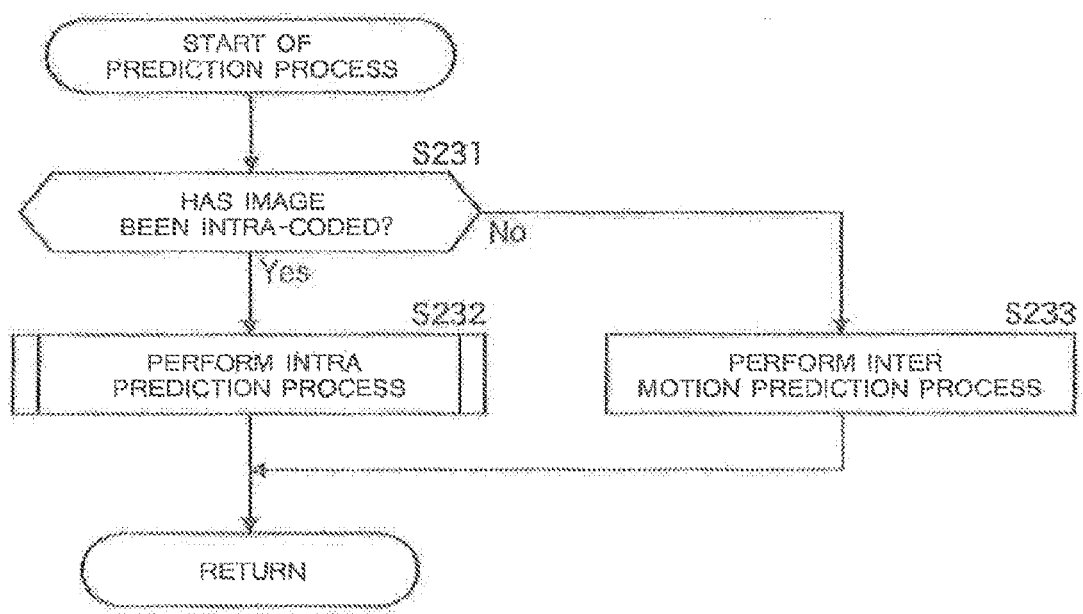
FIG. 20 is a flowchart explaining an example of a flow of a prediction process.
Figure 21:
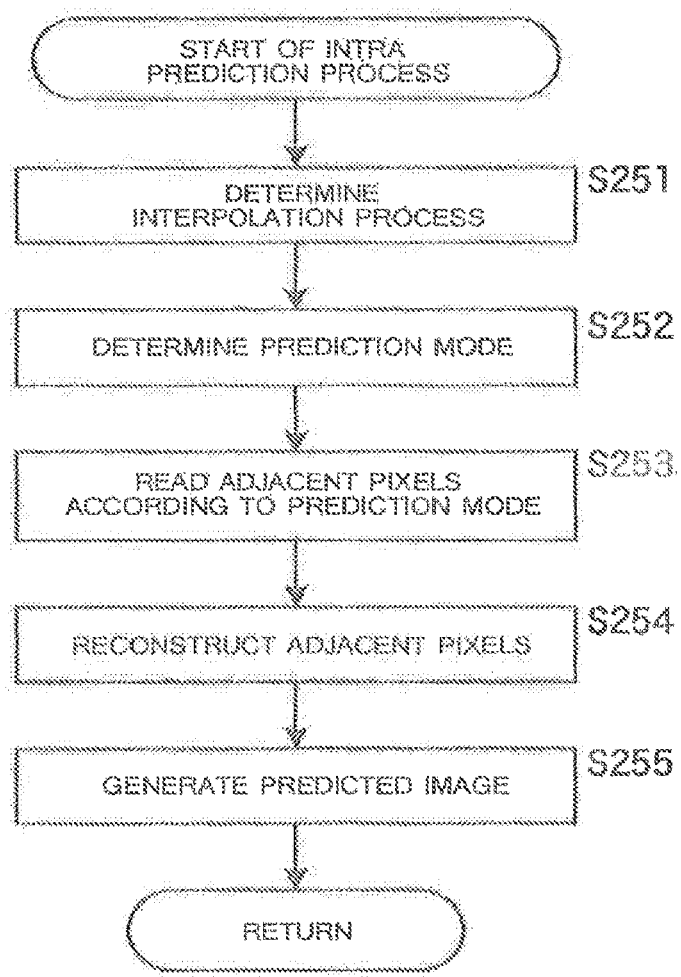
FIG. 21 is a flowchart explaining an example of a flow of an intra prediction process.

After the process in step S255 is terminated, the control unit 231 terminates the intra prediction process, returns the process to step S232 in FIG. 20 and performs subsequent processing.

Figure 19:
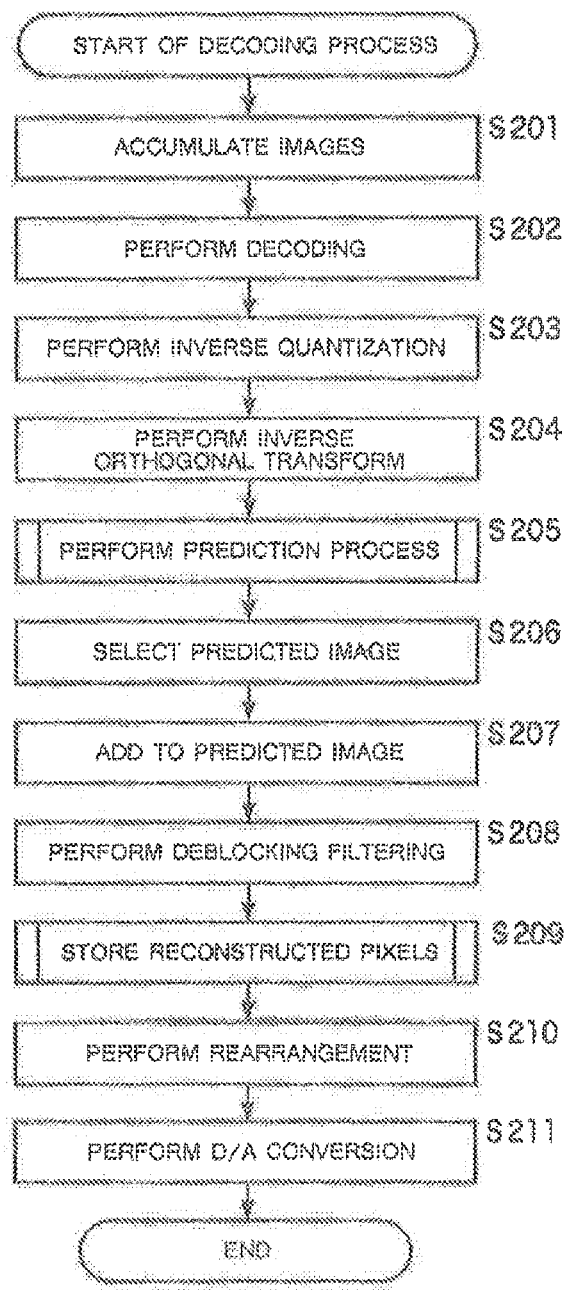
FIG. 19 is a flowchart explaining an example of a flow of a decoding process.

Since the reconstructed pixel storage process performed in step S208 in FIG. 19 is performed similarly to the case illustrated in the flowchart of FIG. 16, the description thereof will not be repeated.

As described above, the image decoding apparatus 200 can reduce the amount of memory required for intra-frame prediction.

Note that Hadamard transform or the like may be used instead of the orthogonal transform and the inverse orthogonal transform described above. Furthermore, the sizes of the blocks described above are exemplary only.

In the description above, the information indicating whether or not sampling is performed in the image coding apparatus 100 and the information indicating the sampling method and interpolation method used in the image coding apparatus 100 are transmitted from the image coding apparatus 100 to the image decoding apparatus 200, and the image decoding apparatus 200 performs sampling and interpolation similarly to those in the image coding apparatus 100 on the basis of the information. The sampling and the interpolation, however, are not limited thereto, and the image decoding apparatus 200 may extract a feature quantity of an image similarly to the image coding apparatus 100 and perform sampling and interpolation on the basis of the extracted feature quantity.

In this case, transmission of the information indicating whether or not sampling is performed, the information indicating the sampling method and the interpolation method used in the image coding apparatus 100 and the like can be omitted. The image decoding apparatus 200 may extract a feature quantity of an image from header information or the like of coded data or may extract a feature quantity by analyzing decoded image data.

[Macroblock]

Although macroblocks of 16×16 or smaller have been described above, the size of macroblocks may be larger than 16×16.

Figure 22:
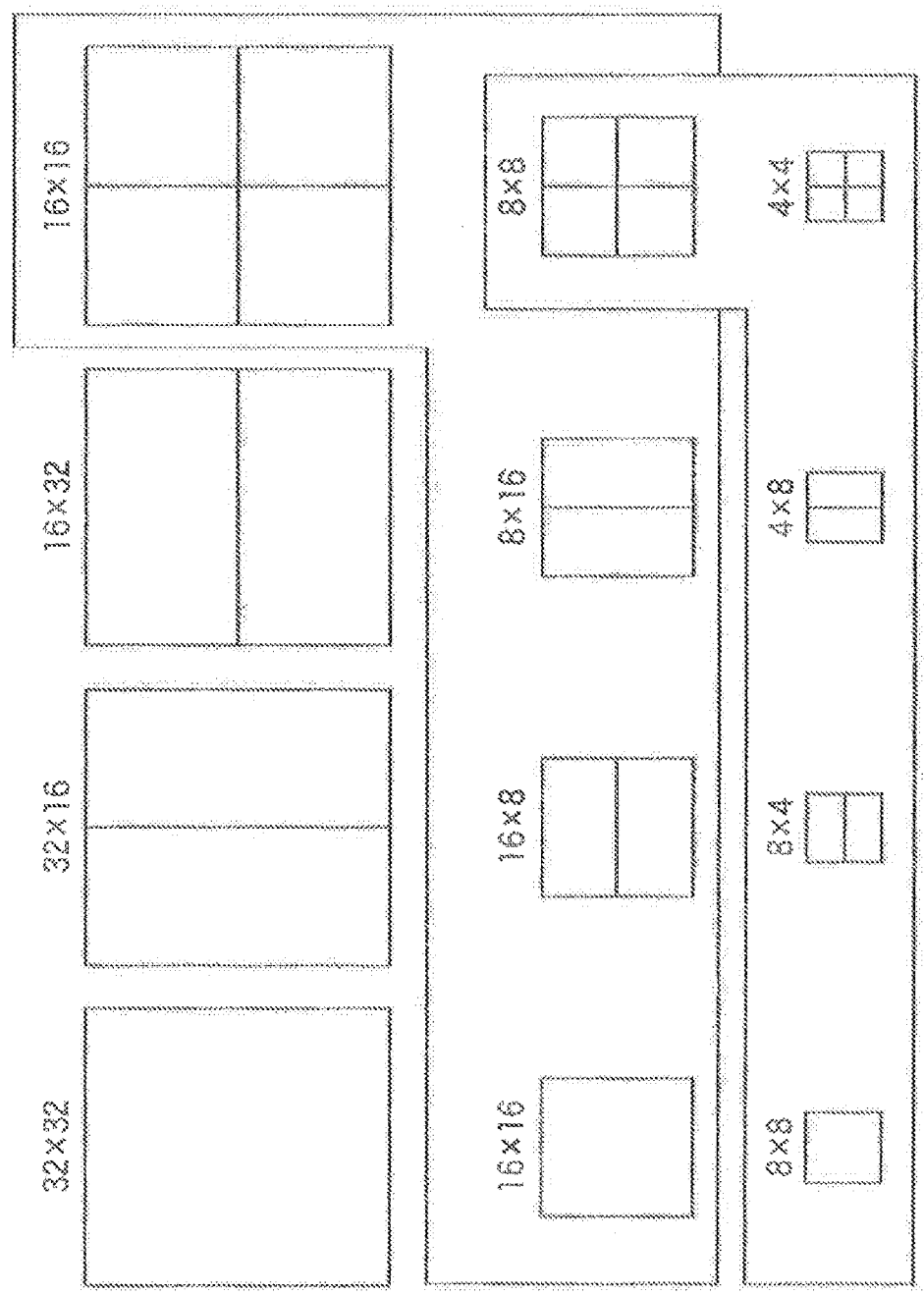
FIG. 22 is a diagram illustrating other examples of macroblocks.

The present technology can be applied to macroblocks of any sizes as illustrated in FIG. 22, for example. For example, the present technology can also be applied to such a macroblock (extended macroblock) that is extended to 32×32 pixels in addition to a normal macroblock of 16×16 pixels.

In the top row in FIG. 22, macroblocks composed of 32×32 pixels that are divided into blocks (partitions) of 32×32 pixels, 32×16 pixels, 16×32 pixels and 16×16 pixels are illustrated in this order from the left. In addition, in the middle row, macroblocks composed of 16×16 pixels divided into blocks of 16×16 pixels, 16×8 pixels, 8×16 pixels and 8×8 pixels are illustrated in this order from the left. Furthermore, in the bottom row, macroblocks composed of 8×8 pixels divided into blocks of 8×8 pixels, 8×4 pixels, 4×8 pixels and 4×4 pixels are illustrated in this order from the left.

Thus, the macroblocks of 32×32 pixels can be processed in blocks of 32×32 pixels, 32×16 pixels, 16×32 pixels and 16×16 pixels as illustrated in the top row.

The block of 16×16 pixels illustrated at the right of the top row can be processed in blocks of 16×16 pixels, 16×8 pixels, 8×16 pixels and 8×8 pixels as illustrated in the middle row similarly to the H.264/AVC format.

The block of 8×8 pixels illustrated at the right of the middle row can be processed in blocks of 8×8 pixels, 8×4 pixels, 4×8 pixels and 4×4 pixels as illustrated in the bottom row similarly to the H.264/AVC format.

These blocks can be classified into the following three levels. Specifically, the blocks of 32×32 pixels, 32×16 pixels and 16×32 pixels illustrated in the tow row of FIG. 20 are referred to as a first level. The block of 16×16 pixels illustrated at the right in the top row and the blocks of 16×16 pixels, 16×8 pixels and 8×16 pixels illustrated in the middle row are referred to as a second level. The block of 8×8 pixels illustrated at the right in the middle row and the blocks of 8×8 pixels, 8×4 pixels, 4×8 pixels and 4×4 pixels illustrated in the bottom row are referred to as a third level.

Employment of such a hierarchical structure allows the compatibility with the H.264/AVC format to be maintained for blocks of 16×16 or smaller and a larger block to be defined as a super set thereof.

3. Third Embodiment

[Personal Computer]

The series of processes described above can be implemented by hardware or by software. In this case, this may be configured as a personal computer as illustrated in FIG. 23, for example.

Figure 23:
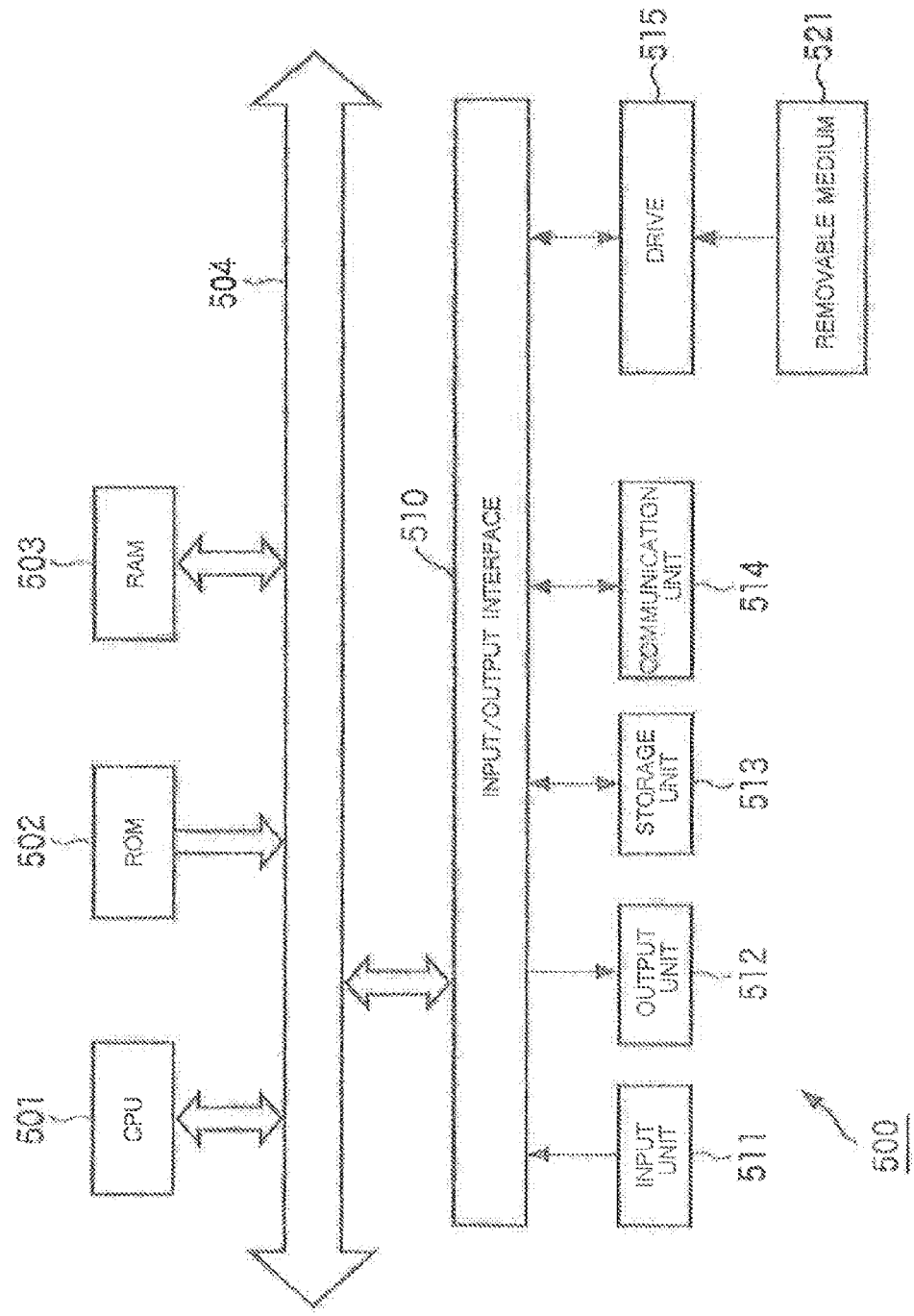
FIG. 23 is a block diagram illustrating an example of a main configuration of a personal computer.

In FIG. 23, a CPU 501 of the personal computer 500 performs various processes according to programs stored in a ROM (Read Only Memory) 502 or programs loaded from a storage unit 513 to a RAM (Random Access Memory) 503. The RAM 503 also has stored therein data necessary for performing various processes by the CPU 501 as appropriate.

The CPU 501, the ROM 502 and the RAM 503 are connected to one another via a bus 504. An input/output interface 510 is also connected to the bus 504.

The input/output interface 510 is connected with an input unit 511 including a keyboard, a mouse or the like, an output unit 512 including a display such as a CRT (Cathode Ray Tube) or a LCD (Liquid Crystal Display), a loudspeaker and the like, a storage unit 513 including a hard disk or the like, and a communication unit 514 including a modem or the like. The communication unit 514 performs communication via a network including the Internet.

The input/output interface 510 is also connected with a drive 515 as necessary, a removable medium 521 such as a magnetic disk, an optical disc, a magneto-optical disk, or a semiconductor memory is attached thereto as appropriate, and computer programs read out therefrom are installed as necessary on the storage unit 513.

When the series of processes described above is to be performed by software, programs constituting the software are installed from a network or a recording medium.

The recording medium includes the ROM 502, a hard disk included in the storage unit 513 or the like, on which programs are recorded and which is distributed to a user in a state embedded in the apparatus, in addition to the removable medium 521 such as a magnetic disk (including a flexible disk), an optical disc (including a CD-ROM (Compact Disc-Read Only Memory), a DVD (Digital Versatile Disc)), a magneto-optical disc (including a MD (Mini Disc)), or a semiconductor memory, on which programs are recorded and which is distributed to the user for distribution of the programs separately from the apparatus as illustrated in FIG. 23, for example.

Note that the programs to be executed by the computer may be programs according to which processes are performed in time series in the order described in the present specification, or may be programs according to which processes are performed in parallel or at necessary timings when the programs are called or the like.

Furthermore, the steps describing programs to be recorded on a recording medium in the present specification includes obviously include processes performed in time series in the order as described and also include processes performed in parallel or independently that are not necessarily performed in time series.

Furthermore, in the present specification, a system refers to the entire apparatus including a plurality of devices.

In addition, a configuration described above as one device (or processing unit) may be divided into a plurality of devices (or processing units). Conversely, configurations described above as a plurality of devices (or processing units) may be integrated into one device (or processing unit). Moreover, configurations other than those described above may obviously added to the configurations of the devices (or processing units). Furthermore, part of the configuration of a device (or processing unit) may be included in the configuration of another device (or another processing unit) as long as the configuration and the operation of the system as a whole are substantially the same. In other words, embodiments of the present technology are not limited to those described above and various modifications can be made without departing from the gist of the present technology.

For example, any electronic device may be applied to the image coding apparatus 100 and the image decoding apparatus 200 described above. Examples thereof will be described below.

4. Fourth Embodiment

[Television Receiver]

Figure 24:
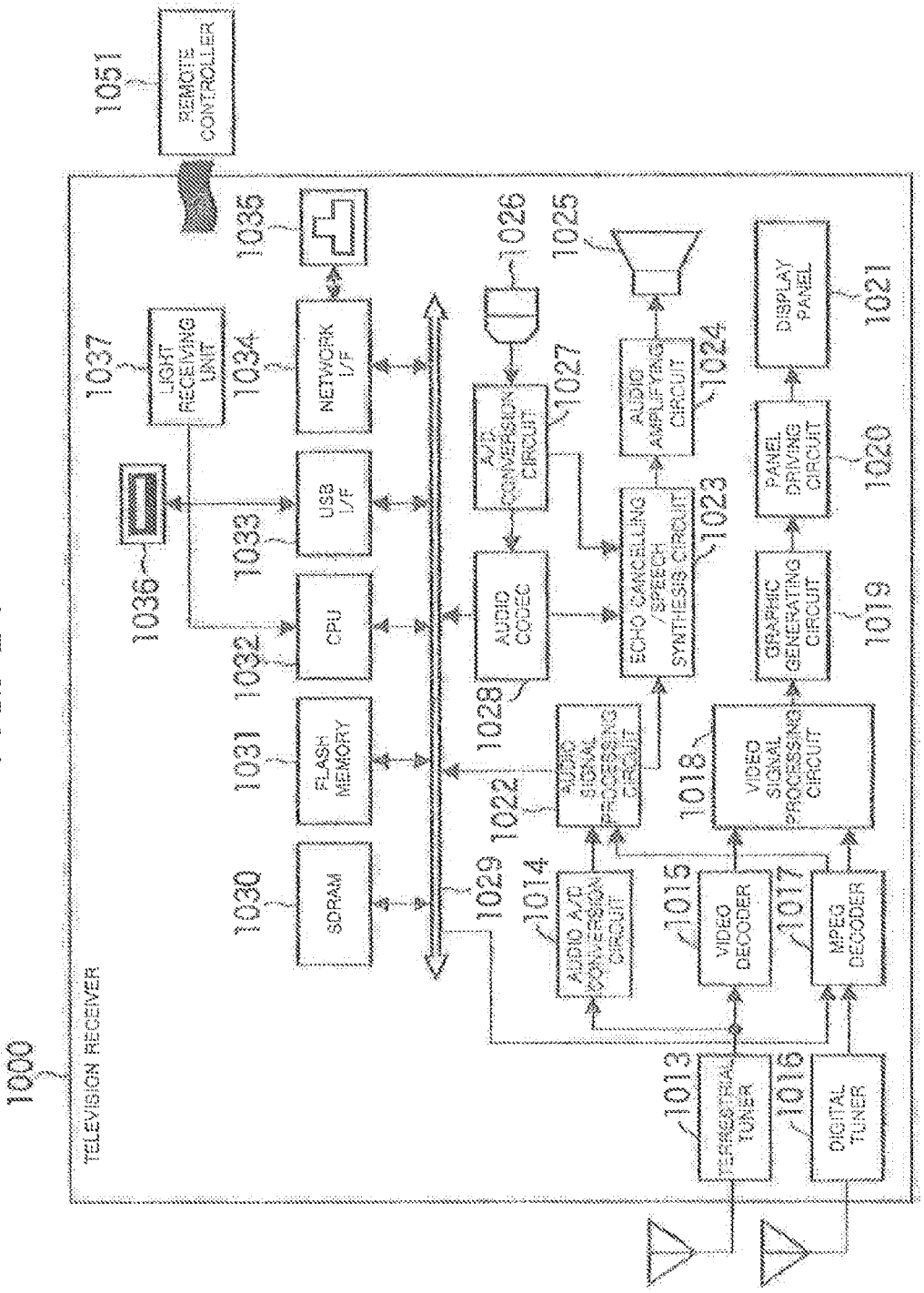
FIG. 24 is a block diagram illustrating an example of a main configuration of a television receiver.

FIG. 24 is a block diagram illustrating an example of a main configuration of a television receiver using the image decoding apparatus 200.

The television receiver 1000 illustrated in FIG. 24 includes a terrestrial tuner 1013, a video decoder 1015, a video signal processing circuit 1018, a graphic generating circuit 1019, a panel driving circuit 1020, and a display panel 1021.

The terrestrial tuner 1013 receives broadcast wave signals for terrestrial analog broadcasting via an antenna, demodulates the signals, obtains video signal and supplies the video signals to the video decoder 1015. The video decoder 1015 performs decoding on the video signals supplied from the terrestrial tuner 1013 and supplies resulting digital component signals to the video signal processing circuit 1018.

The video signal processing circuit 1018 performs predetermined processing such as denoising on the video data supplied from the video decoder 1015 and supplies resulting video data to the graphic generating circuit 1019.

The graphic generating circuit 1019 generates video data of shows to be displayed on the display panel 1021, image data according to processing based on an application supplied via a network, or the like, and supplies the generated video data or image data to the panel driving circuit 1020. The graphic generating circuit 1019 also performs processing such as supplying video data obtained by generating video data (graphics) for displaying a screen to be used for selection of an item by the user and superimposing the data on the image data of the shows to the panel driving circuit 1020 as necessary.

The panel driving circuit 1020 drives the display panel 1021 on the basis of data supplied from the graphic generating circuit 1019 and displays video of shows and various screens as described above on the display panel 1021.

The display panel 1021 may include a LCD (Liquid Crystal Display) or the like and displays video of shows, etc., according to the control by the panel driving circuit 1020.

The television receiver 1000 also includes an audio A/D (Analog/Digital) conversion circuit 1014, an audio signal processing circuit 1022, an echo cancelling/speech synthesis circuit 1023, an audio amplifying circuit 1024, and a loudspeaker 1025.

The terrestrial tuner 1013 obtains audio signals in addition to the video signals by demodulating the received broadcast wave signals. The terrestrial tuner 1013 supplies the obtained audio signals to the audio A/D conversion circuit 1014.

The audio A/D conversion circuit 1014 performs A/D conversion on the audio signals supplied from the terrestrial tuner 1013 and supplies resulting digital audio signals to the audio signal processing circuit 1022.

The audio signal processing circuit 1022 performs predetermined processing such as denoising on the audio data supplied from the audio A/D conversion circuit 1014, and supplies resulting audio data to the echo cancelling/speech synthesis circuit 1023.

The echo cancelling/speech synthesis circuit 1023 supplies the audio data supplied from the audio signal processing circuit 1022 to the audio amplifying circuit 1024.

The audio amplifying circuit 1024 performs D/A conversion and amplification on the audio data supplied from the echo cancelling/speech synthesis circuit 1023, adjusts the volume to a predetermined level, and then outputs the audio through the loudspeaker 1025.

The television receiver 1000 further includes a digital tuner 1016 and a MPEG decoder 1017.

The digital tuner 1016 receives broadcast wave signals for digital broadcasting (terrestrial digital broadcasting, BS (Broadcasting Satellite)/CS (Communications Satellite) digital broadcasting) via an antenna, demodulates the signals, obtains MPEG-TS (Moving Picture Experts Group-Transport Stream), and supplies the MPEG-TS to the MPEG decoder 1017.

The MPEG decoder 1017 descrambles the MPEG-TS supplied from the digital tuner 1016, and extracts a stream containing show data to be reproduced (to be viewed). The MPEG decoder 1017 decodes an audio packet included in the extracted stream and supplies resulting audio data to the audio signal processing circuit 1022, and also decodes a video packet included in the stream and supplies resulting video data to the video signal processing circuit 1018. In addition, the MPEG decoder 1017 supplies EPG (Electronic Program Guide) data extracted from the MPEG-TS to a CPU 1032 via a path that is not illustrated.

The television receiver 1000 uses the image decoding apparatus 200 described above as the MPEG decoder 1017 that decodes a video packet in this manner. Note that the MPEG-TS transmitted by a broadcast station or the like is coded by the image coding apparatus 100.

The MPEG decoder 1017 performs sampling and interpolation of adjacent pixels as necessary by using information such as notification of whether or not sampling is performed in the broadcast station (image coding apparatus 100) and specification of the sampling method and the interpolation method extracted from coded data supplied from the broadcast station (image coding apparatus 100), generates a predicted image by using the adjacent pixels, and generates decoded image data from residual information by using the predicted image, similarly to the case of the image decoding apparatus 200. Accordingly, the MPEG decoder 1017 can reduce the amount of memory required for intra-frame prediction.

The video data supplied from the MPEG decoder 1017 are subjected to predetermined processing in the video signal processing circuit 1018, combined with generated video data superimposed thereon in the graphic generating circuit 1019 as necessary, and supplied to the display panel 1021 via the panel driving circuit 1020, and the image thereof is displayed, similarly to the case of video data supplied from the video decoder 1015.

The audio data supplied from the MPEG decoder 1017 are subjected to predetermined processing in the audio signal processing circuit 1022, supplied to the audio amplifying circuit 1024 via the echo cancelling/speech synthesis circuit 1023, and subjected to D/A conversion and amplification, similarly to the case of audio data supplied from the audio A/D conversion circuit 1014. As a result, audio adjusted to a predetermined volume is output through the loudspeaker 1025.

The television receiver 1000 also includes a microphone 1026 and an A/D conversion circuit 1027.

The A/D conversion circuit 1027 receives signals of speech of the user taken by the microphone 1026 provided in the television receiver 1000 for audio conversation, performs A/D conversion on the received speech signals, and supplies resulting digital audio data to the echo cancelling/speech synthesis circuit 1023.

When the signals of speech of the user (user A) of the television receiver 1000 are supplied from the A/D conversion circuit 1027, the echo cancelling/speech synthesis circuit 1023 outputs speech data obtained by performing echo cancelling on the speech data of the user A and combining the speech data with other speech data through the loudspeaker 1025 via the audio amplifying circuit 1024.

Furthermore, the television receiver 1000 also includes an audio codec 1028, an internal bus 1029, a SDRAM (Synchronous Dynamic Random Access Memory) 1030 a flash memory 1031, a CPU 1032, a USB (Universal Serial Bus) I/F 1033, and a network I/F 1034.

The A/D conversion circuit 1027 receives signals of speech of the user taken by the microphone 1026 provided in the television receiver 1000 for audio conversation, performs A/D conversion on the received speech signals, and supplies resulting digital audio data to the audio codec 1028.

The audio codec 1028 converts the audio data supplied from the A/D conversion circuit 1027 into data in a predetermined format for transmission via a network, and supplies the data to the network I/F 1034 via the internal bus 1029.

The network I/F 1034 is connected to the network via a cable attached to a network terminal 1035. The network I/F 1034 transmits audio data supplied from the audio codec 1028 to another device connected to the network, for example. The network I/F 1034 also receives audio data transmitted from another device connected to the network via the network terminal 1035, for example, and supplies the data to the audio codec 1028 via the internal bus 1029.

The audio codec 1028 converts the audio data supplied from the network I/F 1034 into data of a predetermined format, and supplies the data to the echo cancelling/speech synthesis circuit 1023.

The echo cancelling/speech synthesis circuit 1023 outputs audio data obtained by performing echo cancelling on the audio data supplied from the audio codec 1028, and combining the audio data with other audio data through the loudspeaker 1025 via the audio amplifying circuit 1024.

The SDRAM 1030 stores various data necessary for processing performed by the CPU 1032.

The flash memory 1031 stores programs to be executed by the CPU 1032. The programs stored in the flash memory 1031 are read by the CPU 1032 at a predetermined timing such as at booting of the television receiver 1000. The flash memory 1031 also has stored therein EPG data acquired through digital broadcasting, data acquired from a predetermined server via the network, and the like.

For example, the flash memory 1031 has stored therein MPEG-TS including content data acquired from a predetermined server via the network according to the control by the CPU 1032. The flash memory 1031 supplies the MPEG-TS to the MPEG decoder 1017 via the internal bus 1029 according to the control by the CPU 1032, for example.

The MPEG decoder 1017 processes the MPEG-TS similarly to the case of the MPEG-TS supplied from the digital tuner 1016. As described above, the television receiver 1000 can receive content data containing video, audio, etc., via the network, decode the data by using the MPEG decoder 1017, display the video thereof and output the audio thereof.

The television receiver 1000 also includes a light receiving unit 1037 that receives infrared signals transmitted from a remote controller 1051.

The light receiving unit 1037 receives infrared light from the remote controller 1051, demodulates the infrared light and outputs a resulting control code representing a user operation to the CPU 1032.

The CPU 1032 executes programs stored in the flash memory 1031, and controls the overall operation of the television receiver 1000 according to control codes or the like supplied from the light receiving unit 1037. The CPU 1032 and the respective components of the television receiver 1000 are connected via paths that are not illustrated.

The USB I/F 1033 transmits/receives data to/from devices outside of the television receiver 1000 that are connected via a USB cable attached to a USE terminal 1036. The network I/F 1034 is connected to the network via a cable attached to a network terminal 1035 and also transmits/receives data other than audio data to/from various devices connected to the network.

The television receiver 1000 can reduce the amount of memory required for intra-frame prediction by using the image decoding apparatus 200 as the MPEG decoder 1017. As a result, the television receiver 1000 can reduce the amount of memory required for intra-frame predict ion of broadcast wave signals received via the antenna and content data acquired via the network and realize real-time processing at a lower cost.

5. Fifth Embodiment

[Mobile Phone]

Figure 25:
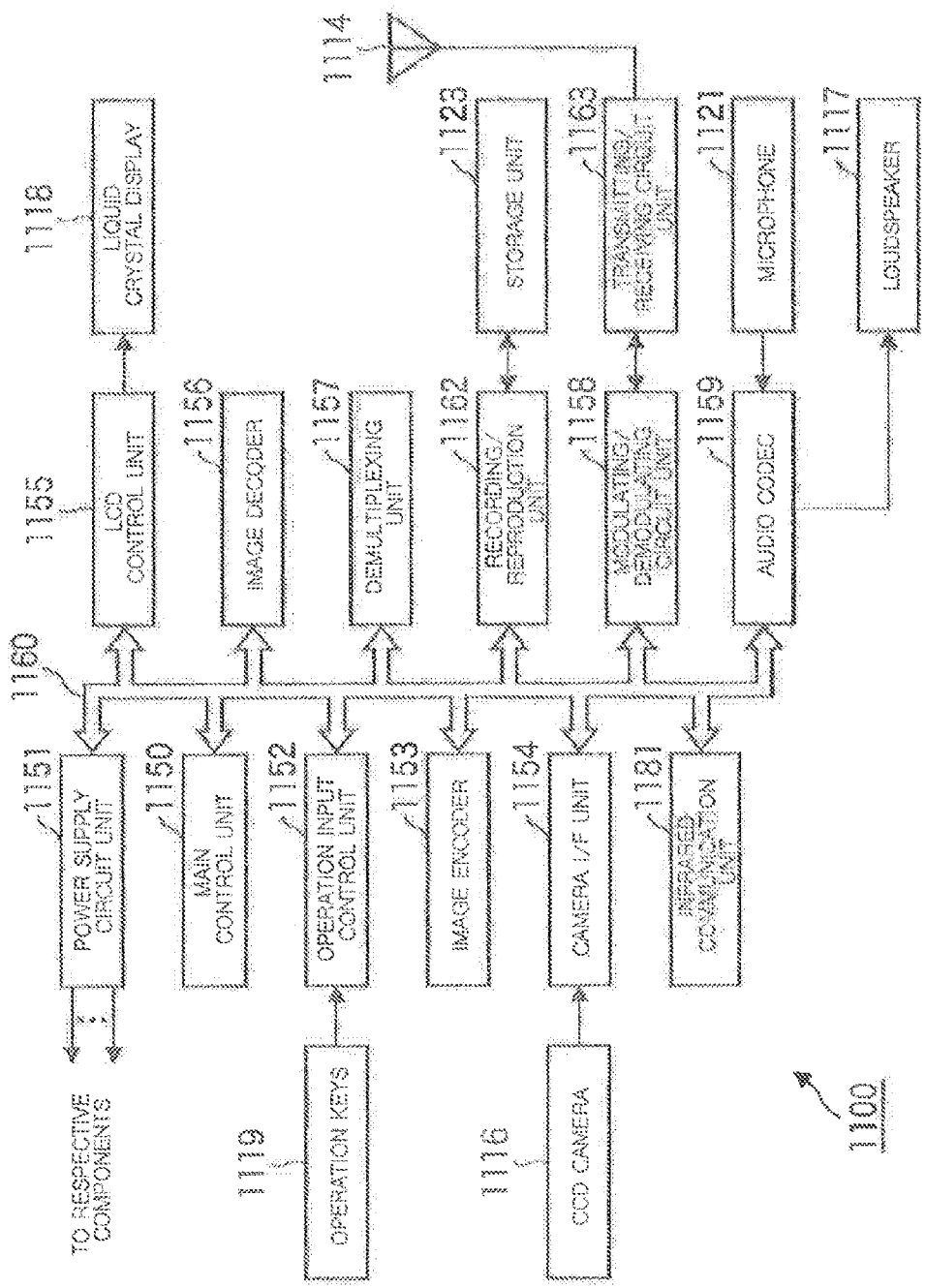
FIG. 25 is a block diagram illustrating an example of a main configuration of a mobile phone.

FIG. 25 is a block diagram illustrating an example of a main configuration of a mobile phone using the image coding apparatus 100 and the image decoding apparatus 200.

The mobile phone 1100 illustrated in FIG. 25 includes a main control unit 1150 configured to generally control the respective components, a power supply circuit unit 1151, an operation input control unit 1152, an image encoder 1153, a camera I/F unit 1154, a LCD control unit 1155, an image decoder 1156, a demultiplexing unit 1157, a recording/reproduction unit 1162, a modulating/demodulating circuit unit 1158, and an audio codec 1159. These are connected to one another via a bus 1160.

The mobile phone 1100 also includes operation keys 1119, a CCD (Charge Coupled Devices) camera 1116, a liquid crystal display 1118, a storage unit 1123, transmitting/receiving circuit unit 163, an antenna 1114, a microphone (MIC) 1121, and a loudspeaker 1117.

When a clearing and power key is turned on by an operation of the user, the power supply circuit unit 1151 supplies power to the respective components from a battery pack to boot the mobile phone 1100 into an operable state.

The mobile phone 1100 performs various operations such as transmission/reception of audio signals, transmission/reception of electronic mails and image data, imaging and data recording in various modes such as a voice call mode and data communication mode according to the control by the main control unit 1150 including a CPU, a ROM, a RAM and the like.

For example, in the voice call mode, the mobile phone 1100 converts audio signals collected by the microphone (MIC) 1121 into digital audio data by the audio codec 1159, spectrum spreads the digital audio data by the modulating/demodulating circuit unit 1158, and performs digital-to-analog conversion and frequency conversion on the audio data by the transmitting/receiving circuit unit 1163. The mobile phone 1100 transmits signals for transmission obtained by the conversion to a base station that is not illustrated via the antenna 1114. The signals for transmission (audio signals) transmitted to the base station are supplied to a mobile phone of the other party via a public telephone network.

In addition, in the voice call mode, for example, the mobile phone 1100 amplifies the received signals received at the antenna 1114 by the transmitting/receiving circuit unit 1163, and further performs frequency conversion and analog-to-digital conversion thereon, performs inverse spectrum spreading by the modulating/demodulating circuit unit 1158, and converts the signals to analog audio signals by the audio codec 1159. The mobile phone 1100 outputs the analog audio signals obtained by the conversion through the loudspeaker 1117.

Furthermore, when an electronic mail is to be transmitted in the data communication mode, for example, the mobile phone 1100 receives text data of the electronic mail input by operation of the operation keys 1119 at the operation input control unit 1152. The mobile phone 1100 processes the text data by the main control unit 1150, and displays as an image on the liquid crystal display 1118 via the LCD control unit 1155.

The mobile phone 1100 also generates electronic mail data by the main control unit 1150 on the basis of text data, user instructions and the like received by the operation input control unit 1152. The mobile phone 1100 spectrum spreads the electronic mail data by the modulating/demodulating circuit unit 1158, and performs digital-to-analog conversion and frequency conversion thereon by the transmitting/receiving circuit unit 1163. The mobile phone 1100 transmits signals for transmission obtained by the conversion to a base station that is not illustrated via the antenna 1114. The signals for transmission (electronic mail) transmitted to the base station are supplied to a predetermined destination via the network and a main server or the like.

In addition, when an electronic mail is to be received in the data communication mode, for example, the mobile phone 1100 receives signals transmitted from a base station by the transmitting/receiving circuit unit 1163 via the antenna 1114, amplifies the signals and further performs frequency conversion and analog-to-digital conversion thereon. The mobile phone 1100 performs inverse spectrum spreading on the received signals by the modulating/demodulating circuit unit 1158 to restore original electronic mail data. The mobile phone 1100 displays the restored electronic mail data on the liquid crystal display 1118 via the LCD control unit 1155.

Note that the mobile phone 1100 can also record (store) the received electronic mail data in the storage unit 1123 via the recording/reproduction unit 1162.

The storage unit 1123 is an arbitrary rewritable storage medium. The storage unit 1123 may be a semiconductor memory such as a RAM and a built-in flash memory, or may be a hard disk, or may be a removable medium such as a magnetic disk, a magneto-optical disc, an optical disc, a USB memory and a memory card. Needless to say, the storage unit 1123 may be other than the above.

Furthermore, when image data are to be transmitted in the data communication mode, for example, the mobile phone 1100 generates image data by imaging by the CCD camera 1116. The CCD camera 1116 includes an optical devices such a lens and a diaphragm and a CCD as a photoelectric conversion element, images a subject, converts the intensity of received light into electric signals and generates image data of the subject image. The CCD camera 1116 codes the image data by the image encoder 1153 via the camera I/F unit 1154 to converts the image data into coded image data.

The mobile phone 1100 uses the image coding apparatus 100 described above as the image encoder 1153 performing such processes. The image encoder 1153 performs determination on whether or not to sample adjacent pixels on the basis of a feature quantity extracted from the image data, and determination of the sampling method and the interpolation method when sampling is to be performed, samples the adjacent pixels as necessary and stores the pixels similarly to the case of the image coding apparatus 100. The image encoder 1153 reads out the adjacent pixels in performing intra prediction, and interpolates the pixels as necessary to reconstruct the adjacent pixels. The image encoder 1153 then generates a predicted image by using the reconstructed adjacent pixels, and generates coded data from residual information by using the predicted image. The image encoder 1153 can therefore reduce the amount of memory required for intra-frame prediction.

Note that, at the same time, the mobile phone 1100 performs analog-to-digital conversion on the audio collected by the microphone (MIC) 1121 during the imaging by the CCD camera 1116 and codes the audio by the audio codec 1159.

The mobile phone 1100 multiplexes the coded image data supplied from the image encoder 1153 and the digital audio data supplied from the audio codec 1159 according to a predetermined method by the demultiplexing unit 1157. The mobile phone 1100 performs spectrum spreading on the resulting multiplexed data by the modulating/demodulating circuit unit 1158, and performs digital-to-analog conversion and frequency conversion thereon by the transmitting/receiving circuit unit 1163. The mobile phone 1100 transmits the signals for transmission obtained by the conversion to a base station that is not illustrated via the antenna 1114. The signals for transmission (image data) transmitted to the base station are supplied to the other party via the network or the like.

Note that, if image data are not to be transmitted, the mobile phone 1100 can also display the image data generated by the CCD camera 1116 on the liquid crystal display 1118 via the LCD control unit 1155 without the image encoder 1153.

In addition, when data of a moving picture file linked to a simple website or the like are to be received in the data communication mode, for example, the mobile phone 1100 receives the signals transmitted from a base station by the transmitting/receiving circuit unit 1163 via the antenna 1114, amplifies the signals and further performs frequency conversion and analog-to-digital conversion thereon. The mobile phone 1100 performs inverse spectrum spreading on the received signals by the modulating/demodulating circuit unit 158 to restore original multiplexed data. The mobile phone 1100 demultiplexes the multiplexed data by the demultiplexing unit 1157 to divide the data into coded image data and audio data.

The mobile phone 1100 decodes the coded image data by the image decoder 1156 to generate reproduced moving picture data, and displays the reproduced data on the liquid crystal display 1118 via the LCD control unit 1155. As a result, moving picture data included in a moving picture file linked to a simple website are displayed on the liquid crystal display 1118, for example.

The mobile phone 1100 uses the image decoding apparatus 200 as described above as the image decoder 1156 that performs such processes. In other words, the image decoder 1156 performs sampling and interpolation of adjacent pixels as necessary by using information such as notification of whether or not sampling is performed in the image encoder 1153 (image coding apparatus 100) of another device and specification of the sampling method and the interpolation method extracted from coded data supplied from the image encoder 1153 (image coding apparatus 100) of the other device, generates a predicted image by using the adjacent pixels, and generates decoded image data from residual information by using the predicted image, similarly to the case of the image decoding apparatus 200. Accordingly, the image decoder 1156 can reduce the amount of memory required for intra-frame prediction.

In this process, at the same time, the mobile phone 1100 converts digital audio data to analog audio signals by the audio codec 1159 and outputs the analog audio signals through the loudspeaker 1117. As a result, audio data included in a moving picture filed liked to a simple website are reproduced, for example.

Similarly to the case of an electronic mail, the mobile phone 1100 can also record (store) the received data liked to a simple website or the like in the storage unit 1123 via the recording/reproduction unit 1162.

The mobile phone 1100 can also analyze a two-dimensional code imaged and obtained by the CCD camera 1116 by the main control unit 1150, and obtain information recoded in the two-dimensional code.

Furthermore, the mobile phone 1100 can communicate with external devices by the infrared communication unit 1181 by means of infrared light.

The mobile phone 1100 can reduce the amount of memory required for intra-frame prediction in transmitting image data generated by the CCD camera 1116, for example, and realize real-time processing at a lower cost by using the image coding apparatus 100 as the image encoder 1153.

The mobile phone 1100 can also reduce the amount of memory required for intra-frame prediction in decoding of data (coded data) of a moving picture filed liked to a simple website, for example, and realize real-time processing at a lower cost by using the image decoding apparatus 200 as the image decoder 1156.

Although the mobile phone 1100 is described above as using the CCD camera 1116 therein, an image sensor (CMOS image sensor) using a CMOS (Complementary Metal Oxide Semiconductor) may be used instead of the CCD camera 1116. In this case, the mobile phone 1100 can also image a subject and generate image data of the subject image similarly to the case in which the CCD camera 1116 is used.

Moreover, although a case of the mobile phone 1100 is described above, the image coding apparatus 100 and the image decoding apparatus 200 can be applied to any device having imaging functions and communication functions as those of the mobile phone 1100 such as a PDA (Personal Digital Assistants), a smart phone, an UMPC (Ultra Mobile Personal Computer), a netbook, and a laptop personal computer similarly to the case of the mobile phone 1100.

6. Sixth Embodiment

[Hard Disk Recorder]

Figure 26:
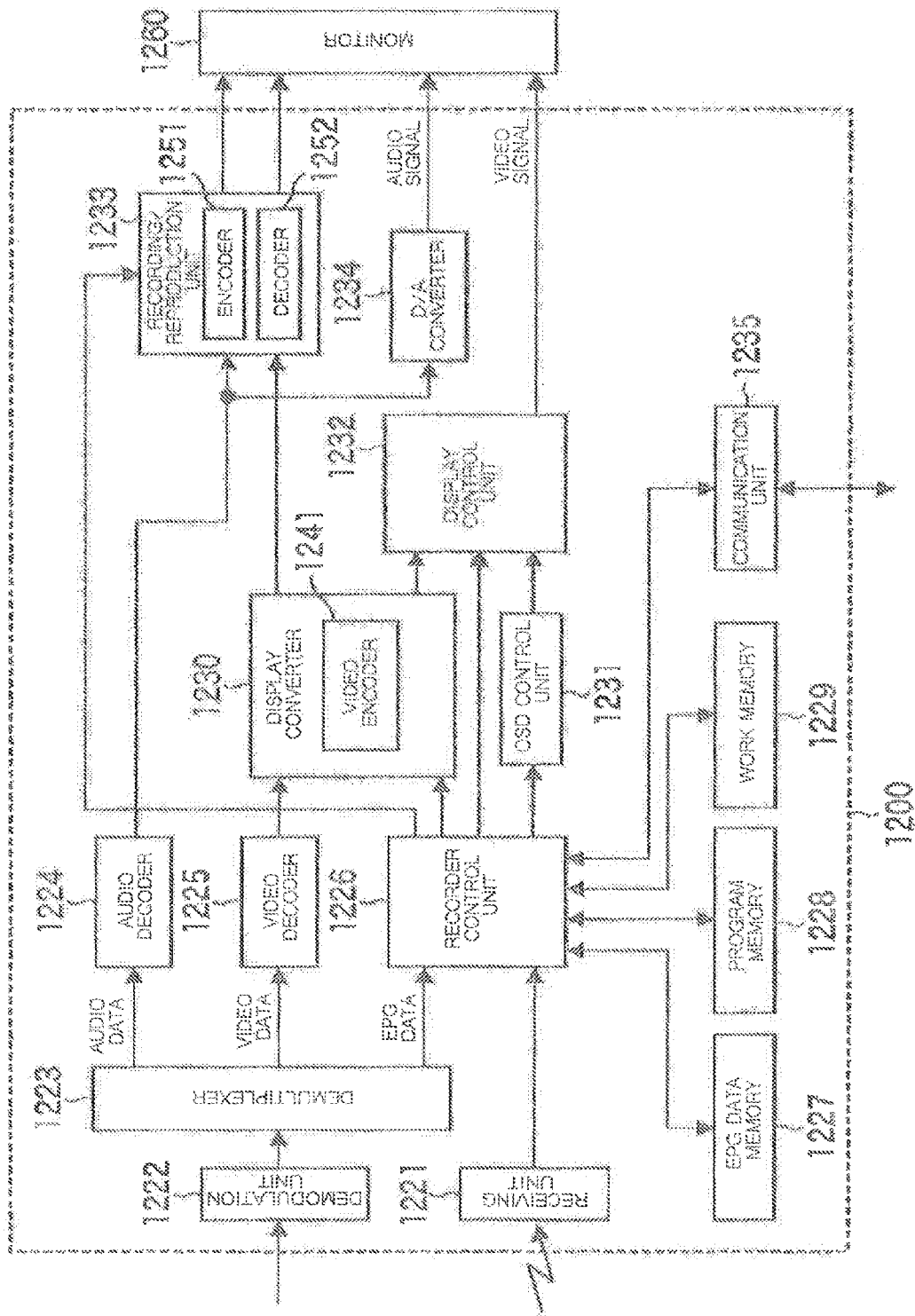
FIG. 26 is a block diagram illustrating an example of a main configuration of a hard disk recorder.

FIG. 26 is a block diagram illustrating an example of a main configuration of a hard disk recorder in which the image coding apparatus 100 and the image decoding apparatus 200 are used.

The hard disk recorder (HDD recorder) 1200 illustrated in FIG. 26 is an apparatus that saves audio data and video data in a broadcast programs included in broadcast wave signals transmitted from a satellite or an antenna on the ground and received by a tuner in a built-in hard disk, and provides the saved data to the user at a timing according to the instruction by the user.

The hard disk recorder 1200 can extract audio data and video data from broadcast wave signals, decode the data as appropriate and store the data into the built-in hard disk, for example. The hard disk recorder 1200 can also acquire audio data and video data from another device via the network, decode the data as appropriate and store the data in the built-in hard disk, for example.

Furthermore, the hard disk recorder 1200 can decode audio data and video data recorded on the built-in hard disk, supply the decoded data to a monitor 1260, display the image thereof on a screen of the monitor 1260 and output audio thereof through a loudspeaker of the monitor 1260, for example. In addition, the hard disk recorder 1200 can also decode audio data and video data extracted from broadcast wave signals acquired via a tuner or audio data and video data acquired from another device via the network, supply the decoded data to the monitor 1260, display the image thereof on the screen of the monitor 1260 and output the audio thereof through the loudspeaker of the monitor 1260, for example.

Needless to say, other operations are also possible.

As illustrated in FIG. 26, the hard disk recorder 1200 includes a receiving unit 1221, a demodulation unit 1222, a demultiplexer 1223, an audio decoder 1224, a video decoder 1225, and a recorder control unit 1226. The hard disk recorder 1200 further includes an EPG data memory 1227, a program memory 1228, a work memory 1229, a display converter 1230, an OSD (On Screen Display) control unit 1231, a display control unit 1232, a recording reproduction unit 1233, a D/A converter 1234, and a communication unit 1235.

The display converter 1230 includes a video encoder 1241. The recording/reproduction unit 1233 includes an encoder 1251 and a decoder 1252.

The receiving unit 1221 receives infrared signals from a remote controller (not illustrated), converts the signals into electric signals and outputs the electric signals to the recorder control unit 1226. The recorder control unit 1226 may include a microprocessor or the like, and performs various processes according to programs stored in the program memory 1228, for example. The recorder control unit 1226 uses the work memory 1229 as necessary in this case.

The communication unit 1235 is connected to a network, and performs communication with other devices via the network. For example, the communication unit 1235 is controlled by the recorder control unit 1226, communicates with a tuner (not illustrated) and mainly outputs a tuning control signal to the tuner.

The demodulation unit 1222 demodulates a signal supplied from the tuner and outputs the demodulated signal to the demultiplexer 1223. The demultiplexer 1223 divides the data supplied by the demodulation unit 1222 into audio data, video data and EPG data, and outputs the audio data, the video data and the EPG data to the audio decoder 1224, the video decoder 1225 and the recorder control unit 1226, respectively.

The audio decoder 1224 decodes the input audio data, and outputs the decoded audio data to the recording/reproduction unit 1233. The video decoder 1225 decodes the input video data and outputs the decoded video data to the display converter 1230. The recorder control unit 1226 supplies the input EPG data to the EPG data memory 1227 and stores the EPG data therein.

The display converter 1230 encodes video data supplied by the video decoder 1225 or the recorder control unit 1226 by the video encoder 1241 into video data in the NTSC (National Television Standards Committee) format, for example, and outputs the encoded video data to the recording/reproduction unit 1233. In addition, the display converter 1230 converts the size of a screen of video data supplied by the video decoder 1225 or the recorder control unit 1226 into the size corresponding to the size of the monitor 1260, converts the video data to video data in the NTSC format by the video encoder 1241, converts the video data into analog signals and outputs the analog signals to the display control unit 1232.

The display control unit 1232 superimposes an OSD signal output by the OSD (On Screen Display) control unit 1231 on a video signal input by the display converter 1230 outputs and display the resulting signal onto a display of the monitor 1260 under the control by the recorder control unit 1226.

The monitor 1260 is also supplied with audio data output by the audio decoder 1224 and converted to an analog signal by the D/A converter 1234. The monitor 1260 outputs the audio signal through a built-in loudspeaker.

The recording/reproduction unit 1233 includes a hard disk as a storage medium for recording video data, audio data, etc.

The recording/reproduction unit 1233 encodes audio data supplied by the audio decoder 1224 by the encoder 1251, for example. In addition, the recording/reproduction unit 1233 encodes video data supplied by the video encoder 1241 of the display converter 1230 by the encoder 1251. The recording/reproduction unit 1233 combines the coded data of the audio data and the coded data of the video data by a multiplexer. The recording/reproduction unit 1233 amplifies the combined data by channel coding thereof, and writes the data into the hard disk with a recording head.

The recording/reproduction unit 1233 reproduces data recorded on the hard disk with a reproduction head, amplifies the data, and divides the data into audio data and video data by a demultiplexer. The recording/reproduction unit 1233 decodes the audio data and the video data by the decoder 1252. The recording/reproduction unit 1233 D/A converts the decoded audio data and outputs the converted audio data to the loudspeaker of the monitor 1260. The recording/reproduction unit 1233 also D/A converts the decoded video data and outputs the converted video data onto the display of the monitor 1260.

The recorder control unit 1226 reads out latest EPG data from the EPG data memory 1227 and supplies the read EPG data to the OSD control unit 1231 on the basis of a user instruction represented by an infrared signal from the remote controller received via the receiving unit 1221. The OSD control unit 1231 generates image data associated with the input EPG data, and outputs the generated image data to the display control unit 1232. The display control unit 1232 outputs and displays the video data input by the OSD control unit 1231 onto the display of the monitor 1260. As a result, an EPG (electronic program guide) is displayed on the display of the monitor 1260.

The hard disk recorder 1200 can also acquire various data such as video data, audio data or EPG data supplied from other devices via a network such as the Internet.

The communication unit 1235 is controlled by the recorder control unit 1226, acquires coded data such as video data, audio data and EPG data transmitted from other devices via the network, and supplies the coded data to the recorder control unit 1226. The recorder control unit 1226 supplies the acquired coded data of video data and audio data to the recording/reproduction unit 1233, and stores the coded data in the hard disk, for example. In this case, the recorder control unit 1226 and the recording/reproduction unit 1233 may perform processing such as re-encoding as necessary.

The recorder control unit 1226 also decodes the acquired coded data of video data and audio data, and supplies the resulting video data to the display converter 1230. The display converter 1230 processes video data supplied from the recorder control unit 1226, supplies the video data to the monitor 1260 via the display control unit 1232 and displays the image thereof similarly to the video data supplied from the video decoder 1225.

With the display of the image, the recorder control unit 1226 may supply the decoded audio data to the monitor 1260 via the D/A converter 1234, and output the audio thereof through the loudspeaker.

Furthermore, the recorder control unit 1226 decodes coded data of the acquired EPG data, and supplies the decoded EPG data to the EPG data memory 1227.

The hard disk recorder 1200 as described above uses the image decoding apparatus 200 as decoders built in the video decoder 1225, the decoder 1252 and the recorder control, unit 1226. In other words, a decoder built in the video decoder 1225, the decoder 1252 or the recorder control unit 1226 performs sampling and interpolation of adjacent pixels as necessary by using information such as notification of whether or not sampling is performed in the image coding apparatus 100 and specification of the sampling method and the interpolation method extracted from coded data supplied from the image coding apparatus 100, generates a predicted image by using the adjacent pixels, and generates decoded image data from residual information by using the predicted image, similarly to the case of the image decoding apparatus 200. Accordingly, the decoder built in the video decoder 1225, the decoder 1252 or the recorder control unit 1226 can reduce the amount of memory required for intra-frame prediction.

The hard disk recorder 1200 can therefore reduce the amount of memory required for intra-frame prediction in decoding video data (coded data) received by the tuner and the communication unit 1235 and video data (coded data) to be reproduced by the recording/reproduction unit 1233, for example, and realize real-time processing at a lower cost.

The hard disk recorder 1200 also uses the image coding apparatus 100 as the encoder 1251. Accordingly, the encoder 1251 performs determination on whether or not to sample adjacent pixels on the basis of a feature quantity extracted from the image data, and determination of the sampling method and the interpolation method when sampling is to be performed, samples the adjacent pixels as necessary and stores the pixels similarly to the case of the image coding apparatus 100. The encoder 1251 reads out the adjacent pixels in performing intra prediction, and interpolates the pixels as necessary to reconstruct the adjacent pixels. The encoder 1251 then generates a predicted image by using the reconstructed adjacent pixels, and generates coded data from residual information by using the predicted image. The encoder 1251 can therefore reduce the amount of memory required for intra-frame prediction.

The hard disk recorder 1200 can therefore reduce the amount of memory required for intra-prediction generating coded data to be recoded on the hard disk, for example and realize real-time processing at a lower cost.

Although the hard disk recorder 1200 that records video data and audio data on a hard disk is described above, the recording medium may obviously be any medium. For example, the image coding apparatus 100 and the image decoding apparatus 200 may be applied to a recorder to which a recording medium such as a flash memory, an optical disc or a video tape other than the hard disk is applied similarly to the case of the hard disk recorder 1200 described above.

7. Seventh Embodiment

[Camera]

Figure 27:
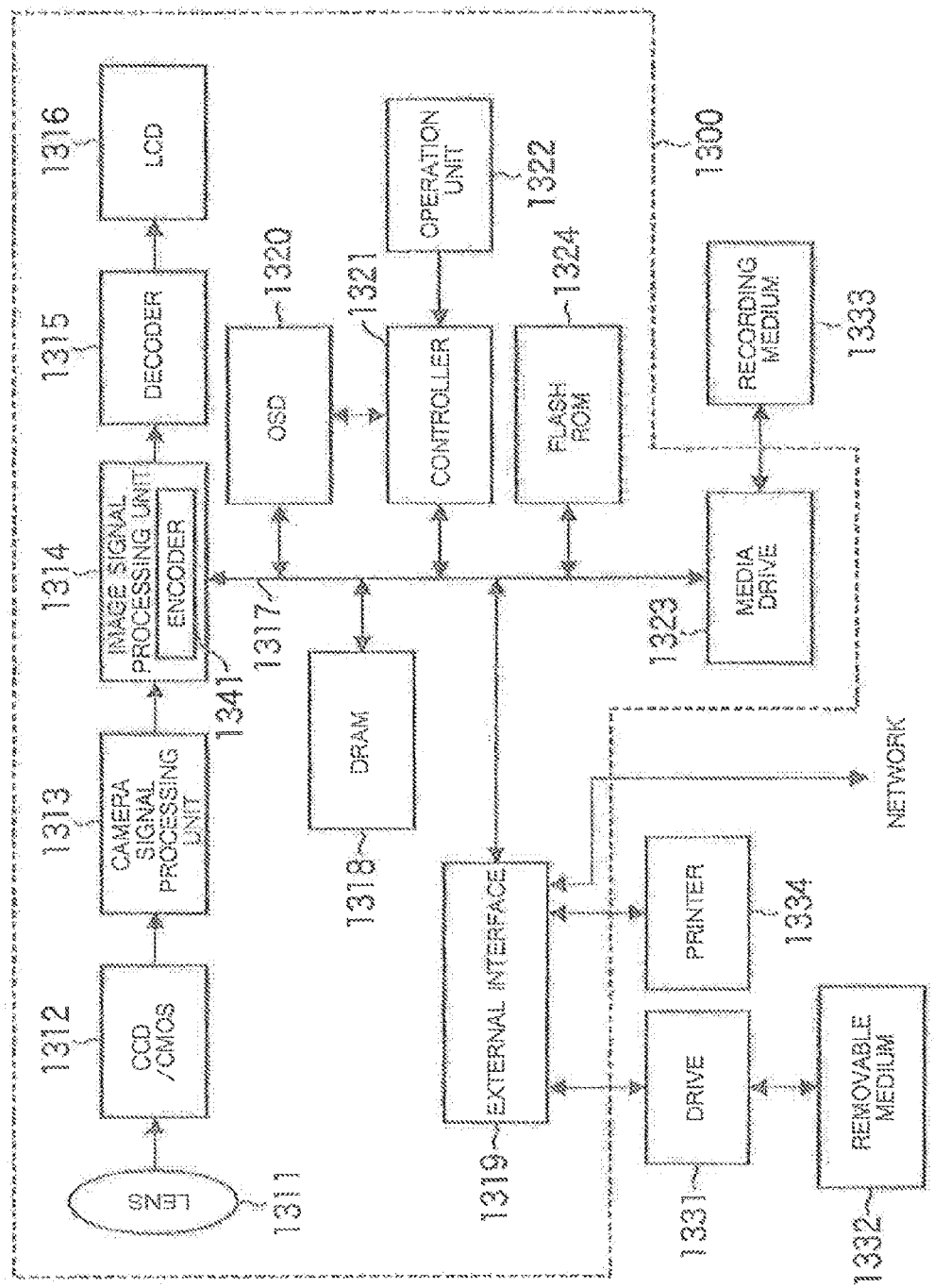
FIG. 27 is a block diagram illustrating an example of a main configuration of a camera.

FIG. 27 is a block diagram illustrating an example of a main configuration of a camera in which the image coding apparatus 100 and the image decoding apparatus 200 are used.

The camera 1300 illustrated in FIG. 27 images a subject, displays the subject image on a LCD 1316, and records the image as image data on a recording medium 1333.

A lens block 1311 makes light (that is, video of the subject) enter a CCD/CMOS 1312. The CCD/CMOS 1312 is an image sensor using a CCD or a CMOS that converts the intensity of received light into an electric signal and supplies the electric signal to a camera signal processing unit 1313.

The camera signal processing unit 1313 converts the electric signal supplied from the CCD/CMOS 1312 into a chrominance signal of Y, Cr and Cb, and supplies the chrominance signal to an image signal processing unit 1314. The image signal processing unit 1314 performs predetermined image processing on the image signal supplied from the camera signal processing unit 1313 and codes the image signal by an encoder 1341 under the control by the controller 1321. The image signal processing unit 1314 supplies coded data generated by coding the image signal to a decoder 1315. Furthermore, the image signal processing unit 1314 obtains data for display generated by an on-screen display (OSD) 1320 and supplies the data to the decoder 1315.

In the processing described above, the camera signal processing unit 1313 uses a DRAM (Dynamic Random Access Memory) 1318 connected via a bus 1317 as appropriate and causes image data, coded data obtained by coding the image data, and the like to be held in the DRAM 1318.

The decoder 1315 decodes coded data supplied from the image signal processing unit 1314, and supplies the resulting image data (decoded image data) to the LCD 1316. In addition, the decoder 1315 supplies data for display supplied from the image signal processing unit 1314 to the LCD 1316. The LCD 1316 combines the image of the decoded image data supplied from the decoder 1315 with the image of the data for display as appropriate and displays the combined image.

The on-screen display 1320 outputs data for display such as a menu screen and icons including symbols, characters, or graphics to the image signal processing unit 1314 via the bus 1317 under the control by the controller 1321.

The controller 1321 performs various processes on the basis of signals indicating instructions made by the user by using an operation unit 1322 and controls the image signal processing unit 1314, the DRAM 1318, an external interface 1319, the on-screen display 1320, a media drive 1323, etc., via the bus 1317. Programs and data necessary for performing various processes by the controller 1321 are stored in a FLASH ROM 1324.

For example, the controller 1321 can code image data stored in the DRAM 1318 and decode coded data stored in the DRAM 1318 in place of the image signal processing unit 1314 and the decoder 1315. In this case, the controller 1321 may perform coding and decoding by the same methods as the coding and decoding methods of the image signal processing unit 1314 and the decoder 1315 or may perform coding and decoding by methods that are not supported by the image signal processing unit 1314 and the decoder 1315.

In addition, when it is instructed to start printing of an image through the operation unit 1322, for example, the controller 1321 reads out image data from the DRAM 1318, and supplies the read image data to a printer 1334 connected to the external interface 1319 connected via the bus 1317 for printing.

Furthermore, when it is instructed to record an image through the operation unit 1322, for example, the controller 1321 reads out coded data from the DRAM 1318, and supplies and stores the read coded data to/in a recording medium 1333 attached to the media drive 1323 via the bus 1317.

The recording medium 1333 is an arbitrary read/write removable medium such as a magnetic disk, a magneto-optical disc, an optical disc or a semiconductor memory. The recording medium 1333 may obviously be in any type as a removable medium, and may be a tape device, a disc or a memory card. The recording medium 1333 may of course be a contactless IC card or the like.

Alternatively, the media drive 1323 and the recording medium 1333 may be integrated and may be configured as a non-portable storage medium, such as a built-in hard disk drive and a SSD (Solid State Drive).

The external interface 1319 is a USB input/output terminal, for example, and connected to the printer 1334 for printing an image. The external interface 1319 is also connected with a drive 1331 as necessary, a removable medium 1332 such as a magnetic disk, an optical disc or a magneto-optical disc is attached thereto as appropriate, and computer programs read out therefrom are installed into the FLASH ROM 1324 as necessary.

Furthermore, the external interface 1319 includes a network interface connected to a predetermined network such as a LAN and the Internet. The controller 1321 can read out coded data from the DRAM 1318 and supply the read coded data to other devices connected via the network through the external interface 1319 according to an instruction from the operation unit 1322, for example. In addition, the controller 1321 can acquire coded data and image data supplied from other devices via the network through the external interface 1319, and hold the acquired data in the DRAM 1318 or supply the acquired data to the image signal processing unit 1314.

The camera 1300 as described above used the image decoding apparatus 200 as the decoder 1315. In other words, the decoder 1315 performs sampling and interpolation of adjacent pixels as necessary by using information such as notification of whether or not sampling is performed in the image coding apparatus 100 and specification of the sampling method and the interpolation method extracted from coded data supplied from the image coding apparatus 100, generates a predicted image by using the adjacent pixels, and generates decoded image data from residual information by using the predicted image, similarly to the case of the image decoding apparatus 200. Accordingly, the decoder 1315 can reduce the amount of memory required for intra-frame prediction.

The camera 1300 can therefore reduce the amount of memory required for intra-frame prediction in decoding image data generated by the CCD/CMOS 1312, coded data of video data read out from the DRAM 1318 or the recording medium 1333 or coded data of video data acquired via the network, for example, and realize real-time processing at a lower cost.

The camera 1300 also uses the image coding apparatus 100 as the encoder 1341. The encoder 1341 performs determination on whether or not to sample adjacent pixels on the basis of a feature quantity extracted from the image data, and determination of the sampling method and the interpolation method when sampling is to be performed, samples the adjacent pixels as necessary and stores the pixels similarly to the case of the image coding apparatus 100. The encoder 1341 reads out the adjacent pixels in performing intra prediction, and interpolates the pixels as necessary to reconstruct the adjacent pixels. The encoder 1341 then generates a predicted image by using the reconstructed adjacent pixels, and generates coded data from residual information by using the predicted image. The encoder 1341 can therefore reduce the amount of memory required for intra-frame prediction.

Accordingly, the camera 1300 can reduce the amount of memory required for intra-frame prediction in generating coded data to be recorded on the DRAM 1318 and the recording medium 1333 and coded data to be provided to other devices, for example and can realize real-time processing at a smaller cost.

Note that the decoding method for the image decoding apparatus 200 may be applied to decoding performed by the controller 1321. Similarly, the coding method for the image coding apparatus 100 may be applied to coding performed by the controller 1321.

Furthermore, image data taken by the camera 1300 may be a moving image or a static image.

Needless to say, the image coding apparatus 100 and the image decoding apparatus 200 can also be applied to an apparatus or a system other than those described above.

Note that the present technology can also have configurations as follows.

(1) An image processing apparatus including:
  a sampling unit that performs sampling to thin out pixel values to be used as adjacent pixels in intra-frame prediction according to a size in an horizontal direction of an image to be coded or a size in a vertical direction of regions obtained by dividing the image;

a reconstruction unit that performs interpolation by using the pixel values sampled by the sampling unit to reconstruct the adjacent pixels;

a predicted image generation unit that performs the intra-frame prediction by using the adjacent pixels reconstructed by the reconstruction unit to generate a predicted image; and a coding unit that codes the image by using the predicted image generated by the predicted image generation unit.

(2) The image processing apparatus described in (1) further including:

a determination unit that determines whether to perform the sampling to thin out the pixel values to be used as the adjacent pixels in the intra-frame prediction, wherein the sampling unit performs the sampling when the determination unit determines to perform the sampling.

(3) The image processing apparatus described in (2), wherein the determination unit determines whether to perform the sampling according to a content of the image or a picture type in coding of the image.

(4) The image processing apparatus described in (2), further including:

a sampling method determination unit that determines a method of the sampling according to the size in the horizontal direction of the image or the size in the vertical direction of the regions when the determining unit determines to perform the sampling, wherein the sampling unit performs the sampling by the method determined by the sampling method determination unit.

(5) The image processing apparatus described in (4), wherein the sampling method determination unit determines the method of the sampling according to a content of the image.

(6) The image processing apparatus described in (4), wherein

The sampling method determination unit determines the method of the sampling according to a picture type in coding of the image.

(7) The image processing apparatus described in any of (4) to (6), wherein the sampling method determination unit determines a method of the interpolation, and the reconstruction unit performs the interpolation by the method of the interpolation determined by the sampling method determination unit to reconstruct the adjacent pixels.

(8) The image processing apparatus described in any of (1) to (7), wherein the sampling unit samples part of a lowermost pixel row and part of a rightmost pixel column in each of the regions into which the image is divided.

(9) The image processing apparatus described in any of (1) to (7), wherein the sampling unit samples part of a lowermost pixel row in each of the regions into which the image is divided.

(10) The image processing apparatus described in any of (1) to (9), further including:

a feature quantity extraction unit that extracts a feature quantity of the image, wherein the determination unit determines whether to perform the sampling according to the size in the horizontal direction of the image or the size in the vertical direction of the regions extracted as the feature quantity of the image by the feature quantity extraction unit.

(11) The image processing apparatus described in any of (1) to (10), wherein the coding unit transmits the predicted image generated by the predicted image generation unit, coded data obtained by coding difference information from each of the regions of the image, and information indicating whether the sampling is performed by the sampling unit.

(12) The image processing apparatus described in (11), wherein the coding unit transmits the coded data obtained by coding the difference information and information indicating a method of the sampling performed by the sampling unit.

(13) An image processing method for an image processing apparatus including:

performing sampling by a sampling unit to thin out pixel values used as adjacent pixels in intra-frame prediction according a size in a horizontal direction of an image to be coded or a size in a vertical direction of regions in a matrix into which the image is divided;

performing interpolation by using the sampled pixel values by a reconstruction unit to reconstruct the adjacent pixels;

performing the intra-frame prediction by using the reconstructed adjacent pixels by a predicted image generation unit to generate a predicted image; and coding the image by using the generated predicted image by a coding unit.

(14) An image processing apparatus including:

a decoding unit that decodes coded data obtained by coding an image;

a sampling unit that performs sampling to thin out pixel values to be used as adjacent pixels in intra-frame prediction according to a size in a horizontal direction of the image obtained by decoding the coded data by the decoding unit or a size in a vertical direction of regions into which the image is divided;

a reconstruction unit that performs interpolation by using the pixel values sampled by the sampling unit to reconstruct the adjacent pixels; and a predicted image generation unit that performs the intra-frame prediction by using the adjacent pixels reconstructed by the reconstruction unit to generate a predicted image.

(15) The image processing apparatus described in (14), further including:

a determination unit that determines whether to perform the sampling to thin out the pixel values to be used as the adjacent pixels in the intra-frame prediction; and a sampling method determination unit that determines a method of the sampling according to the size in the horizontal direction of the image or the size in the vertical direction of the regions when the determination unit determines to perform the sampling, wherein the sampling unit performs the sampling by the method determined by the sampling method determination unit when the determination unit determines to perform the sampling.

(16) The image processing apparatus described in (14) or (15), wherein the sampling unit samples part of a lowermost pixel row and part of a rightmost pixel column in each of the regions into which the image is divided.

(17) The image processing apparatus described in (14) or (15), wherein the sampling unit samples part of a lowermost pixel row in each of the regions into which the image is divided.

(18) The image processing apparatus described in (14) to (17), wherein
the decoding unit acquires coded data obtained by coding difference information between the predicted image and each of the regions of the image and information indicating whether the sampling is performed by the sampling unit that are transmitted.

(19) The image processing apparatus described in (18), wherein
the decoding unit acquires the coded data obtained by coding the difference information and information indicating a method of the sampling performed by the sampling unit that are transmitted.

(20) An image processing method for an image processing apparatus, including:
decoding coded data obtained by coding an image by a decoding unit;
performing sampling by a sampling unit to thin out pixel values used as adjacent pixels in intra-frame prediction according a size in a horizontal direction of the image obtained by decoding the coded data by the decoding unit or a size in a vertical direction of regions into which the image is divided;
performing interpolation by using the sampled pixel values by a reconstruction unit to reconstruct the adjacent pixels; and
performing the intra-frame prediction by using the reconstructed adjacent pixels by a predicted image generation unit to generate a predicted image.

REFERENCE SIGNS LIST

100 Image coding apparatus
114 Intra prediction unit
121 Feature quantity extraction unit
122 Sampling execution determination unit
123 Sampling method determination unit
151 Sampling unit
152 Reconstructed pixel storage unit
153 Adjacent pixel reconstruction unit
154 Predicted image generation unit
200 Image decoding apparatus
211 Intra prediction unit
231 Control unit
232 Sampling unit
233 Reconstructed pixel storage unit
234 Adjacent pixel reconstruction unit
235 Predicted image generation unit

The invention claimed is:

1. An image processing apparatus comprising:
a central processing unit (CPU) configured to:
perform sampling on neighboring pixels of an image, the neighboring pixels being adjacently located to a current block for intra prediction according to block size of the current block for the intra prediction, wherein the sampling is performed in an event a frequency of a change in a texture pattern of the image is greater than a first predetermined threshold and the block size of the current block is larger than a second predetermined threshold;
perform interpolation using the sampled neighboring pixels to reconstruct the neighboring pixels; and
perform the intra prediction on a current pixel within the current block using the neighboring pixels as reference pixels for the intra prediction to generate a prediction image.

2. The image processing apparatus according to claim 1, wherein the CPU is further configured to:
determine whether to perform the sampling the neighboring pixels according to the block size of the current block for the intra prediction.

3. The image processing apparatus according to claim 1, wherein the CPU is configured to determine whether to perform the sampling on the neighboring pixels according to a horizontal size of the current block or a vertical size of the current block.

4. The image processing apparatus according to claim 3, wherein the CPU is configured to determine that the sampling is performed in case the vertical size or the horizontal size is larger than the second predetermined threshold.

5. The image processing apparatus according to claim 1, wherein the CPU is configured to perform subsampling on the neighboring pixels according to the block size of the current block for the intra prediction.

6. The image processing apparatus according to claim 1, wherein the CPU is further configured to:
encode image data using the prediction image.

7. The image processing apparatus according to claim 1, wherein the CPU is further configured to:
decode encoded image data using the prediction image.

8. A method for an image processing, comprising:
performing sampling, by a central processing unit (CPU), on neighboring pixels of an image, the neighboring pixels being adjacently located to a current block for intra prediction according to block size of the current block for the intra prediction, wherein the sampling is performed in an event a frequency of a change in a texture pattern of the image is greater than a first predetermined threshold and the block size of the current block is larger than a second predetermined threshold;
performing interpolation, by the CPU, using the sampled neighboring pixels to reconstruct the neighboring pixels; and
performing the intra prediction, by the CPU, on a current pixel thin the current block using the neighboring pixels as reference pixels for the intra prediction to generate a prediction image.

9. The method according to claim 8, further comprising:
determining, by the CPU, whether to perform the sampling on the neighboring pixels according to the block size of the current block for the intra prediction.

10. The method according to claim 8, further comprising:
determining, by the CPU, whether perform the sampling on the neighboring pixels according to a horizontal size of the current block or a vertical size of the current block.

11. The method according to claim 10, wherein the sampling is performed in case the vertical size of the horizontal size is larger than the second predetermined threshold.

12. The method according to claim 8, further comprising:
preforming subsampling, by the CPU, on the neighboring pixels according to the block size of the current for the intra prediction.

13. The method according to claim 8, further comprising:
encoding image data using the prediction image by the CPU.

14. The method according to claim 8, further comprising:
decoding encoded image data using the prediction image by the CPU.

* * * * *